(12) United States Patent
Adachi et al.

(10) Patent No.: US 7,605,981 B2
(45) Date of Patent: Oct. 20, 2009

(54) DISPLAY UNIT, DISPLAY METHOD AND EQUIPMENT USING THEREOF

(75) Inventors: Masaya Adachi, Hitachi (JP); Osamu Itou, Hitachi (JP); Shinichi Komura, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 766 days.

(21) Appl. No.: 11/017,597

(22) Filed: Dec. 20, 2004

(65) Prior Publication Data
US 2005/0156813 A1    Jul. 21, 2005

(30) Foreign Application Priority Data
Dec. 24, 2003    (JP)    ............................. 2003-426108

(51) Int. Cl.
*G02B 27/14*    (2006.01)
(52) U.S. Cl. .................... 359/629; 359/495; 359/494; 349/9; 349/11; 345/7
(58) Field of Classification Search ................ None
See application file for complete search history.

(56) References Cited

U.S. PATENT DOCUMENTS 5,042,921 A * 8/1991 Sato et al. ................ 349/9
6,703,988 B1 * 3/2004 Fergason ................. 345/6

FOREIGN PATENT DOCUMENTS

JP    2000-214413    8/2000
JP    2003-057595    2/2003
WO    95-27919    10/1995

OTHER PUBLICATIONS

Broer, et al., "S32-3 Reflective Cholesteric Polariser Improving the Light Yield of Back-and-Side-Lighted Flat Panel Liquid Crystal Displays" Proceedings of the Fifteenth International Display Research Conference, Asia Display '95, Oct. 16-18, 1995, Hamamatsu, Japan, pp. 735-738.
Gooch, et al., "The Optical Properties of Twisted Nematic Liquid Crystal Structures With Twist Angless≦ 90°", J. Phys. D: Appl. Phys., vol. 8, 1975, Great Britain, pp. 1575-1584.
Uehira, et al., "Effect of the Compression of the Depth Map Image on Depth-Fused 3D Image Quality", Proceedings of SPIE-IS&T Electronic Imaging, SPIE vol. 5006 (2003), pp. 227-234.

* cited by examiner

*Primary Examiner*—Arnel C Lavarias
(74) *Attorney, Agent, or Firm*—Hogan & Hartson LLP

(57) ABSTRACT

A display unit which displays a plurality of objects viewed as being located at different depthwise positions by the viewer so as to exhibit an image with depthwise feeling, includes: a single display portion including a far-distant display zone and a near-distant display zone, a polarized beam splitting element in front of the near-distant display zone, a polarized beam changing element in front of the far-distant display zone, and a total reflection mirror for reflecting an image beam emitted from the far-distant display zone, onto the polarized beam splitting element. An image beam emitted from the far-distant display zone is transmitted through the polarized beam changing element, then is reflected at the total reflection mirror, and thereafter is reflected by the polarized beam splitting element before it is viewed by the viewer.

7 Claims, 37 Drawing Sheets

DIRECTION OF DIVISION OF DISPLAY ZONE

DIRECTION OF DIVISION OF DISPLAY ZONE

DIRECTION OF DIVISION OF DISPLAY ZONE

MARK FOR POSITIONING
FAR-DISTANT DISPLAY ZONE

MARK ALIGNED CONDITION AS
VIEWED FROM THE VIEWER

MARK FOR POSITIONING
NEAR-DISTANT DISPLAY ZONE

MARK FOR POSITIONING
FAR-DISTANT DISPLAY ZONE

MARK ALIGNED CONDITION AS
VIEWED FROM THE VIEWER

MARK FOR POSITIONING
NEAR-DISTANT DISPLAY ZONE

DIRECTION OF DIVISION OF DISPLAY ZONE

DIRECTION OF DIVISION OF DISPLAY ZONE

DIRECTION OF DIVISION OF DISPLAY ZONE

DISPLAY UNIT, DISPLAY METHOD AND EQUIPMENT USING THEREOF

BACKGROUND OF THE INVENTION

The present invention relates to a display unit which can superpose a plurality of objects to be viewed which are located at positions having different distances (depths) as viewed from the viewer, with one another and which can display the thus superposed image, to a method of displaying an image which gives a depth feel (three-dimensional effect) and to equipments incorporating thereof.

There have been used direct-view display units for displaying images data, incorporating a display element such as a CRT (cathode ray tube), a plasma display panel, a liquid crystal display element or an organic electroluminescence display element, and a projection display unit for enlarging an optical image formed on a small-sized display element and then displaying the enlarged image on a screen.

Any of these display units displays a two-dimensional image on the basis of two-dimensional image data. It is noted that a display element for displaying a two-dimensional image and a display unit incorporating the same will be denoted as "two-dimensional display element" and "two-dimensional display unit", respectively.

Of the above-mentioned display units, display units each incorporating a liquid crystal display element which is thin and light-weight, are widely used as in large-sized screen television sets, monitors for personal computers, mobile telephones, game machines including pin ball game machines and pin-ball type slot machines and the like.

By the way, there have been heretofore presented a display unit in which a plurality of two-dimensional display elements or screens of a plurality of two displays are arranged at positions having different depthwise distances as viewed from a viewer, and images thereon are optically superposed with one another and are then displayed in order to allow the viewer to sense depthwise feeling or three-dimensional effects. Such a display unit has a high expressive power in comparison with a display unit which can only display two-dimensional images, and can exhibit a more realistic image.

A typical one of these display units has such a configuration that a plurality of two dimensional display elements and a half-mirror are provided, and a screen of one of these display elements which is viewed, passing through the half-mirror, and a screen of another of the display elements which is viewed, being reflected by the half-mirror, are located at positions having different depthwise distances. Referring to FIG. 43 which is a schematic sectional view illustrating the above-mentioned conventional display unit which comprises two display elements and a half mirror, liquid crystal display elements are used as the two-dimensional display elements, and an image beam (which will be hereinbelow referred to as "far distance image beam") from a display element located at a position having a far depthwise distance (which will be hereinbelow referred to as "a far distance display element"), as viewed from the viewer, is viewed, passing through the half-mirror while an image beam (which will be hereinbelow referred to as "near distance image beam") from a display element located at a position having a near depthwise distance (which will be referred to as "near distance image display element"), as viewed from the viewer, is viewed, being reflected by the half-mirror. In this configuration, images which are displayed on the screens having different depthwise distances as viewed from the viewer, are optically synthesized with each other by the half-mirror, and are therefore viewed in a superposed condition.

In the above-mentioned configuration, there are required two two-dimensional elements in such a case that two screens are located at different depthwise distances. That is, in this configuration, a plurality of two-dimensional display elements are required by a number equal to that of screens located at different depthwise distances, and as a result, there is presented such disadvantages that a number of components is increased, and the display unit becomes large-sized. In particular, in such a case that thin display elements such as liquid crystal display elements or organic electroluminescence display elements are used as two-dimensional display elements, their features such that they are thin cannot be fully and practically used.

Further, in the conventional technologies in which the far-distance image beam and the near-distance image beam are synthesized through the half-mirror, the half-mirrors has in general a transmission factor T % and a reflection factor R % which are in total 100% at a maximum. Thus, R % and T % of the far distance image beam and the near distance image beam emitted from the respective display elements cannot be seen by the viewer, that is, they become a beam loss. Thus, there has been raised such a problem that the image beams which can be seen by the viewer are reduced to values not greater than their halves.

JP-A-2003-57595 discloses a display unit which is composed of a plurality of reflection type holographic diffusion plates located at different depthwise positions as viewed from a viewer, and a plurality of projectors for projecting two dimensional images respectively onto the reflection type diffusion plates. The reflection type holographic diffusion plates reflect and scatter light rays in set predetermined directions, that is, light beams from the corresponding projectors, but transmit therethrough light beams in the other directions, such as light beams reflected and scattered from the reflection type holographic diffusion plates located therebehind. Thus, images projected onto the plurality of reflection type holographic diffusion plates located at positions having different depthwise distances can be seen in a superposed condition.

In this case, unless the reflection type holographic diffusion plate has a transmission factor of 100%, the image beam projected onto a reflection type holographic diffusion plate which is located at a position having a depthwise far distance causes a loss before it reaches the viewer.

Further, since it is required to arrange the plurality of reflection type holographic diffusion plates being spaced from one another corresponding to depthwise distances by which the viewer views the images, the device becomes thicker in the depthwise direction. Further, the projectors are required by a number equal to that of the plurality of reflection type holographic diffusion plates, and as a result the number of components is increased, thereby the size of the device becomes larger.

It is noted that JP-A-2003-57595 and JP-A-2000-214413 disclose display methods which allow the viewer to perceive three-dimensional stereoscopic images. In these methods, two-dimensional stereoscopic images (pictures) formed on screens of a plurality of display elements having different depthwise distances as viewed from the viewer, are displayed being superposed with one another when the viewer views these images at a position on a line connecting between the left and right eyes of the viewer. Further, the brightness is adjusted in accordance with depthwise positions of objects to be displayed, that is, distances from the viewer to objects to be displayed while brightness of the two-dimensional images (pictures) displayed on the screens having different depthwise distances as viewed by the viewer is maintained to be constant thereby it is possible to allow the viewer to perceive a three-dimensional stereoscopic image.

The above-mentioned methods can restrain contradictions among physiological factors of stereoscopic vision, and accordingly, these methods can be expected as new three-dimensional display methods which can also reduce the amount of information. However, the position of the viewer where a three-dimensional stereoscopic image can be satisfactorily viewed would be limited. That is, should the view point of the viewer be changed largely, a three-dimensional stereoscopic view could not be viewed.

SUMMARY OF THE INVENTION

A first object of the present invention is to provided a display unit for superposing and displaying a plurality of objects to be viewed located at different depthwise positions (distances) as viewed from the viewer, which can prevent a number of components from being increased, that is, which can prevent the display unit from being large-sized. In other word, the first object of the present invention is to provide a display unit for optically superposing and displaying a plurality of object to be viewed located at different depthwise positions (distances), which can reduce the number of components and which can be small-sized or thinned.

Further, a second object of the present invention is to provide a display unit for optically superposing and displaying a plurality of objects to be viewed located at different positions as viewed from the viewer, such as screens of two-dimensional display elements, which can prevent image beams radiated from the two-dimensional display elements from being in part lost before it reaches the viewer. That is, the second object of the present invention is to provide a display unit which is restively bright and which allows image beams radiated from two-dimensional display elements to efficiently reach the viewer.

Further, a third object of the present invention is to provide a display method in a display unit for optically superposing and displaying a plurality of objects to be viewed, such as screens of two-dimensional elements located at different depthwise positions (distances) as viewed from the viewer, the display method being capable of preventing depthwise feeling from being deteriorated even though a view point is changed. Further objects and novel features of the present invention will become apparent in the description of the present invention which will be explained hereinbelow with reference to the accompanying drawings.

According to the present invention, there is provided a display unit for optically superposing a plurality of objects to be viewed, located at different depthwise positions as viewed from the viewer, comprising a plurality of objects to be viewed juxtaposed with one another, and a plurality of reflectors. One of the plurality of reflectors is a total reflection mirror and the others are half mirrors. The half mirrors are arranged on the front surface sides of those of the objects to be viewed, which are other than an object to be viewed located at a furthest position as viewed from the viewer. Further, the total reflection reflector reflects a light beam from the object to be viewed located at the furthest position as viewed from the viewer, onto the half mirrors.

Further, a light beam from an object to be viewed located at a nearest position as viewed from the viewer, is transmitted through a half mirror arranged at a position in front of an object to be viewed, which is nearest as viewed from the viewer, and is then viewed, and light beams from those of the objects to be viewed which are other than the object to be viewed located at a position nearest as viewed from the viewer, is reflected on the half mirror which is arranged in front of the object to be viewed located at a position nearest as viewed by the viewer, and is then viewed.

Further, the plurality of objects to be viewed are located on one and the same plane or substantially one and the same plane.

With this configuration, in the display unit, the reflection surfaces of the reflectors are arranged, substantially in parallel with one another, and further, the reflection surfaces make an angle of 0 to 45 deg. with respect to the substantially one and the same plane on which the object to be viewed are located.

Further, in the above-mentioned display unit, the plurality of objects to be viewed are screens of a plurality of two-dimensional display elements having at least one component which are commonly used. Alternatively, in the above-mentioned display unit, the plurality of objects to be viewed are display zones on a screen of a single two dimensional display element.

Further, the above-mentioned objects to be viewed are a plurality of different display zones on a screen of a single two-dimensional display element, or screens of a plurality of two-dimensional display elements, which radiate(s) image beams and predetermined polarized light beams. Further, at least one of the half-mirrors is a polarized beam splitting element characterized in that a predetermined polarized component is reflected thereon but a polarized component having a different polarized condition different from that of the former is transmitted therethrough, or a predetermined polarized component is transmitted therethrough but a polarized component having a polarized condition different from that of the former is reflected thereon.

Further, in the above-mentioned configuration, a light beam radiated from a two-dimensional display element is reflected on or transmitted through the polarized beam splitting element by a degree which is not less than 80% thereof.

According to the present invention, there is provided a display method for a display unit for optically superposing and displaying a plurality of objects to be viewed located at different depthwise positions as viewed from the viewer, the step of displaying images as follows, in such a case that the plurality of objects to be viewed are a plurality of different display zones on a screen of a single two-dimensional display element or screens of a plurality of two dimensional display elements:

(1) one and the same object to be displayed is not simultaneously displayed on different display zones or different screens. Further, an object to be displayed located far is displayed on a display zone or a screen corresponding to a distance thereof while an object to be displayed located near is displayed on a display zone or a screen corresponding to a distance thereof;

(2) an object to be displayed which continuously extends spanning between different depthwise positions is displayed in such a way that a part thereof which is located at a far depthwise distance from the viewer or a long distance from the viewer is displayed only on a display zone of a screen corresponding to the depthwise distance, but an object to be displayed located at a short distance from the viewer is displayed only on a display zone or a screen located corresponding to the depthwise distance. Further, parts thereof corresponding to intermediate positions having different depthwise distances are displayed only on display zones or screens corresponding to the depthwise distances thereof, being darker than the other parts thereof. In this case, the parts located at intermediate positions having different depthwise distances is displayed so that the degree of darkness is continuously lowered as these approaches intermediate positions having different depthwise distances.

(3) If objects to be displayed having different depthwise distances are superposed with each other, of the objects to be displayed located at relatively far distances, those which are hidden by an object to be displayed located at a relatively near distance are displayed with at least a part thereof being darkened. In this case, the hidden part is displayed being continuously darkened from its periphery to its center.

The display unit according to the present invention can display a plurality of objects to be viewed, juxtaposed on one and the same plane or substantially one and the same plane so that the objects to be viewed located at different depthwise position as viewed by the viewer can be viewed in an optically superposed condition. Thus, there can be offered such an advantage as to materialize a thin display unit having a depth which is actually shorter than a depth the viewer can perceive.

Further, since a plurality of different display zones on the screen of a single two-dimensional display element are set to be the plurality of objects to be viewed, there is provided such an advantage that a thin display unit having a small number of components can be materialized at low costs.

Further, of the plurality of objects to be viewed, at least one is a screen of a two-dimensional display element which radiates a predetermined polarized beam as an image beam, and a half mirror located in front of the screen is a polarized beam splitting element which reflects a predetermined polarized beam component but transmits polarized beam components different from the former, or which transmits a predetermined polarized beam component but reflects polarized beam components different from the former. With this configuration, image beams which are radiated from at least this screen can be synthesized with light beams from objects located at positions having distances longer than a distance from the screen with substantially no loss of the image bean radiated from at least this screen. Thus, in comparison with such a configuration that a polarized light splitting element is used as a half mirror, deterioration of an image beam can be prevented, and thereby it is possible to materialize a display unit having a higher degree of brightness.

Further, in the display system according to the present invention, one and the same object to be viewed is not displayed simultaneously on screens which are depthwise different as viewed from the viewer, and accordingly, the tolerance of the view point with which depthwise feeling can be obtained is broadened, thereby it is possible to maintain a display having depthwise feeling even though the view point is changed more or less.

Further, there can be offered such an advantage that an equipment incorporating a display unit according to the present invention, capable of displaying an image exhibiting depthwise feeling which cannot be exhibited by a conventional two-dimensional display unit can be materialized by the one which has an actual depth less than a depth the viewer can perceive and which is thin.

The specific object of the present invention is to provide a display unit for optically superposing and displaying a plurality of objects be viewed located at different depthwise positions as viewed by the viewer, and a display method, and an equipment incorporating thereof.

The objects to be viewed are located, being juxtaposed with one another on a substantially one and the same plane. This configuration is extremely effective for decreasing the thickness of a display unit in the depthwise direction as viewed from the viewer.

A display element for displaying a two-dimensional image (which will be referred to as "two-dimensional display element") such as a CRT, a liquid crystal display element, an organic electroluminescent display element or the like may be used as the objects to be viewed. Further, there may be considered, as the objects to be viewed, screens of display elements in which a plurality of patterns are changed over one by one by rotating reels each having a peripheral surface on which the patterns are set, as used in a slot machine.

It is desirable to use a screen of a thin two-dimensional display unit such as a liquid crystal display element or an organic electroluminescent display element as the objects to be viewed in order to make the display unit small-sized although it should not be limited thereto.

It is preferable to use a plurality of different display zones on a single two-dimensional display element as the plurality of objects to be viewed in order to decrease the number of components. Further, with this configuration, the objects to be viewed can be automatically located on one and the same plane.

Explanation will be hereinbelow made of a display unit having such a configuration that a liquid crystal display element is used for the objects to be viewed, and further, the objects to be viewed are two different display zones on a screen of the display unit although the present invention should not be limited to this configuration.

The display unit according to the present invention incorporates a plurality of objects to be viewed and a plurality of reflectors. At least one of the plurality of reflectors is a mirror having a reflection factor (total reflection mirror) which is high with respect to a light beam from an object to be viewed located at a furthest position as viewed from the viewer. Those other than the total reflection mirror are half-mirrors. Further, since explanation will be hereinbelow made of a display unit in which the number of the objects to be viewed is two, the number of the reflectors is two equal to that of the objects to be viewed, one of which is a half-mirror and the other one of which is a total reflection mirror.

The half mirror is located between an object to be viewed located at a position having a near-distance or a short distance from the viewer and the viewer. That is, the half mirror is located in front of a display zone corresponding to an object to be viewed located at a depthwise near position, on a screen of a liquid crystal display element (which display zone will be hereinbelow referred to as "near-distant display zone).

Meanwhile, the total reflection mirror is located at a position where it reflects a light beam from an object to be viewed located at a position having a far depthwise distance, that is a long distance from the viewer, onto the half mirror. That is, the total reflection mirror is located at a position where it reflects a light beam from a display zone corresponding to the object to be viewed located at a position having a far depthwise distance, onto the half mirror (which display zone will be hereinbelow referred to as "far-distant display zone). Further, the total reflection mirror has a shape which can prevent the viewer from being blocked in his sight when he views the near-distant display zone.

The half mirror is capable of synthesizing an image beam from the near-distant display zone (which will be hereinbelow referred to as "a near-distant image beam) and an image beam from the far distant display zone (which will be hereinbelow referred to as "far-distance beam") on the screen of the liquid crystal display element. The far-distant image beam is viewed by the viewer after passing through the half mirror but the near-distant image beam is viewed by the viewer after being reflected by the half mirror.

The total reflection mirror is capable of reflecting an image beam radiated from the far-distant display zone on the screen of the liquid crystal display element, onto the half mirror. Thus, it is important to use a mirror having a reflection factor which is high at least with respect to the far-distant image beam as the total reflection mirror.

It is noted that a transmission liquid crystal display element which regulates the quantity of transmitted light from a backlight incorporated therein so as to display an image can be used as the liquid crystal display element. In particular, a liquid crystal display element which incorporates a polarizing plate so as to control a polarized state of a light beam incident upon a liquid crystal layer in order to display an image is desirable since it is possible to produce an image having a high contrast ratio at a relatively low drive voltage. An image beam radiated from such a liquid crystal display element is a linearly polarized beam.

With this configuration, as to the half mirror, it is desirable to use a polarized beam splitting element having such a configuration that a linearly polarized beam which is radiated from the near-distant display zone on the liquid crystal display element and is incident upon the half mirror is transmitted through the half mirror, but a linearly polarized beam having a polarization axis which is orthogonal to that of the former polarized light beam is reflected thereby. It is desirable to provide a polarization converting element for converting an image beam which is radiated from the far-distant display zone and is incident upon the half mirror into a linearly polarized image beam which can be reflected by the half mirror, between the far-distant display zone and the half mirror in order to obtain a bright image. As to the polarized light beam splitting element serving as a half mirror, there may used a birefringent reflection type polarization film disclosed in WO95/27919, a lamination composed of a cholesteric liquid crystal film laminated on its opposite surfaces with phase difference films, or a dielectric multi-layer film in which dielectric materials having different refractive indices are laminated one upon another.

As to the polarization converting element, there may be used a polarizer for rotating the polarization axis of a linearly polarized beam incident thereupon by an angle of 90 deg., or a ½ wave plate.

In particular, both half mirror and the total reflection mirror have flat reflection surfaces which are preferably arranged in parallel with each other. With this configuration, an image on the far-distant display zone can be viewed by the viewer in a shape analogous to that of an image oh the near-distant display zone even though an optical component such as a lens is not added or the reflection surface of the reflector is not curved. It is noted that although the present invention does not exclude the addition of an optical component such as a lens, and the provision of the reflection surface having an arbitrary curved shape, the above-mentioned configuration is desirable in order to materialize an inexpensive display unit having a reduced number of components.

Further, the half mirror and the total reflection mirror may be arranged in parallel with or inclined to the screen of the liquid crystal display element. Explanation will be hereinbelow made of such a configuration that the half mirror and the total reflection mirror are arranged being inclined to the screen of the liquid crystal display element by an angle of 45 deg. The angles of the half mirror and the total reflection mirror are preferably set in accordance with their use. The angles thereof will be detailed in an example which will be explained later.

Referring to FIG. 21 which is a schematic sectional view illustrating an example of the display unit according to the present invention, a half-mirror 2 and a total reflection mirror 3 are arranged being inclined to the screen of a liquid crystal display element 1 by an angle of 45 deg.

With the above-mentioned configuration, an image beam 11 radiated from a near-distant display zone in of the liquid crystal element 1 is transmitted through the half mirror 2 without being substantially reflected thereby, and is then viewed by the viewer 20. Meanwhile, an image beam 12 radiated from a far-distant display zone $1f$ of the liquid crystal display element 1 is reflected on a total reflection mirror 3, and then reflected by the half mirror 2 before it is viewed by the viewer 20.

In this configuration, under the action of a polarization converting element 4 located between the far-distant display zone $1f$ and the half mirror 2, a substantial part of the far-distant image beam 12 is converted into a linearly polarized component having a polarization axis which is rotated by an angle of 90 deg., and accordingly, the image beam 12 is reflected on the half mirror 2 by its substantial part, and is then viewed by the viewer 20.

That is, in addition to the polarized beam splitting element serving as the half mirror 2, since the polarization converting element is incorporated, both near-distant image beam 11 and far-distant image beam 12 can be viewed by the viewer with substantially no loss, thereby it is possible to obtain a bright display image with substantially no loss of the image beams.

It is noted that the far-distant display zone $1f$ is further from the viewer than the near-near distant display zone $1n$ by a distance from the total reflection mirror 3 to the half mirror 2. Thus, this display unit can display two two-dimensional images located at different depthwise positions as viewed from the viewer in a superposed condition.

In the above-mentioned configuration, the objects to be viewed having different depthwise distances as viewed from the viewer are actually arranged on one and the same plane, and accordingly, it is possible to materialize a thin display unit having an actual thickness which is smaller in the depthwise direction than a depthwise distance which is perceived by the viewer.

By the way, in the case of superposing and displaying two-dimensional images having different depthwise distances, it is possible to display an image having a three-dimensional effect if a display method can be well-designed.

In an example of the above-mentioned display method, one and the same object to be viewed are basically displayed on both far-distant display zone $1f$ and the near-distant display zone $1n$ in such a way that images displayed on both display zones are superposed with each other as they are viewed at a point on a line connecting between the right eye and the left eye of the viewer.

In this configuration, besides the brightness of two-dimensional images displayed on the far-distant display zone $1f$ and the near-distant display zone $1n$ are maintained at values the sum of which are equal to the brightness of the object to be viewed as viewed from the viewer, the brightness of a part of the object to be viewed having a depthwise far-distance as viewed from the viewer is set to be high on the far-distant display zone but is set to be low on the near-distant display zone. Further, the brightness of a part of the object to be viewed having a depthwise short distance as viewed from the viewer is set to be high on the near-distant display zone but is set to be low on the far-distant display zone.

Thus, the brightness is adjusted in accordance with a depthwise position of an object to be viewed as viewed from the viewer, that is, the viewer perceives a stereoscopic image. However, in this method, if the view point of the viewer is changed so that the relative positions of the objects to be viewed which are displayed on the far-distant display zone 1*f* and the near-distant display zone 1*n* are deviated, a satisfactory stereoscopic image cannot be viewed. Consequently, alignment marks with which the viewer can readily determine a view point at which a stereoscopic image can be satisfactorily viewed are suitably displayed on both far-distant display zone and near-distant display zone or viewable zones of the screen outside of the display zones, such as the marginal zones of the display zones.

As to the alignment marks, there may be used a combination of a cross mark and an L-like mark as shown in FIG. 8, a combination of a concentric circle and a hollow circle as shown in FIG. 9 or the like with which the positional alignment can be confirmed in both vertical and horizontal directions over omniazimuth.

It is noted that the following methods may be used in order to display an image exhibiting depthwise feeling with enhanced expressive power in a game machine, a bin-ball game machine or the like which does not desire to reproduce objects to be measured with a high degree of accuracy, other than those for medical use or enjoyment of art objects. Even with this configuration, a display image with depthwise feeling can still be maintained although the view point is shifted more or less. In this case, a plurality of objects to be viewed a plurality of display zones of the screen surface of a two-dimensional display unit or screens of a plurality of two-dimensional display units.

(1) One and the same object to be viewed is not displayed on different display zones or different screens at the same time. Further, an object located at a far distance is displayed on a display zone (for example, a far-distant display zone) or a screen corresponding to the distance, and an object to be viewed located at a near distance is displayed on a display zone (for example, a near-distant display zone) or a screen corresponding to the distance.

(2) As to an object to be viewed continuously extending between different depthwise positions, a part of the object to be viewed at a depthwise far-distance or a long distance from the viewer is displayed only on a display zone (for example, the far-distant display zone) or a screen corresponding to the depthwise distance while a part of the object to be viewed at a depthwise near-distance of a short distance from the viewer is displayed only on a display zone (for example, the near-distant display zone) or a screen corresponding to the distance. Further, a part corresponding to an intermediate position between different depthwise positions is displayed on the display zones or the screens, being darker than those other than this part. In this case, a part corresponding to a position intermediate between different depthwise positions, is continuously displayed darker and darker as it approach to the intermediate position. That is, it is desirable to display the part whose the brightness is continuously lowered so as to prevent the viewer from perceiving unnatural feeling.

(3) In the case of superposition of objects to be viewed located at different depthwise positions, a part of an object to be viewed at a relatively far-distance position, which is covered with an object to be viewed at a relatively near-distant position is displayed on a screen or a display zone for displaying the object to be viewed at the relatively far-distant position in such a way that a part corresponding to the area which is covered with the object to be viewed at the relatively near-distance position is dark at least in a part thereof. In this case, the covered part is displayed being continuously darkened from the peripheral part to the center thereof. That is, it is desirable to display the part whose the brightness is continuously lowered so as to prevent the viewer from perceiving unnatural feeling.

Further, it is preferable to positively utilize a psychological factor of depthwise perception. For example, there may be used a display method for exhibiting depthwise feeling, such as an aerial perspective process in which the one near to the viewer is distinctly displayed while the one far from the viewer is indistinctly displayed, a linear perspective process in which, for example, a road going far away can be viewed being narrower and narrower in its width or a process in which pattern gradation or chiaroscuro is set in view of as such a fact as the longer the distance, the higher the densities of elements constituting the pattern.

With suitable utilization of these psychological factors and the above-mentioned methods (1), (2) and (3), it is possible to materialize a display unit which can maintain a display image having depthwise feeling even thought the view point is shifted more or less.

Further, according to the present invention, there can be provided a display unit with which depthwise feeling can be naturally perceived due to eye focus adjustment, stypsis, binocular parallax or the like which are psychological factors of perception of depthwise feeling, in order to superpose and display objects to be viewed having actually different depthwise distances.

Further, there can be provided, according to the present invention, a thin display unit having an actual depthwidth length which is less than a depthwise distance perceived by the viewer since the objects to be viewed are located in one and the same plane in the display unit. Further, according to the present invention, the number of components is reduced since the objects to be displayed are arranged in a single two-dimensional display element.

It may be considered that the display unit according to the present invention can be used for not only game machines such as pinball game machines or the like, but also for visual acuity training machines since the display unit according to the present invention can change-over the position of display of an object to be viewed into an arbitrary position having a different depthwise (position) distance.

That is, if a position where an image is displayed is changed over as viewed by the viewer, the viewer adjusts his ophthalmic focus point every time when the position of the image display position is changed, it is conceivable that the function of adjustment of ophthalmic focus point, that is, the visual acuity can be trained.

The objects, features and advantages of the present invention, other than those described above will be apparent in view of explanation of preferred embodiments which will be made hereinbelow with reference to the accompanying drawings wherein:

DESCRIPTION OF PREFERRED EMBODIMENTS

Figure 1:
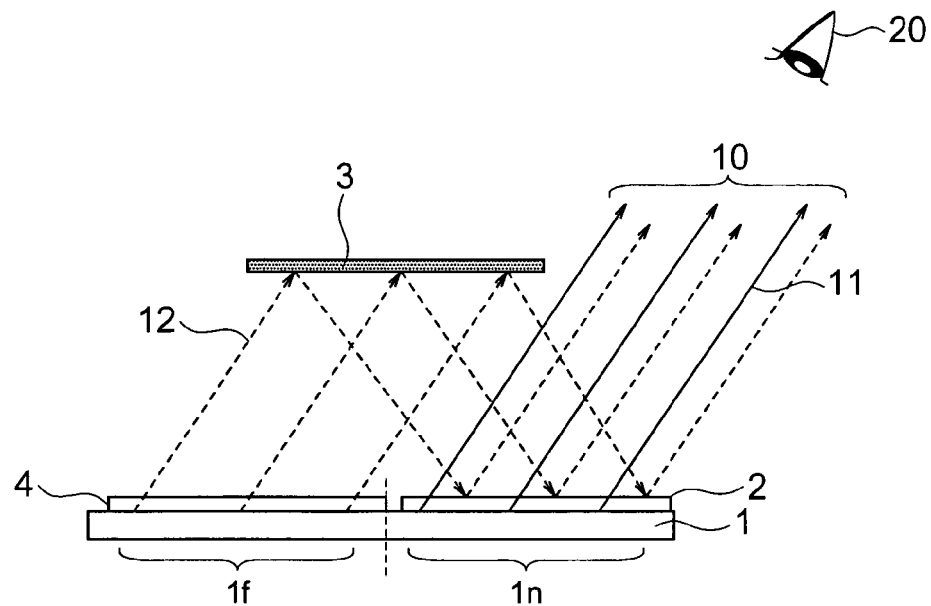
FIG. 1 is a schematic sectional view illustrating a display unit in an embodiment 1 of the present invention.
Figure 2:
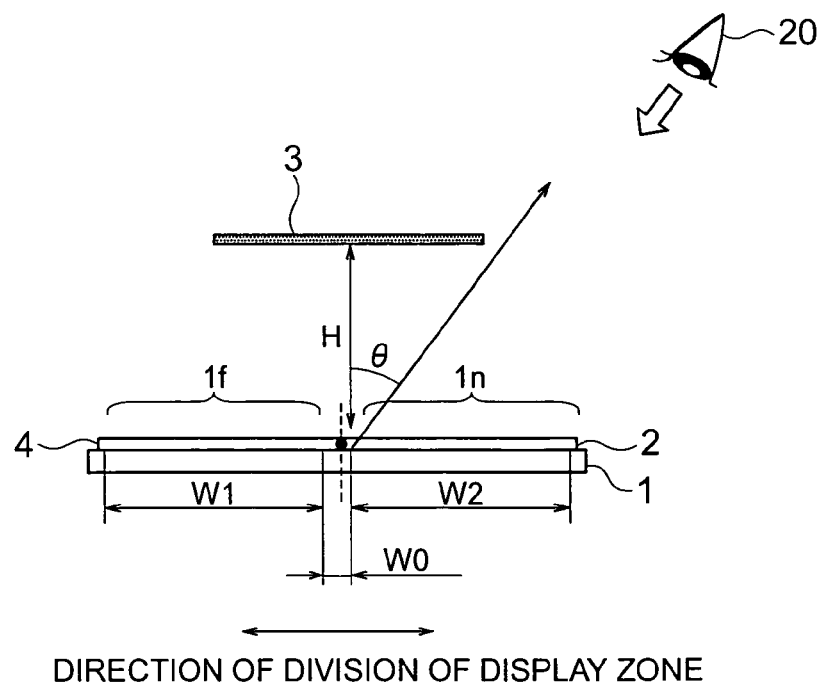
FIG. 2 is a schematic sectional view illustrating the display unit as shown in FIG. 1.
Figure 3:
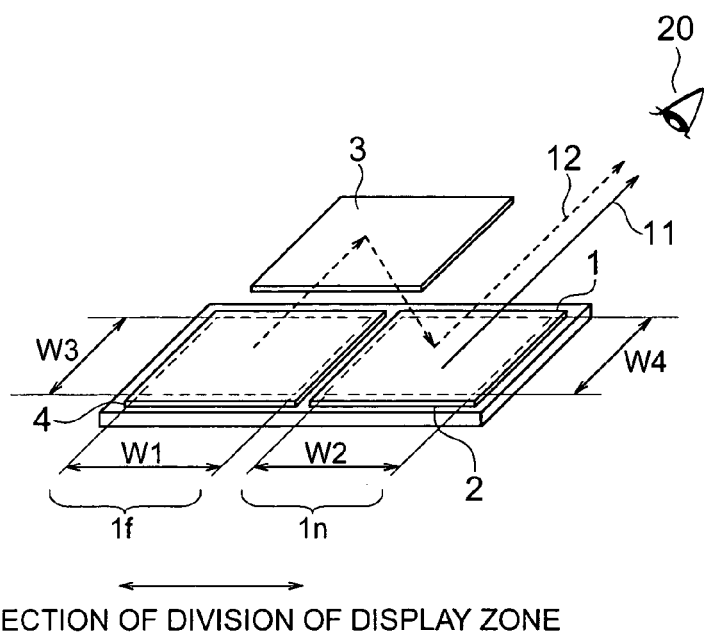
FIG. 3 is a schematic perspective view illustrating the display unit as shown in FIG. 1.

Explanation will be hereinbelow made of a first embodiment of the present invention with references to FIGS. 1 to 3 in which FIGS. 1 and 2 are schematic sectional views illustrating a display unit in an embodiment 1 of the present invention, and FIG. 3 is a schematic perspective view also illustrating the display unit in the first embodiment 1.

This display unit is adapted to optically superpose and display two objects to be viewed having different depthwise distances as viewed from the viewer, and comprises a display element 1, a half mirror 2, a total reflection mirror 3 and a polarized beam converting element 4. It is noted that the present invention is essential in the optical configuration of the display unit, and accordingly, explanation of a signal system, an electric system, a mechanism system and a structure supporting these system will be omitted.

The display element 1 displays thereon an image based upon image data, having a screen functioning as two objects to be viewed located at different depthwise positions as viewed from the viewer 20. Thus, the screen of the display element 1 has two display zones corresponding to the two objects to be viewed. That is, it has a display zone 1n corresponding to an object to be viewed at a near depthwise position as viewed from, the viewer (which will be referred to as "a near-distant display zone 1n"), and a display zone 1f corresponding to an object to be viewed at a far-distant position as viewed from the viewer (which will be referred to as "a far-distant display zone 1f").

Since the display element 1 preferably is thin and lightweight, the use of a liquid crystal display element, an organic electroluminescence display element as the display element is desirable in view of thinning the display unit in its entirety. Further, it is desirable that the display element 1 emits polarized beams as image beams in order to reduce loss, as small as possible, caused by synthesis of two image beams through the half mirror 2, and accordingly, a liquid crystal display element is preferably used as the above-mentioned display element 1. In this embodiment, a liquid crystal display element is thus used as the display element 1, and accordingly, reference numeral 1 will be also used to denote the liquid crystal display element 1.

The liquid crystal display element is composed of a backlight and a liquid crystal display panel for adjusting a transmitted quantity of light radiated from the backlight so as to display thereon in an image. There can be used, as the liquid crystal display element 1, a TN (Twisted Nematic) type liquid crystal display element, an STN (Super Twisted Nematic) sype liquid crystal display element or an ECB (Electronic Controlled Birefringence) type liquid crystal display element. There may be also used an IPC (In Plane Switching) system liquid crystal display element, a VA (vertical Aligned) type liquid crystal display element. Each of the above-mentioned liquid crystal display elements has an polarizing plate for controlling the polarization of light incident upon a liquid crystal layer so as to effect image display, and further, can display an image having a high contrast ratio with a relatively low drive voltage.

Figure 4:
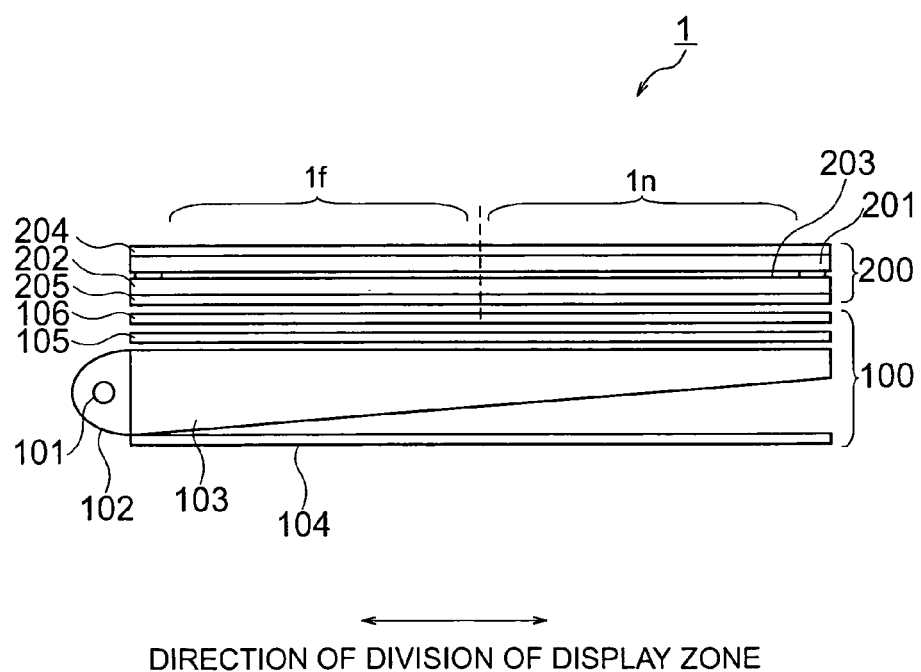
FIG. 4 is a schematic sectional view illustrating a liquid crystal element in the display unit shown in FIG. 1.

Referring to FIG. 4 which is a schematic sectional view illustrating the liquid crystal display element 1 which is of an IPS type although the present invention should not be limited to thereto, the liquid crystal display element 1 is composed of a liquid crystal display panel 200 and a backlight 100 located at the rear surface of the liquid crystal display panel 100.

The backlight 100 illuminates display zones in the liquid crystal display panel 200, and is of an edge light type (light conductor type) a direct type (reflector type) or a planar light source type or the like. As the backlight 100, an appropriate one may be selected among various types including the above-mentioned types in view of its use, its object and its display zone size. Explanation will be hereinbelow made of a liquid crystal display element having an edge light type backlight although the present invention should not be limited to this backlight.

The backlight 100 is composed of a light conductor 103 made of transparent resin and formed on its rear surface with a light transmitting direction changing means formed by dot-printing with white pigment, a fine concave and convex pattern, a lens pattern or the like, a light source 101 located at one end face of the light conductor 103, a reflection sheet 104 applied on the rear surface side of the light conductor 103 and optical films 105, 106 applied on the front surface side of the light conductor 103 and formed of a prism sheet, a diffusion sheet or the like.

As the light source, a linear light source such as a cold-cathode tube or a hot-cathode tube, a dot-like light source such as LEDs or the like may be used. In this embodiment, explanation will be made of the configuration using a cold-cathode tube as the light source 101 although the present invention should not be limited to this configuration alone.

If the cold-cathode tube is used as the light source 101, a lamp cover 102 is preferably be provided to cover the light source 101 in order to efficiently introduce light from the light source 101 into the light conductor 103.

In this configuration, light emitted from the light source 101 is incident directly upon the light conductor 103, or is reflected by the lamp cover 102 before it is incident upon the light conductor 103. After the light is incident upon the light conductor 103, it transmits through the light conductor 103 with repetitions of total reflections, but when it comes to the light transmitting direction changing means, its transmitting direction is changed so as to emerge from the outer surface of the light conductor 103. The light emitted from the outer surface of the light conductor 103 is irradiated onto the liquid crystal display panel after its distribution of emergent angles and its brightness distribution in a plane are adjusted by an optical film such as a prism sheet or a diffusion sheet.

The liquid crystal panel 200 is composed of a first transparent substrate 201 and a second transparent substrate 202 which are made of optically isotropic flat glass or plastic, The transparent substrate 201 is laminated thereover with a color filter and an oriented film made of polyimide group polymer (which are not shown). The second transparent substrate 202 is laminated thereover with an oriented film, and is formed thereon with electrodes, signal electrodes and switching elements such as thin film transistors and the like which constitute pixels (which are all not shown).

Figure 5:
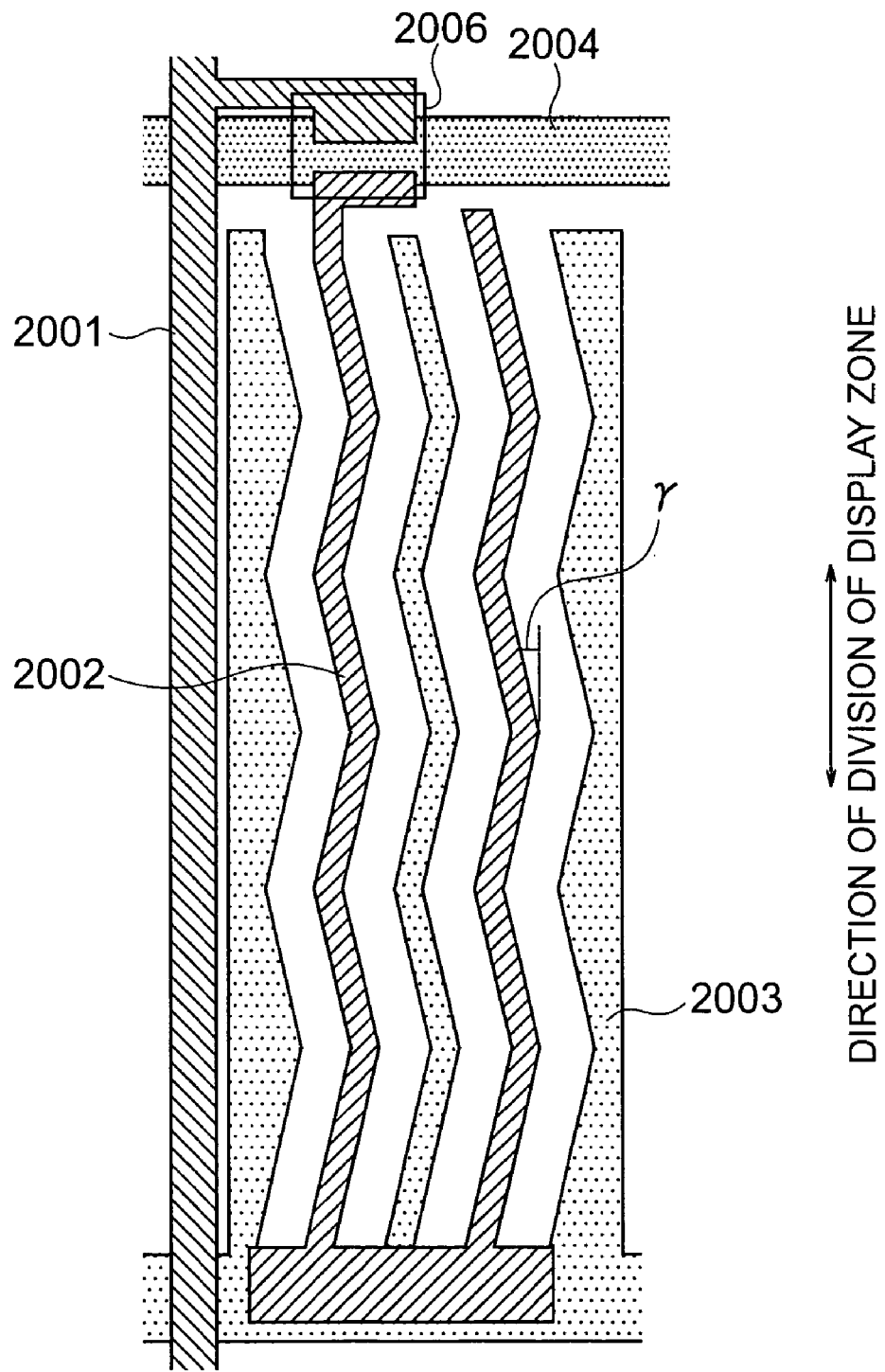
FIG. 5 is a front view illustrating a configuration of a pixel of a liquid crystal display panel according to the present invention.

Referring to FIG. 5 which is a schematic front view illustrating one of the pixels in the liquid crystal display panel 200 in this embodiment, the one pixel in the liquid crystal display panel 200 is composed of a common electrode 2003 and a scanning signal electrode 2004 which are formed on the transparent substrate 202, and an image signal electrode 2001 and a pixel electrode 2002 which are formed in an upper layer formed one the former electrodes through the intermediary of a gate insulation film which is not shown, and a TFT (Thin Film Transistor) 2006 formed of an amorphous or polycrystal Si film or the like.

Further, the pixel electrode 2002 is partly overlapped with the common electrode 2006 so as to obtain a retention capacitance. The common electrode 2003 and the pixel electrode 2002 divide the one pixel into four zones, having a zigzagging shape while they define therebetween a substantially constant space. Further, an inclined angle γ of the zigzagging shape of the common electrode 2003 and the pixel electrode 2002 with respect to the dividing direction of the display zones on the screen of the liquid crystal display element is about ±10 deg. Further, a protecting layer as an upper layer is formed thereon, and is formed thereover with an oriented film.

The two transparent substrates 201, 202 are mated with each other through the intermediary of a space which is not shown, with their surfaces on which the oriented films are formed being face-to-face, so as to define therebetween a substantially constant gap, and then, their outer peripheries are joined to each other by means of a frame-like seal. Thus, an internal space is defined between the two transparent substrates 201, 202. Nematic liquid crystal having a positive dielectric anisotropy is enclosed in the space and is sealed. Thus, a liquid crystal-layer 203 is formed.

The direction of orientation of the longitudinal axes of liquid crystal molecules in the liquid crystal layer 203 is regulated by the orientating process applied to the oriented films which are formed on the two transparent substrates 201, 202. The so-called homogenous orientation is effected so that the direction of orientation of the liquid crystal layer 203 are not twisted between the two transparent substrates 201, 202.

Polarizing plates 204, 205 are laid respectively on the front surface of the transparent substrate 201 and the rear surface of the transparent substrate 202.

Figure 6:
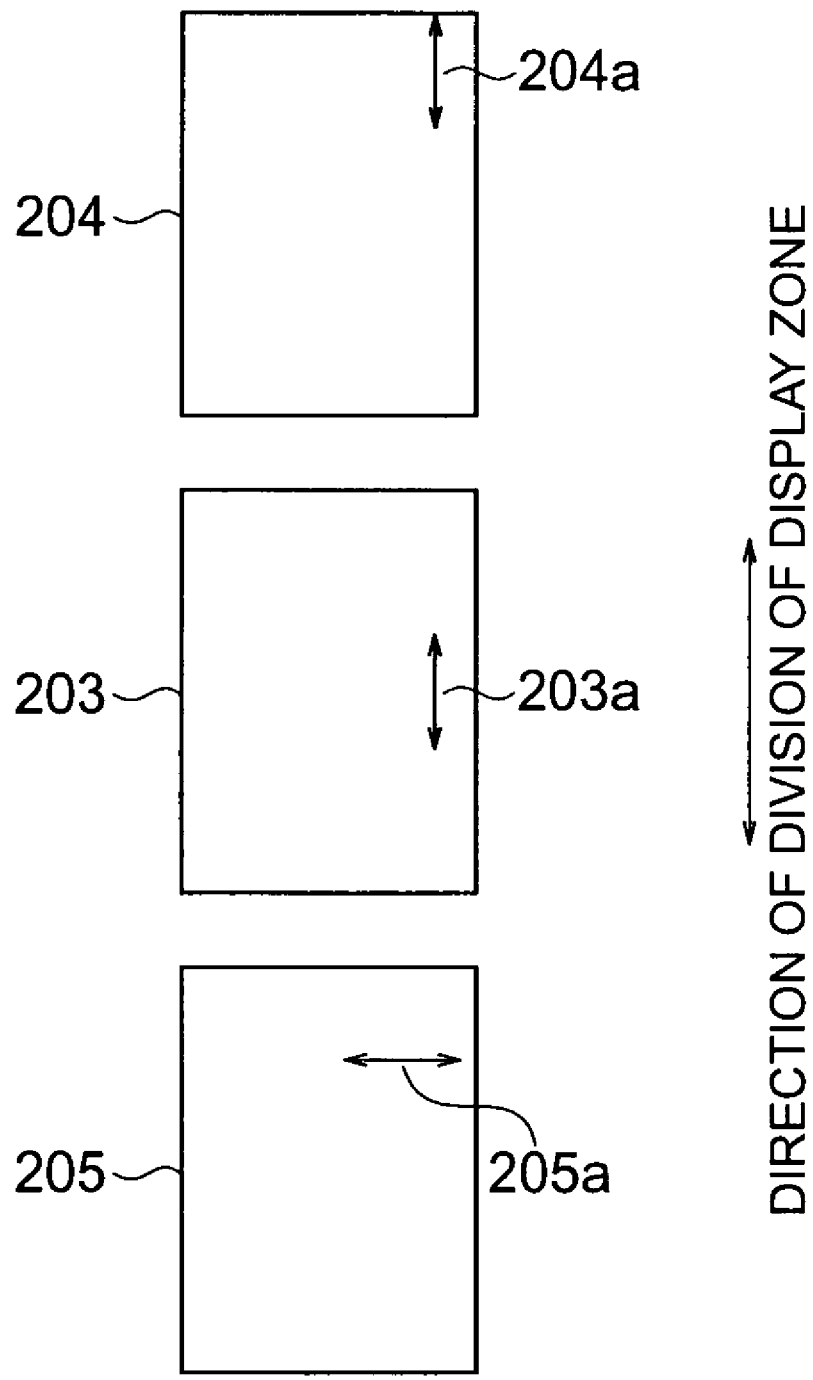
FIG. 6 is a view for explaining an example of a transmission axis of an linear polarized beam of a member in the display unit shown in FIG. 1 and a direction of orientation of a liquid crystal layer.

FIG. 6 is a view illustrating an example of relationship among the transparent axes of linearly polarized beams in the polarizing plates 204 and 205 and the direction of orientation of the longitudinal axes of liquid crystal molecules in the liquid crystal layer 203.

Explanation will be hereinbelow made of such a configuration that the direction 203a of orientation of the liquid crystal layer is in parallel with the direction of division of the display zones, and the axis 204a of transmission of a linear polarized beam in the polarizing plate 204 is in parallel with the direction 203a of orientation of the liquid crystal layer while the axis 205a of transmission of a linear polarized beam in the polarizing platen 205 is orthogonal to the direction 203a of orientation of the liquid crystal layer 203.

It is noted that the axes of the transmission of the linear polarized beams in the polarizing plates 204, 205 may be both rotated by an angle of 90 deg. with respect to the direction exemplified in FIG. 6.

Each of the polarizing plates 204, 205 may be composed of, for example, a film which is composed of stretched polyvinyl alcohol adsorbed thereto with iodine so as to have a polarizing function, and protecting layers made of triacetyl cellulose and which is applied on its opposite surfaces with protecting layers made of triacetyl cellulose. It is noted that the polarizing plates 204, 205 are bonded respectively to the transparent substrate 201 and the transparent substrate 202 by means of a transparent adhesive.

The light from the backlight 100 transmits through the polarizing plate 205 and then through the liquid crystal layer 203, and is thereafter incident upon the polarizing plate 204. In this case, by applying a voltage corresponding to an image data delivered from the an image data generating portion (which is not shown) between the common electrode and the pixel electrode, the polarized state of the light transmitted through the liquid crystal layer 203 is changed so as to control the quantity of light transmitting through the polarizing plate. Thus, a desired image beam consisting of linearly polarized light and passing through the polarizing plate 204 can be obtained.

The continuous single screen of the liquid crystal display element 1 is conveniently divided into the near-distant display zone 1n and the far-distant display zone 1f so as to obtain two objects to be viewed. With this configuration, two objects to be viewed having different depthwise distances can be materialized with one and the same display element, thereby it is possible to reduce the number of components. Further, since the two objects to be viewed are located in one and the same plane, there may be offered such an advantage that a thin display unit having a short depthwise length as viewed from the viewer can be materialized.

In this embodiment, the half-mirror 2 has such a function that an image light beam 11 (which will be hereinbelow referred to as "near-distant image beam" from the near-distant display zone 1n of the liquid crystal display element 1, and an image beam 12 (which will be hereinbelow referred to as "far-distant image beam) from the far-distant display zone 1f are synthesized. Further, the total reflection mirror 3 has such a function that the far-distant image beam 12 emitted from the far-distant display zone 1f of the liquid crystal element 1 is reflected to the half-mirror 2. Thus, in order to obtain a light image, the total reflection mirror 3 desirably has a high reflection factor with respect to the far-distant image beam which is incident thereupon.

In this embodiment, explanation will be made of such a configuration that both half mirror 2 and total reflection mirror 3 have planar reflection surfaces which are arranged so as to be in parallel with each other. In view of this configuration, the viewer can view an image on the far-distant display zone and an image on the near-distant display zone in a similar figure with no addition of optical components such as lenses, with no use of a half mirror and a total reflection mirror having curved reflection surfaces or without changing the shapes of the far-distant display zone and the near-distant display zone. It is noted that the present invention should not exclude the addition of optical components such as lenses and the use of a half mirror and a total reflection mirror having arbitrarily curved reflection surfaces although the above-mentioned configuration is preferable in view of the provision of a display unit having a reduced number of components and reduced costs.

The half mirror 2 and the total reflection mirror 3 may be arranged either in parallel with or oblique to the screen of the liquid crystal display element 1. In this embodiment, explanation will be made of the configuration in which the half mirror 2 and the total reflection mirror 3 are arranged in parallel with the screen of the liquid crystal display element 1.

In this configuration, the half mirror 2 is located in front of the near-distant display zone of the liquid crystal display element 1. In this embodiment, explanation will be made, in particular, of such a case that the half mirror 2 is made into close contact with the screen of the liquid crystal display element 1. The half mirror 3 may have such a size of necessity minimum that it can cover the near-distant display zone 1n. If the display unit is assembled with a high degree of accuracy, the half-mirror may have the same size as that of the near-distant display zone so that the component has a size of necessary minimum, resulting in cost reduction. Incidentally, it is practical if the size of the half mirror 2 is set to be larger than that of the near-distant display zone 1 more or less in view of deviation in alignment.

The arrangement position of the total reflection mirror 3 will be explained with reference to FIGS. 2 and 3.

In this embodiment, it is estimated that the viewer views the screen of the liquid crystal display element in a direction inclined by a predetermined angle (which will be referred to as "viewing angle"), which is parallel with the direction of the division of the display zones within an azimuth toward the near-distant display zone 1n with respect to a direction perpendicular to the screen of the liquid crystal display unit 20.

In this configuration, the total reflection mirror 3 is located such that it does not obstruct the near-distant display zone 1n as viewed from the viewer 20, and further, the near-distant display zone 1n and the far-distant display zone 1f can be seen being superposed with each other through the intermediary of the half mirror 2, as viewed from the viewer 20.

If the half mirror 2 is located, being made into close contact with the screen of the liquid crystal display element 1, the reflection surface of the half mirror 2 is located in extreme proximity with the screen of the liquid crystal display element 1. Estimating that the reflection surface of the half-mirror 2 and the screen of the liquid crystal display element 1 are located in one and the same plane, the viewer 20 can view an image on the far-distant display zone through the half-mirror 2 if the hollowing formula (1) is satisfied, $$H = (W0 + W1)/2/\tan\theta \quad (1)$$

where H is a shortest distance from the reflection surface of the half-mirror 2 to that of the total reflection mirror 3, θ is a viewing angle, W1 is a width of the far-distance display zone 1f in the direction of division of the display zones, and W0 is a distance of the gap between the far-distant display zone 1f and the near-distant display zone 1n.

For example, if W0+W1=100 mm and θ=35 deg., so H=about 71.4 mm, thus, the viewer 20 can view an image on the far-distant display zone 1f through the half-mirror 2.

However, it is noted that since the screen of the viewer 20 and the reflection surface of the half-mirror 2 are not completely present in one and the same plane, in consideration with a definite distance between the reflection surface of the half-mirror 2 and the screen of the liquid crystal display element 1, an image on the far-distant display zone 1f can be seen through the half-mirror 2 if the following formula (0.2) is satisfied:

$$H \geqq (W0+W1)/2/\tan\theta \qquad (2)$$

In this case, the end part (the right side end part in the figure) of the total reflection mirror 3 on the near-distant display zone 1n side should be located at a position where it does not obstruct the viewer who views the near-distant display zone 1n. Further, the reflection surface of the total reflection mirror 3 may have such a size that is greater than at least that of the far-distant display zone 1f. However, if the total reflection mirror 3 is aligned with the far-distant display zone 1f with a high degree of accuracy, its size can be set to be equal to that of the far-distant display zone 1f, and accordingly, the areas of the components can be reduced to a necessary minimum, thereby it is possible to reduce the costs. However, it is practical that the reflection surface of the total reflection mirror 3 has such a size that is slightly greater than that of the far-distant image display zone 1f in view of deviation in alignment.

The near-distant image beam 11 is viewed by the viewer 20 through the half mirror 2. Further, the far-distant image beam 12 is viewed by the viewer 20, after being reflected by the half mirror 2. Thus, in order to obtain a bright image for the viewer, it is desired that the half-mirror 2 has a high transmission factor for the near-distant image beam 11 which is incident thereupon while it has a high reflection factor for the far-distant image beam 12.

Thus, according to the present invention, as the half-mirror 2, there is used a polarized beam splitting element for splitting an image beam which is incident thereupon into two beams having polarizations which are different depending upon reflection and transmission. In other words, the polarized beam splitting element has such a function that light beams having different polarizations which are incident thereupon in two directions are synthesized through transmission and reflection in one direction.

In this embodiment, since the liquid crystal display element 1 emits linearly polarized beams as image beams, there is used, as the half mirror 2, a polarized beam splitting element which transmits therethrough a linearly polarized beam component emitted from the liquid crystal display element 1, but which reflects a linearly polarized beam component having an axis of polarization orthogonal to an axis of polarization of the former beam.

In this case, since a bright image can be obtained due to the use of the polarized beam splitting element, it is required that the polarized beam splitting element inevitably has a transmission factor for a predetermined linearly polarized beam and a reflection factor for a linearly polarized beam having an axis of polarization orthogonal to that of the former polarized beam, which are in total greater than 100%. Further, in order to completely eliminate a loss in an image beam at the half mirror, the polarized beam splitting element has a transmission factor for a predetermined linearly polarized beam and a reflection factor for a linearly polarized beam having an axis of polarization orthogonal to that of the former beam, which are in total greater than 200%.

Thus, the sum TR % of a transmission factor of the polarized beam splitting element for a predetermined linearly polarized beam and a reflection factor for a linearly polarized beam having an axis of polarization orthogonal to that of the former beam should be 100%<TR %≦200%. Thus, as the half-mirror 2, a polarized beam splitting element having the above-mentioned TR % should be used.

It is noted that since polarized beam splitting elements are expensive in comparison with half-mirrors which are not polarized beam splitting elements, a polarized beam splitting element having a TR %, which is 160%<TR %≦200% is preferably used in view of a cost effective ratio. In this case, since the brightness of the near-distant display zone 1n and that of the far-distant display zone 1f are set to be substantially equal to each other, the transmission factor of the polarized beam splitting element for a predetermined linearly polarized beam and the reflection factor thereof for a linearly polarized beam having an axis of polarization orthogonal to that of the former beam are both preferably set to a substantially equal value which is not less than 80%.

It is noted that explanation will be hereinbelow made of such a configuration that the polarized beam splitting element is used as the half-mirror 2, and accordingly, the reference numeral 2 which denotes the half mirror is also used to denote the polarized beam splitting element.

The polarized beam splitting element 2 transmits a linearly polarized beam emitted from the liquid crystal display element 1 but reflects a linearly polarized beam having an axis of polarization orthogonal to that of the former beam.

There may be used, as the polarized beam splitting element, a birefringent reflection type polarizing film composed of a plurality of polymeric film having birefringence which are laminated one upon another as disclosed in JP-A-2003-57595; a cholesteric liquid crystal film and phase films which are applied respectively on the front and rear surfaces of the former, a dielectric multi-layer film formed of dielectric materials having different refractive indices and laminated one upon another, a polarizing filter formed of a metal wire grid or the like.

As to the birefringent reflection type polarizing film, a film DBEF (trade name) manufactured by 3M Co., (U.S.A), which transmits therethrough a predetermined linearly polarized component of a beam incident thereupon but reflects thereupon a linearly polarized component having an axis of polarization orthogonal to that of the former component, is commercially available. This film can be used as the polarized film splitting element 2. It is important to use the one which is not subjected to an image blurring process such as a mat process in order to obtain a clear sharp image.

In the case of using the one composed of a cholesteric liquid crystal film and phase films laminated respectively on the front and rear surfaces of the former as to the polarized splitting element 2, as the phase film which is arranged on the rear side of the cholesteric liquid crystal film, that is, on the liquid crystal display element 1 side, there is used the one which changes an image beam emitted from the liquid crystal display element 1 into an elliptically polarized beam (including a circularly polarized beam) transmitting through the cholestric liquid crystal film. Meanwhile, as the phase film arranged on the front side of the cholesteric liquid crystal display element, that is, on the viewer side, there is used the one which changes an image beam emitted from the far-distant display zone 1f and then reflected on the total reflection mirror 3, into an elliptically polarized beam (including a circularly polarized beam) reflecting on the cholesteric liquid crystal film.

The cholesteric liquid crystal exhibits a peculiar optical characteristic based upon a helical molecular disposition, that is, a beam which incident thereupon at a slightly oblique angle with respect to the helical molecular axes exhibits selective reflection depending upon a winding direction of cholesteric helix, that is, an elliptically polarized beam is reflected in one winding direction but is transmitted in the other winding direction. A wavelength range of the selective reflection is determined in accordance with pitches of the molecular disposition, and accordingly, in order to allow the selective reflection to occur over the entire visible wavelength range, it is required to laminate a plurality of cholesteric liquid crystal layers having different pitches of molecules. Alternatively, there may be used a cholesteric liquid crystal in which pitches of the molecules are continuously changed, as disclosed in Asia Display 95 Digest, page 735, The Institute of Television Engineering of Japan (ITE) & The Society for Information Display (SID).

The polarized beam splitting element formed of the dielectric multilayer film is composed of a transparent substrate and dielectric thin films having different refractive indices laminated on the former. There may be used a prism type and a planar plate type.

The polarizing filter formed of a metal wire grid is composed of a transparent substrate formed thereon with a metal wire pattern composed of an array of conductive metal wires made of silver, aluminum, chrome or the like, having pitches of one thousand and several hundred angstroms, and accordingly, if the transparent substrate is planar, a planar plate type polarized beam splitting element can be materialized.

It is noted that the following points should be taken care of, if the birefringent reflection type polarizing film, or the cholesteric liquid crystal film is used as the polarized beam splitting element 2:

Since the film-like polarized beam splitting element 2 has a low degree of flatness as it is, should it be merely laid over the front surface of the liquid crystal display element 1, an image would be warped due to deformation of the film. Thus, in the case of using a film-like member as the polarized beam splitting element, it is bonded through the intermediary of a transparent adhesive onto an optically isotropic transparent substrate such as a glass substrate or a plastic substrate which is highly rigid and flat in order to adhesively secure the film to the substrate, thereby it is possible to prevent the film from being deformed. Alternatively, without using an additional transparent substrate for securing the polarized beam splitting element 2, the polarized bean splitting element may be adhesively secured to the liquid crystal display element 1 through the intermediary of a transparent adhesive.

A polarized beam changing element is located in an optical path through which an image beam emitted from the far-distant display zone 1f is led to the polarized beam splitting element 2 by way of the total reflection mirror 3. The polarized beam changing element is adapted to change an image beam which is emitted from the far-distant display zone and which is incident upon the polarized beam splitting element 2, into a polarized beam reflected by the polarized beam splitting element 2.

In this embodiment, such a configuration that the polarized beam changing element 4 is made into close contact with the front surface of the far-distant display zone 1f will be explained. In this case, the polarized beam changing means 4 is adapted to change a linearly polarized beam emitted from the far-distant display zone 1f, into a linearly polarized beam having an axis of polarization turned by 90 deg. That is, as the polarized beam changing element 4, there may be used a rotary polarizer or a ½ wavelength plate which turns the axis of polarization of a linearly polarized beam incident thereupon by an angle of 90 deg. In this case, the polarized beam changing element 4 may have such a necessary minimum size that it can cover the far-distant display zone 1f as viewed from the viewer 20. In such a configuration that the polarized beam changing element 4 is laid in parallel with the screen of the liquid crystal display element 1, and is set with a high degree of accuracy, its size may be equal to that of the far-distant display zone 1f, and accordingly, the areas of the components can be reduced to necessary minimum sizes, thereby it is possible to reduce the costs. However, it is practical that the size of the polarized beam changing element 4 has a size which is slightly larger than that of the far-distance display zone 1f due to deviation in alignment.

As the polarized beam changing element 4, there may be used a liquid crystal cell in which a liquid crystal layer is enclosed between two transparent substrates which have been subjected to orientating treatment, and the longitudinal axes of molecules of liquid crystal are twisted by an angle of 90 deg. In this case, a liquid crystal cell materializing the polarized beam changing element 4 is constituted so as to satisfy a condition of a waveguide for the far-distant image beam 12. The condition of a waveguide is disclosed in a report by C. H. Gooch and H. A. Tarry, J. Phys. D, Appl. Phys. Vol. 8 (1975) pages from 1,575 to 1,584.

Since the condition of the waveguide does not vary between an abnormal light mode and a normal light mode, the direction of orientation of the longitudinal axes of molecules of the liquid crystal on the liquid crystal display element side of the liquid crystal cell used as the polarized beam changing element 4 may be either parallel with or orthogonal to the transmitting axis of the linearly polarized beam through a polarizing plate 204 of the liquid crystal display element 1. In addition, there may be used a ½ wavelength plate or a twisted structure obtained by laminating phase difference films, as the polarized beam changing element.

As the ½ wavelength plate, a phase difference film made of a uniaxially drawn polymer such as polyvinyl alcohol, polycarbonate, polysulphone, polystyrene, polyarylate or norbornene group resin and having a high transmission factor in a visible wavelength range may be sued. In addition, there may be used mica, quartz, a liquid crystal layer in which the longitudinal axes of molecules are arranged uniformly in one direction or the like.

Incidentally, it is, in general, difficult to constitute a phase difference plate serving as the ½ wavelength plate over a wide wavelength range with the use of a single phase difference plate due to a wavelength dependency (which will be referred to as "wavelength dispersion") of a refractive index of a material from which the ½ wavelength plate is formed. Thus, there may be used the one which is composed of at least two kinds of phase difference plates having different wavelength dispersions and mated together with their optical axes being orthogonal to each other so as to serve as a ½ wavelength plate over a wide wavelength range. Alternatively, there may be used a polymer film having a nature of the so-called anomalous dispersion, that is, the shorter the wavelength, the higher the refractive index. A twisted structure formed of a lamination of phase difference films, is materialized by laminating phase difference films having a phase difference of ½ wavelength one upon another with their optical axes being consecutively shifted. As the phase difference film, the above-mentioned polymer film used for the ½ wavelength plate may be used. It is noted that the polarized beam changing element as exemplified above, performs most effectively for a light beam which is incident thereupon, perpendicular thereto. Accordingly, additional consideration should be made whenever the viewing angle θ does not become zero deg, even when the half-mirror (polarized beam splitting element) 2 and the total reflection mirror 3 are arranged in parallel with the screen of the liquid crystal display element 1 as in this embodiment.

Figure 7:
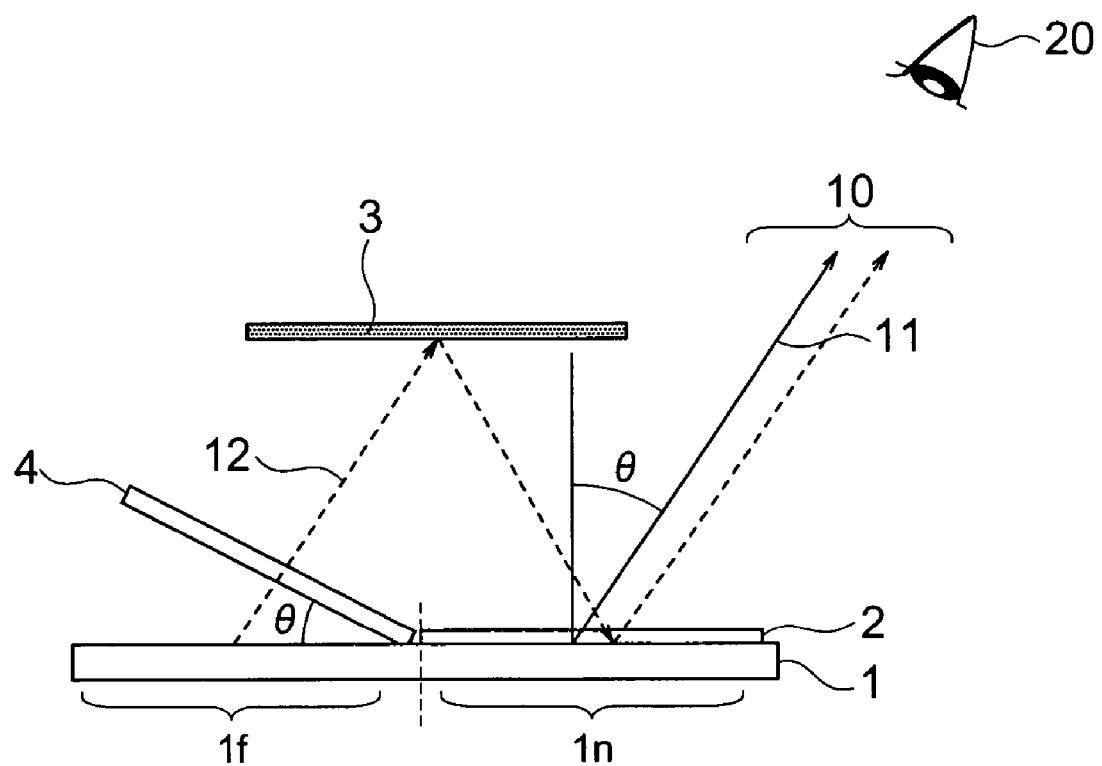
FIG. 7 is a schematic sectional view for explaining the display unit shown in FIG. 1.

That is, in the case of using a ½ wavelength plate or a twisted structure consisting of the above-mentioned rotary polarizer, a uniaxially drawn phase difference film or the like as the polarized beam changing element, as exemplified in FIG. 7, it is desirable to arrange the polarized beam changing element 4 in such a way that it is inclined to the screen of the liquid crystal display element by an angle θ equal to a viewing angle θ to be viewed by the viewer. It is noted here that FIG. 7 is a schematic sectional view illustrating the liquid crystal display unit in the embodiment of the present invention.

In this case, since the far-distant image beam 12 emitted from the far-distant display zone 1f is incident upon the polarized beam changing element 4, perpendicular thereto, the polarized beam changing element 4 which is materialized by the ½ wavelength plate or the twisted structure formed of the above-mentioned rotary polarizer or uniaxially drawn phase difference film can effectively perform. Further, in the case of arranging the polarized beam changing element 4 with being inclined by the angle θ, to the screen of the liquid crystal display element 1, the necessary minimum size of the polarized beam changing element 4 can be reduced by a multiple of cos θ in comparison with such a case that it is laid in parallel with the screen of the liquid crystal display element 1.

It is noted that, as shown in FIGS. 1 to 3, the present invention should not exclude such a case that the polarized beam changing element is laid in parallel with the screen of the liquid crystal display element 1. Even though the ½ wavelength plate or the twisted structure consisting of the above-mentioned rotary polarizer or the uniaxially drawn phase difference film, is used as the polarized beam changing element, the polarized beam changing element can perform effectively if the viewing angle θ is small.

However, should the viewing angle becomes large, the performance of the polarized beam changing element 4 would become lower, resulting in lowering of the reflection factor of the half mirror (polarized beam splitting element) 2 for the far-distant image beam 12, and accordingly, the brightness of the far-distance image beam viewed by the viewer 20 would be lowered. Accordingly, in this case, it is preferable to use a polarized beam changing element which can perform effectively for an incident angle θ of a light beam. Such a polarized beam changing element may be formed of a biaxially anisotropic phase difference film in the case of using, for example, the ½ wavelength plate.

It is noted that if the polarized beam changing element 4 is laid in parallel with the screen of the liquid crystal display element 1, by adhesively securing the polarized beam changing element 4 on the screen of the liquid crystal display element 1 through the intermediary of a transparent adhesive or the like, no extra holding components are required, thereby it is possible to reduce the number of components.

The total reflection mirror 3 has such a performance that it reflects the far-distant image beam 12 emitted from the far-distant display zone 1f of the liquid crystal element 1 onto the half mirror 2. Thus, it is important for obtaining a bright image to use a mirror having a high reflection factor at least for the far-distant image beam 12, as the total reflection mirror 3.

As the total reflection mirror 3, there may be used a mirror in which a reflection surface which is formed of a highly reflective metal film such as a silver or aluminum film or a dielectric multi-layer film, formed on an optically isotropic transparent planar plate made of glass.

Alternatively, there may be used a polarized beam reflection mirror for reflecting a polarized component corresponding to the far-distant image beam 12 which is incident upon the total reflection mirror 2. As the polarized beam reflection mirror, a polarized beam splitting element similar to the half-mirror may be used.

Next, explanation will be hereinbelow made of operation of the display unit in this embodiment. With the configuration as stated above, the near-distant image beam 11 emitted from the near-distant display image zone 1n of the liquid crystal display element 1 is transmitted through the half-mirror (polarized beam splitting element 2) with substantially no reflection thereon, and is then viewed by the viewer 20. Meanwhile, the far-distant image beam 12 emitted from the far-distant display zone 1f of the liquid crystal display element 1 is changed into a linearly polarized beam having an axis of polarization which is turned by an angle of 90 deg, when it transmits through the polarized beam changing element 4, and it is reflected substantially at the half-mirror (polarized beam splitting element) 2 after it is reflected by the total reflection mirror 3, and is then viewed by the viewer 20.

That is, with the use of the polarized beam splitting element as the half mirror 2, the near-distant image beam 11 and the far-distant image beam 12 can be both viewed by the viewer 20 with substantially no loss, thereby it is possible to obtain a bright image. In this phase, the far-distant display zone 1f has a longer distance, as viewed from the viewer, corresponding to the sum of the distance from the far-distant display zone 1f to the total reflection mirror 3 and the distance from the total reflection mirror 3 to the half mirror 2 in comparison with the near-distant display zone 1n. Thus, two two-dimensional images which are located at different depthwise positions as viewed from the viewer 20 can be seen being superposed with each other.

In the display unit in this embodiment, since objects to be viewed at different depthwise positions as viewed, in particular, from the viewer are actually located on one and the same plane, the actual depthwise thickness is smaller than the depthwise distance perceived by the viewer, thereby it is possible to materialize a thin display unit. Further, the objects to be viewed are arranged on one and the same display element, the number of the components can be reduced.

It is noted that although a plurality of objects to be viewed are desirably arranged on one and same screen of a single liquid crystal display element in order to reduce the number of components, the display unit may be materialized by a plurality of screens of liquid crystal display elements on which objects to be viewed are respectively arranged in parallel with one another. In this case, it is desirable to commonly use in part required components such as backlights, housings, power sources constituting the backlights, light conductors, reflection sheets and optical films which constitute the liquid crystal display elements, in order to reduce the number of components as possible as it can.

It is noted that explanation in this embodiment has been made of the case in which the liquid crystal display element 1 emits a linearly polarized beam having an axis of polarization in parallel with or orthogonal to the direction of division of the display zones. This is because of the following reason: a light beam which is obliquely incident upon a reflection surface and is then reflected in general causes an S-polarized and a P-polarized component to have a phase difference therebetween as to the reflection surface. Thus, if light other than a linearly polarized beam having an S-polarized component and a P-polarized component is obliquely incident upon the reflection surface, the polarized state thereof is changed before and after the reflection.

In the display unit in this embodiment, although the far-distant image beam 12 emitted from the liquid crystal display element 1 is obliquely incident upon the total reflection mirror 3, since the liquid crystal display element 1 emits a linear polarized-beam having an axis of polarization which is parallel with or orthogonal to the direction of division of the image display zones as an image beam, the far-distant image beam 12 is incident upon the total reflection mirror 3, as a P-polarized beam or an S-polarized beam. In this case, the far-distant image beam 12 does not change its polarized state as it is reflected at the total reflection mirror 3, and accordingly, it is efficiently reflected by the half-mirror (polarized beam splitting element) 2 so as to obtain a bright image.

Meanwhile, should the liquid crystal display element 1 emit a polarized beam other the linearly polarized beam having an axis of polarization parallel with or orthogonal to the direction of division of the display zones, as an image beam, the far-distant image beam would change its polarized state before and after the reflection at the total reflection mirror. Thus, it is required to add an additional member for controlling the polarized state of an image beam in order to efficiently reflect the image beam at the half-mirror (polarized beam splitting element) 2.

That is, by emitting, as an image beam, a linearly polarized beam having an axis of polarization parallel with or orthogonal to the direction of division of the display zones, from the liquid crystal display element 1 as in the display unit in this embodiment, it is possible to obtain a brighter image with a less number of components.

Since the screen of the liquid crystal display element 1 has in general a rectangular shape, if the far-distant display zone 1$f$ and the near-distant display zone 1$n$ have the same size and the same shape, the entire display area of the liquid crystal display element can be effectively used. However, it is noted, in the case of the far-distant display zone 1$f$ and the near-distant display zone 2$n$ having the actually same size, that the far-distant image display element 1$f$ is viewed being smaller than the near-distance display zone 1$n$ since the far-distant display zone 1$f$ and the near distant display zone 1$n$ are viewed, being superposed with each other with the far-distant display zone 1$f$ being located at a far distant as viewed from the viewer. This condition is allowable although its purposes are limited, if the periphery of the far-distant display zone 1$f$ is darkened by a light absorbing member or the like so as to prevent unnecessary light from being seen.

It is noted that the far-distant display zone if and the near-distant image zone 1$n$ are viewed with their sizes being exactly equal to each other, with such a condition that the view point of the viewer is fixed, the following measures are preferably taken:

If the ratios W1/W2 and W3/W4 between the actual size of the far-distant display zone 1$f$ and that of the near-distant image display zone 1$n$ in the liquid crystal display element 1 satisfy the following formula (4), the far distant display zone 1$f$ and the near-distant display zone 1$n$ can be seen in the same size:

$$W1/W2 = W3/W4 = (L1+L2)/L1 = L2/L1+1 \quad (3)$$

where W1 is a width of the far-distant display zone 1$f$ in the direction of division of the display zones, W3 is a width of the same in a direction orthogonal to the former direction, W2 is a width of the near-distant display zone 1$n$ in the direction of division of the display zones, W4 is a width of the same in the direction orthogonal to the former direction, L1 is a distance from the viewer 20 to the center part of the near-distant display zone 1$n$, and L2 is a distance from the viewer 20 to the center part of the far distance display zone 1$n$.

It is noted that in the case of arranging the half-mirror 2 at close proximity with the screen of the liquid crystal display element 1, the reflection surface of the half mirror 2 is located in extreme vicinity of the screen of the liquid crystal display element 1. Thus, estimating that the reflection surface of the half-mirror 2 and the screen of the liquid crystal display element 1 are presented in one and the same plane, the above-mentioned L2 is exhibited by the following formula (4):

$$L2 = 2H/\cos\theta \quad (4)$$

where H is a shortest distance from the reflection surface of the half-mirror 2 to the reflection surface of the total reflection mirror 3 and $\theta$ is a viewing angle.

For example, if L1=500 mm, $\theta$=35 deg., and H=71.4 mm, the value W1/W2=W3/W becomes about 1.35 from the formulae (3) and (4), and accordingly, if the width of the far-distant display zone 1$f$ is increased by 35% of that of the near-distant display zone, these display zones can be seen in an equal size as viewed from the viewer.

It is noted that should the far-distant display zone 1$f$ be seen being larger than the near-distant display zone 1$n$, there would be a risk of deterioration of the depth perception. Further, should the far-distant image display zone 1$f$ be smaller than the near-distant image display zone 1$n$, there would be presented a useless zone 1$n$ the screen of the liquid crystal display element 1. Thus, in order to reduce the useless zone presented in the screen of the liquid crystal display element, it is desirable to set the ratios W1/W2 and W3/W4 so as to satisfy the following formula (5):

$$1 \leq W1/W2 = W3/W4 \leq L1/L2+1 \quad (5)$$

It is noted that in the case of superposing and displaying images located at different depthwise positions as viewed from the viewer 20, a stereoscopic image can be displayed by contriving the display methods.

As one of the methods, images displayed on display zones located at different depthwise positions as viewed from the viewer, are basically set to one and the same image to be displayed, and are displayed being superposed with each other as they are viewed from a point on the line connecting between the right eye and the left eye of the viewer. In this phase, two-dimensional images displayed on the far-distant display zone and the near-distant image zone are displayed while their total intensity of brightness is maintained to be equal to that of the objects to be displayed, and the object to be viewed at a far depthwise distance from the viewer is displayed on the far-distant display zone with a high intensity of brightness but is displayed on the near-distant display zone with a low intensity of brightness. Further, the object to be displayed at a near distant from the viewer is displayed on the near-distant display zone with a high intensity of brightness but is displayed on the far-distant display zone with a low intensity of brightness.

Thus, the brightness is adjusted in accordance with a depthwise position of an object to be viewed so that a stereoscopic image can be perceived by the viewer. However, this method could not display a satisfactory stereoscopic image if the view point of the viewer would be changed. Thus, alignment marks for enabling the viewer to readily know a viewing position from which a stereoscopic image can be satisfactorily viewed may be suitably displayed on both far-distant display zone and near-distant display zone, respectively, or may be displayed on zones which are outside of the display zones and which are observable, that is, on frame parts of the display zones.

Figure 8:
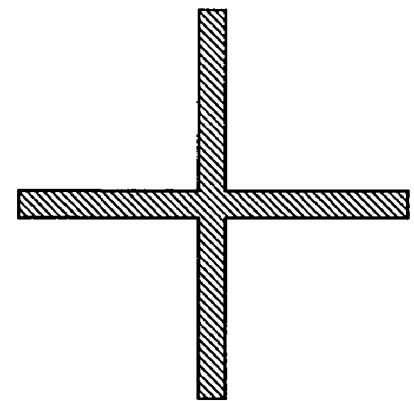
FIG. 8 is a view for explaining an example of marks for aligning the view point in the display unit as shown in FIG. 1.
Figure 8:
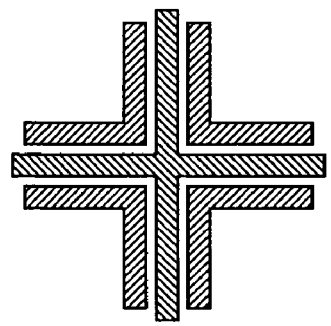
Figure 8:
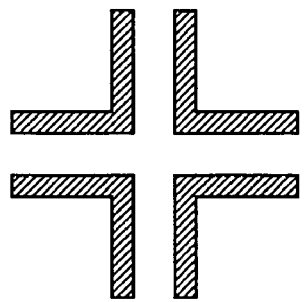
Figure 9:
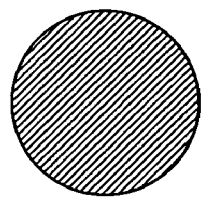
FIG. 9 is a view for explaining an example of marks for aligning the view point in the display unit as shown in FIG. 1.
Figure 9:
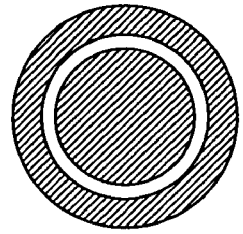
Figure 9:
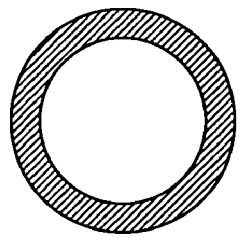

As to the alignment marks, as shown in FIG. 8, a pattern in combination of a cross mark which is displayed on the far-distance display zone 1n or the frame part thereof, and four L-like marks displayed on the near-distant display zone 1n or the frame part thereof, at a position corresponding to the position where the cross-mark is displayed, may be used. Alternatively, as shown in FIG. 9, a circle which is displayed on the far-distant display zone 1f or on the frame part thereof, and a hollow circle which is displayed on the near-distant display zone or the frame part thereof, at a position corresponding to the position where the afore-mentioned circle is displayed, concentric with the former circle, can be used. It is noted that the present invention should not be limited only to the use of the above-mentioned alignment marks, but those with which the alignment can be made in all directions including vertical and horizontal directions can be used.

In the case of such a use that objects to be viewed are displayed with a degree of accuracy which is not required to be high, other than use for medical observation or art appreciation, that is, in the case of using the display unit for a game machine such as a pin ball game-machine or the like, in order to enhance the expressive power of the display unit so as to materialize a display with depthwise feeling, the following measures are taken for forming images on both display zones so as to maintain a display with depthwise feeling even though the view point varies more or less:

(1) No one and the same object to be viewed is displayed at the same time on both display zones located at different depthwise positions as viewed from the viewer. That is, an object to be viewed at a far-distant position is displayed on the far-distant display zone while an object to be viewed located at a near-distant position is displayed on the near-distant display zone. In this phase, the object to be viewed located at a far-distant position is displayed by a small size while the object to be viewed located at a near-distant position is displayed by a lager size in order to exhibit excellent depth perception.

(2) An object to be viewed which continuously extends between different depthwise positions as viewed from the viewer, is displayed in such a mariner that a part of the object to be viewed which is located at a far-distant depthwise position as viewed from the viewer is displayed only on the far-distant display zone while a part of the object to be viewed located at a near-distant depthwise position as viewed from the viewer is displayed only on the near-distant display zone. Further, an intermediate part of the object to be viewed which is located between the different depthwise positions are displayed on both display zones, being darker than the other parts. In this phase, a part corresponding to the intermediate part between the different depthwise positions is displayed being continuously darkened as it approaches to the middle position between the different depthwise positions. That is, it is preferable to continuously lower the brightness thereof in order to prevent the viewer from perceiving unnatural feeling.

(3) In such a case that objects to be viewed located at different depthwise positions overlap with each other, a portion of the object at a far-distant depthwise position, which is hidden by an object to be viewed located at a near-distant depthwise position, is displayed on the far-distant display zone so that at least one part of the portion corresponding to an area hidden by the object to be viewed located at the near distant depthwise position is displayed being darkened. In this phase, the hidden portion is displayed being continuously darkened from the peripheral part to the center part thereof. That is, it is desirable to continuously lower the brightness in order to prevent the viewer from perceiving unnatural feeling. It is preferable to positively utilize a psychological factor of depthwise perception for images displayed on the display zones. For example, there may be used an aerial perspective in which a near object is displayed with a high contrast but a far object is displayed with a low contrast, a linear perspective which utilizes such a fact that a road going far away is seen with its width being gradually narrowed, or a texture gradation which utilizes such a fact that the further the distance, the higher the density of an element constituting a texture, and a process which exhibits depthwise feeling by shading.

Figure 10:
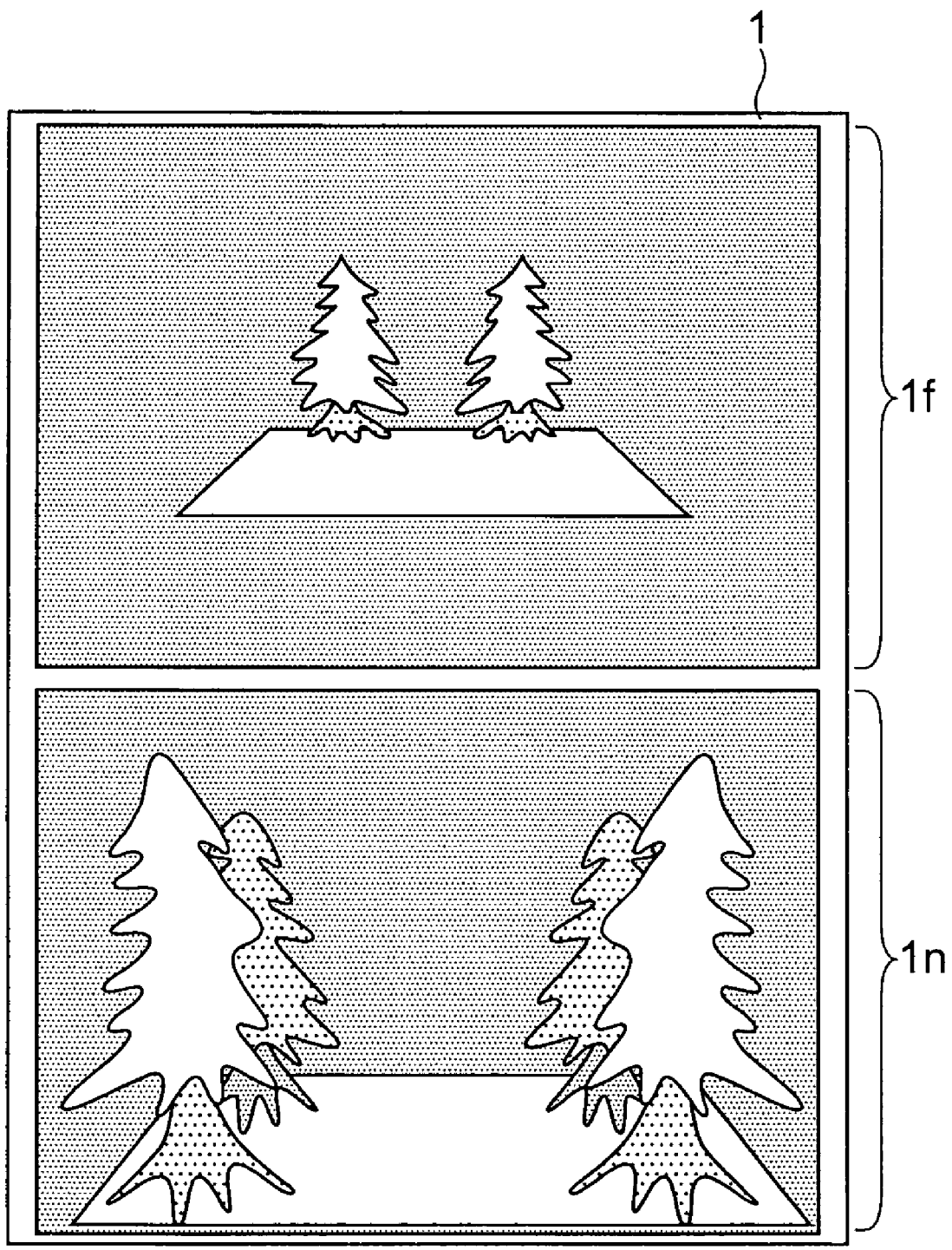
FIG. 10 is a view for explaining an example of a display on a screen of a display element in the display unit according to the present invention.

Referring to FIG. 10 which shows a display example on the screen of the liquid crystal display element 1, an object to be viewed located at a near-distance (in this figure, a load and trees) is displayed with a higher intensity of brightness by a larger size on the near-distant display zone 1n, being gradually darken as it goes far away. Further, the road is displayed with its width being narrower and narrower as it goes far away.

Meanwhile, an object to be viewed located at a far-distance is displayed with a high intensity of brightness by a small size on the far-distant display zone 1f, being gradually darkened as it comes near. Further, no one and the same object to be viewed is displayed at the same time on both far-distant display zone 1f and near-distant image zone 1n.

Figure 11:
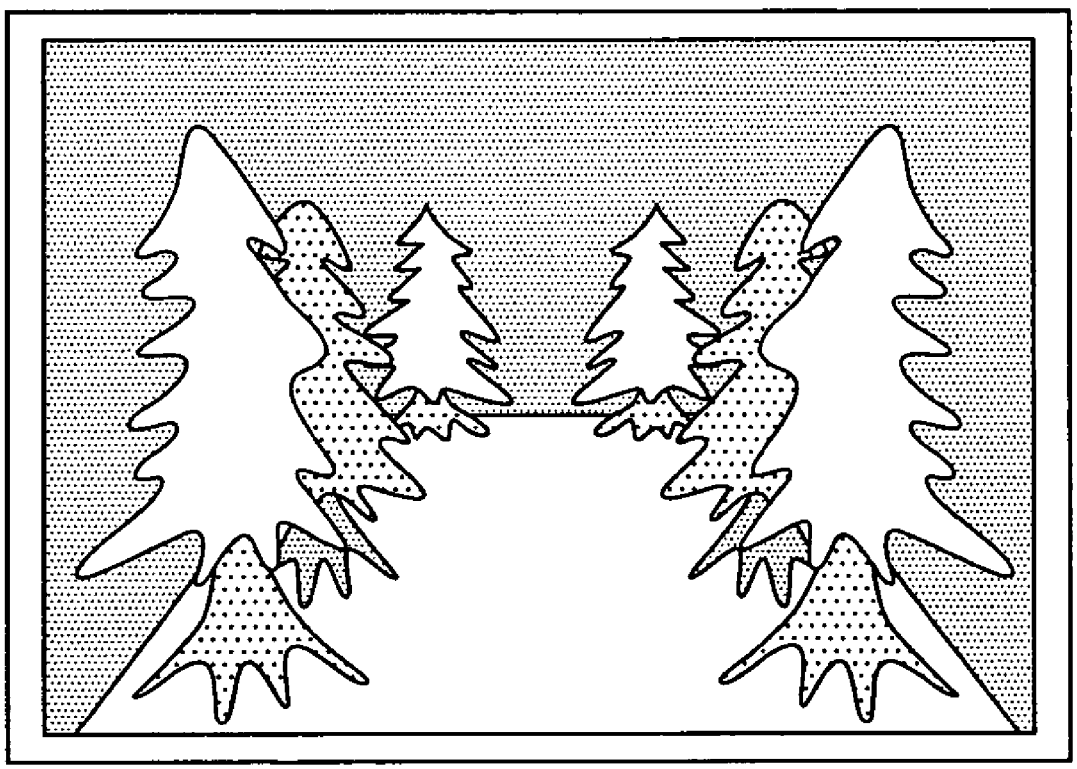
FIG. 11 is an explanatory view illustrating an image in simulation to the viewer in the display unit shown in FIG. 1.

FIG. 11 shows a simulation of an image observed by the viewer when the image illustrated in FIG. 10 is displayed on the liquid crystal display element 1. As understood from this figure, although an object to be viewed located at an intermediate position between different depthwise positions is viewed by the viewer, being slightly darkened, an image having depthwise feeling can be restrained from being deteriorated even if the view point is deviated more or less.

Figure 12:
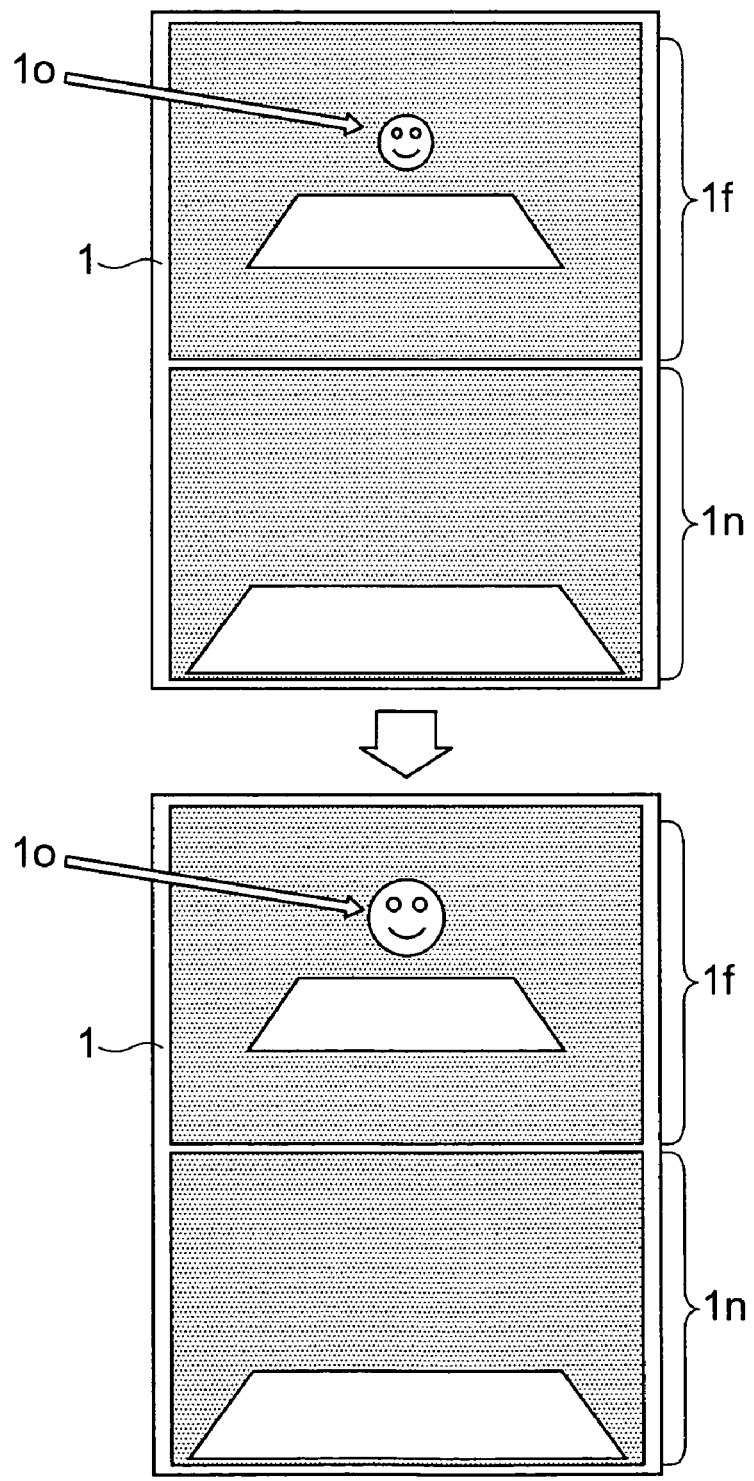
FIG. 12 is an explanatory view illustrating an example of a display on the screen of the display element in the display unit shown in FIG. 1.
Figure 13:
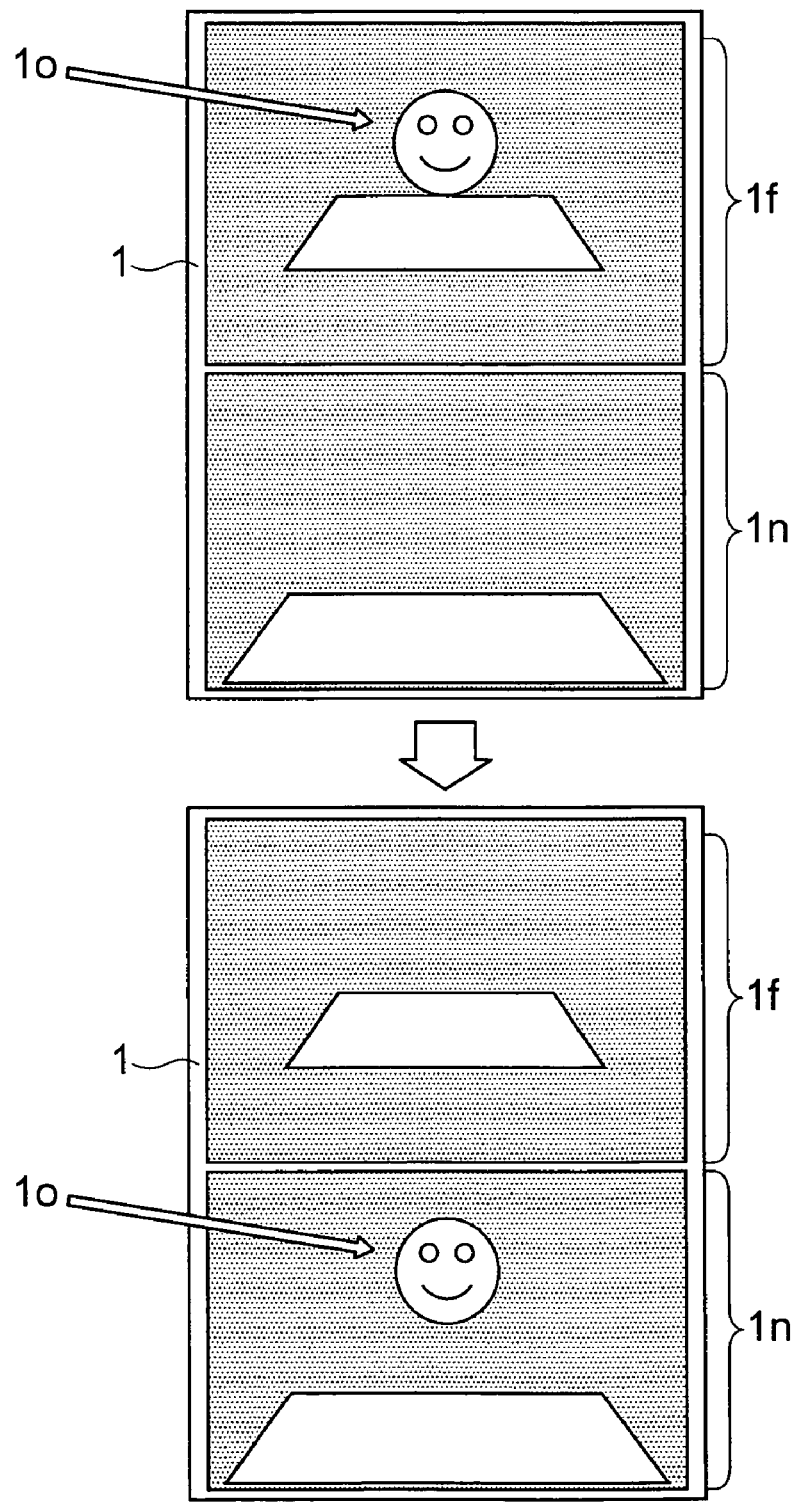
FIG. 13 is an explanatory view illustrating an example of a display on the screen of the display element in the display unit shown in FIG. 1.
Figure 14:
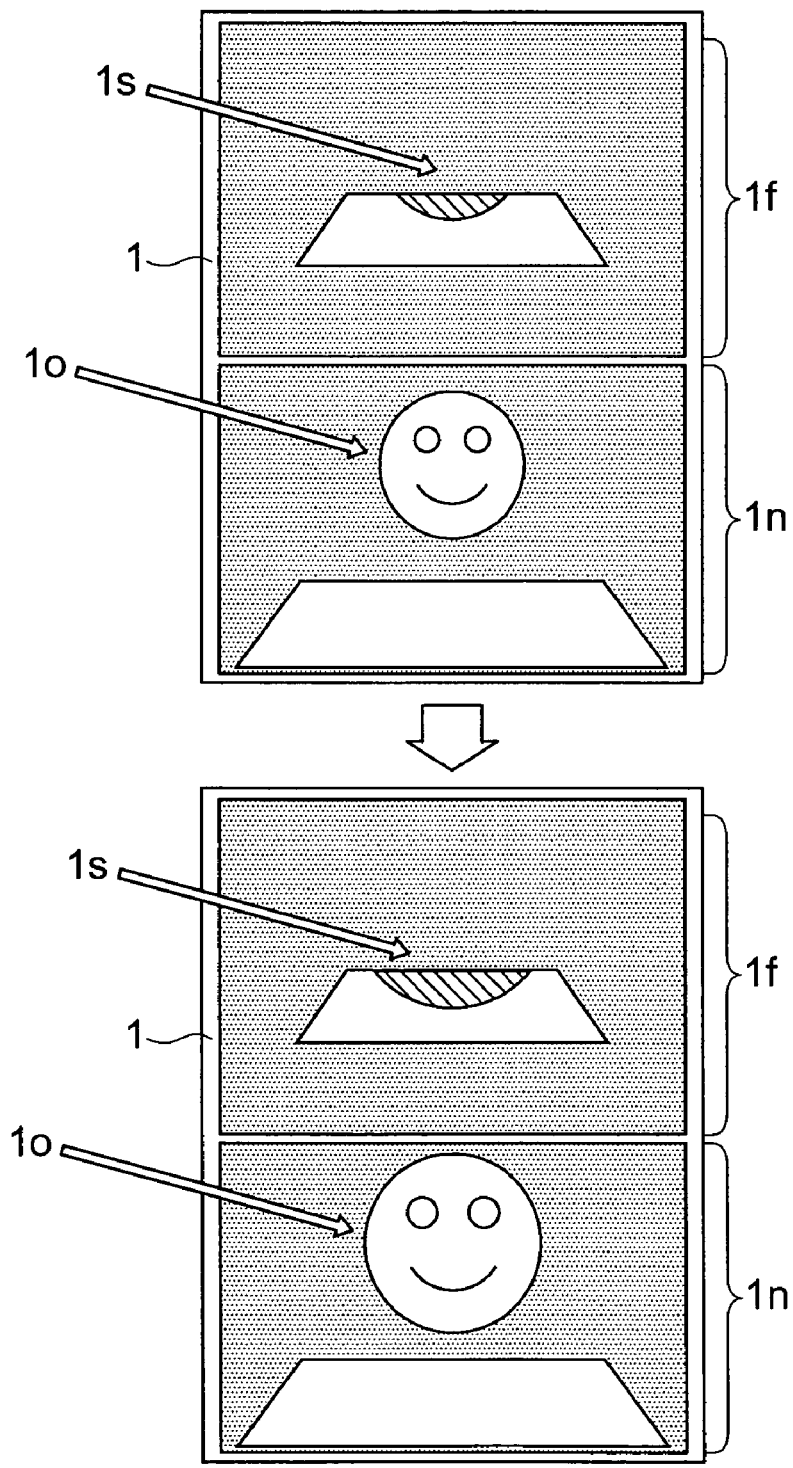
FIG. 14 is an explanatory view illustrating an example of a display on the screen of the display element in the display unit as shown in FIG. 1.

FIGS. 12 to 14 shows a display example on the liquid crystal display element 1, that is, a first object to be viewed which is a load extending straightforward, and a second object to be viewed which is located above the first object to be viewed, and which comes near and near from a far-distant position where the second object to be viewed is originally located.

As shown in FIG. 12, the second object 1o to be viewed is displayed by a small size, when it is located at a far distance, only on the far distance display zone 1f, and the second object 1o to be viewed is displayed larger and larger as it domes near.

As shown in FIG. 13, the second object 1o to be viewed further comes nearby, the zone on which the second object 1o to be viewed is displayed is changed over from the far-distant image display zone 1f into the near-distant image display zone 1n.

At this time, as to the object to be viewed on moving, it is considered that the depthwise feeling is not so deteriorated even though the image thereof is not darkened when it is present at an intermediate position between different depthwise positions.

It is important to avoid one and the same object to be viewed from being displayed at the same time on display zones corresponding to two different depthwise positions in order to prevent deterioration of depthwise feeling and depth perception even though the view point is deviated more or less.

Further, as shown in FIG. 14, if the second object 1o to be viewed displayed on the near-distant display zone 1n overlaps with the first object to be viewed displayed on the far-distant display zone 1f, a portion (which will be referred to as "hidden portion is" of the first object to be viewed located at a far distance which is hidden by the second object 1o to be viewed located at a near distance is displayed being darkened. In this phase, in order to prevent perception of uncomfortable feeling even though the view point is deviated more or less, the size of the hidden portion is as viewed from the viewer, is displayed being more or less smaller than that of the part hidden by the second object 1o to be viewed, or the image thereof is darkened continuously from the peripheral part of the hidden portion is to the center part of the hidden portion is. That is, it is preferable to continuously lower the brightness of the image.

By using the above-mentioned methods, the display unit in this embodiment can maintain a display of an image having depthwise feeling even though the view point is deviated more or less. Further, the display unit in this embodiment can display objects to be viewed located actually at different depthwise positions as viewed from the viewer, being superposed with one another, and accordingly, there may be materialized a display unit which can display an image with depthwise feeling due to a psychological factor of depthwise perception such as focus adjustment for the eyes, stypsis or parallax between the eyes.

Embodiment 2

Figure 15:
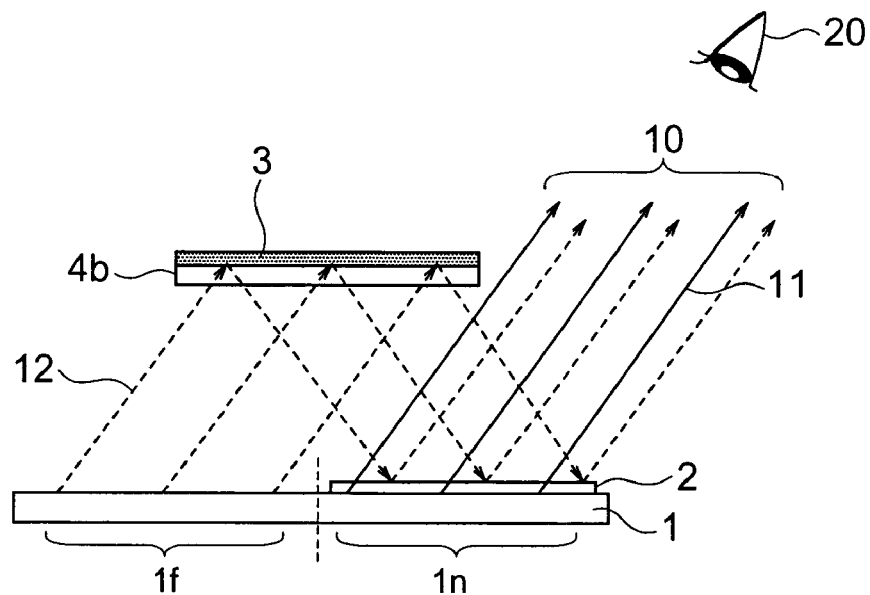
FIG. 15 is a schematic sectional view illustrating a display unit in an embodiment 2 of the present invention.

Next, explanation will be hereinbelow made of an embodiment 2 of the present invention with reference to FIG. 15 which is a schematic sectional view illustrating a display unit in the second embodiment of the present invention.

The display unit in this embodiment is basically the same as the display unit in the first embodiment which has been explained with reference to FIGS. 1 to 3, except that the configuration and the arrangement position of the polarized beam changing element are different from those of the first embodiment. Thus, like reference numerals are used to denote like parts to those explained in the first embodiment.

In this embodiment, a polarized beam changing element 4b is arranged so as to cover the reflection surface of the total reflection mirror 3. Further, as the total reflection mirror 3, there is used the one which is composed of a transparent substrate made of glass, plastic or the like, which is optically isotropic and planar, and a highly reflective metal film made of silver, aluminum or the like, which is formed on the transparent substrate.

The polarized beam changing element 4b in this embodiment is adapted to change the far-distant image beam 12 which is emitted from the far-distant display zone 1n and is incident upon the half-mirror (polarized beam splitting element) 2, into a beam which is reflected at a high reflection factor at the half-mirror (polarized beam splitting element) 2. That is, the polarized beam changing element 4b is adapted to change the far-distant image beam 12 emitted from the far-distant display zone 1f into a linearly polarized beam having an axis of polarization which is turned by an angle of 90 deg.

As the above-mentioned polarized beam changing element 4b, a ¼ wavelength plate may be used. As the ¼ wavelength plate, there may be used a drawn polymer film made of made of polyvinyl alcohol, polycarbonate, polysulphone, polystyrene, polyalylate or a phase difference film made of norbornene group resin, or the like.

In general, it is difficult to constitute the phase difference film serving as a ¼ wavelength plate over a board range of visible wavelengths, from one kind of a phase difference film material, in view of a wave dependency (wave dispersion) of refractive index of a material from which the ¼ wavelength plate is made.

Thus, there may be used the one in which at least two kinds of phase difference film materials are laminated together with their optical axes being orthogonal to each other so as to serve as a ¼ wavelength plate for a broad range of wavelengths, or the one in which a phase difference film serving as a ½ wavelength plate and a phase difference film serving as a ¼ wavelength plate are laminated together with their optical axes being orthogonal to each other so as to serve as a ¼ wavelength plate for a broad range of wavelengths.

Alternatively, a phase difference film formed of a polymer film having the so-called anomalous dispersion nature, that is, the shorter the wavelength, the higher the refractive index may be used.

It is noted that the far-distant image beam 12 emitted from the far-distant display zone 1f is incident upon the polarized beam changing element 4b at an angle equal to the viewing angle θ. Thus, if the viewing angle θ is set to a large value, and a ¼ wavelength plate made of a phase difference film having uniaxial isotropy is used as the polarized beam changing element 4b, the performance thereof is lowered, and as a result, the reflection factor of the half-mirror 4 for the far-distant image beam 12 is lowered, thereby the display of an image becomes dark.

Accordingly, in the case of setting the viewing angle θ to a large value, it is desirable to use a polarized beam changing element which effectively performs for a light beam which is obliquely incident thereupon. Such a polarized beam changing element can be materialized by a biaxially isotropic phase difference film.

It is noted that if the polarized beam changing element 4b is bonded direct to the total reflection mirror 3 with a transparent adhesive, no extra holing components are required, thereby it is possible to reduce the number of components.

Even in this embodiment, similar to the embodiment 1, the objects to be viewed are arranged in one and the same plane, and thereby it is possible to materialize a thin display unit having an actual depthwise-length which is shorted than the depthwidth distance perceived by the viewer. Further, since the objects to be viewed can be provided by a single two-dimensional display element, it is possible reduce the number of components. Further, the far-distant image beam 12 and the near-distant image beam 11 are synthesized through the half-mirror (polarized beam splitting element) 2 and are then viewed by the viewer, thereby it is possible to obtain a bright image.

Embodiment 3

Next, explanation will be hereinbelow made of a embodiment 3 with reference to FIGS. 16 to 18. The configuration of this embodiment is basically the same as that of the first or second embodiment, except that the polarized beam changing element is eliminated and the polarizing plate in the liquid crystal display element 1 is modified in part. Thus, like reference numerals are used to denote like parts to those explained in the first or second embodiment.

Figure 16:
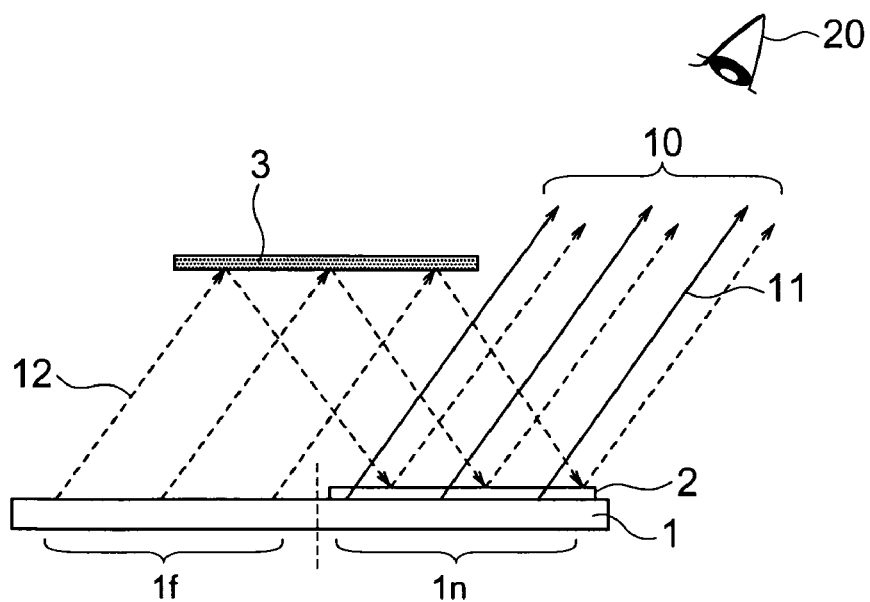
FIG. 16 is a schematic sectional view illustrating a display unit in an embodiment 3 of the present invention.

Referring to FIG. 16 which is a schematic sectional view illustrating the display unit in the embodiment 3, no polarized beam changing element for changing the polarized state of the far-distant image beam 12 is provided. Instead, the transmission axes of linearly polarized beams in the polarizing plate constituting the liquid crystal display element 1 are different from each other between far-distant display zone 1f and the near-distant image zone 1n.

Figure 17:
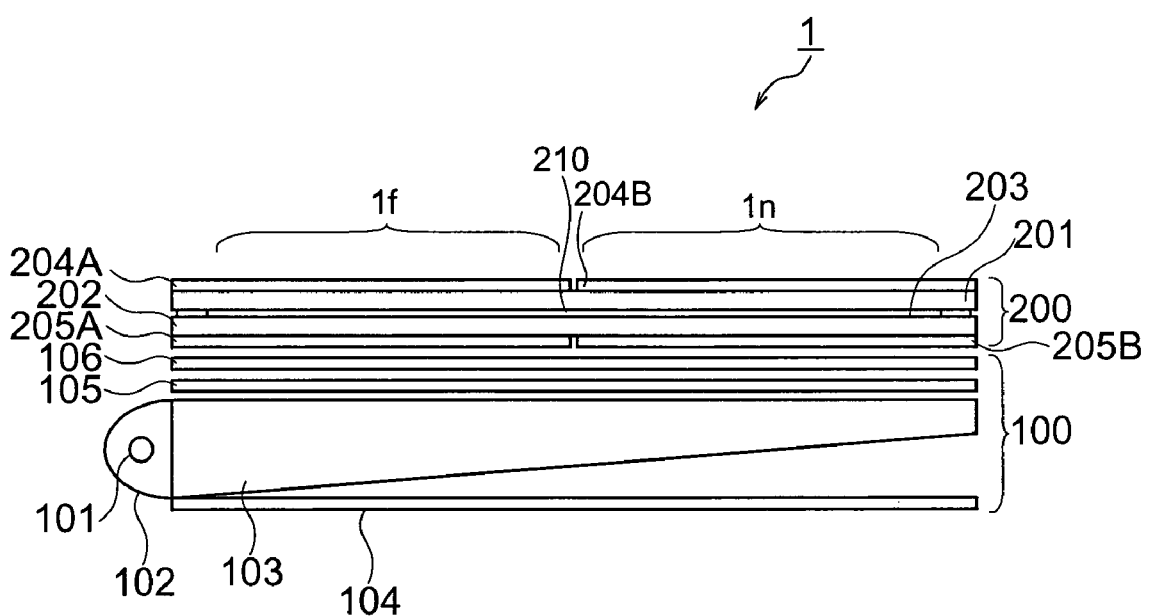
FIG. 17 is a schematic sectional view illustrating a display element in the display unit shown in FIG. 16.

Referring to FIG. 17 which is a schematic sectional view illustrating the liquid crystal display element 1 constituting the display unit, the liquid crystal display element 1 is composed of a liquid crystal display panel 200 and a backlight 100 arranged in rear of the panel 200. A transparent substrate 201 constituting the liquid crystal display element 1 is laminated with polarizing plates respectively on the front and rear surfaces thereof. In this embodiment, the polarizing plates have different transmission axes of linearly polarized beams respectively in their zones corresponding to the far-distant display zone 1f and the near-distant image zone 1n.

A polarizing plate 204A is arranged on the front surface of the transparent substrate 201 in an area corresponding to the far-distant display zone 1f, and a polarizing plate 204B is arranged in an area corresponding to the near-distant display zone 1n. Further, a polarizing plate 205A is arranged on the rear surface of the transparent substrate 202 in an area corresponding to the far-distant display zone 1f, and a polarizing plate 205B is arranged in an area corresponding to the near-distant image zone 1n.

Figure 18:
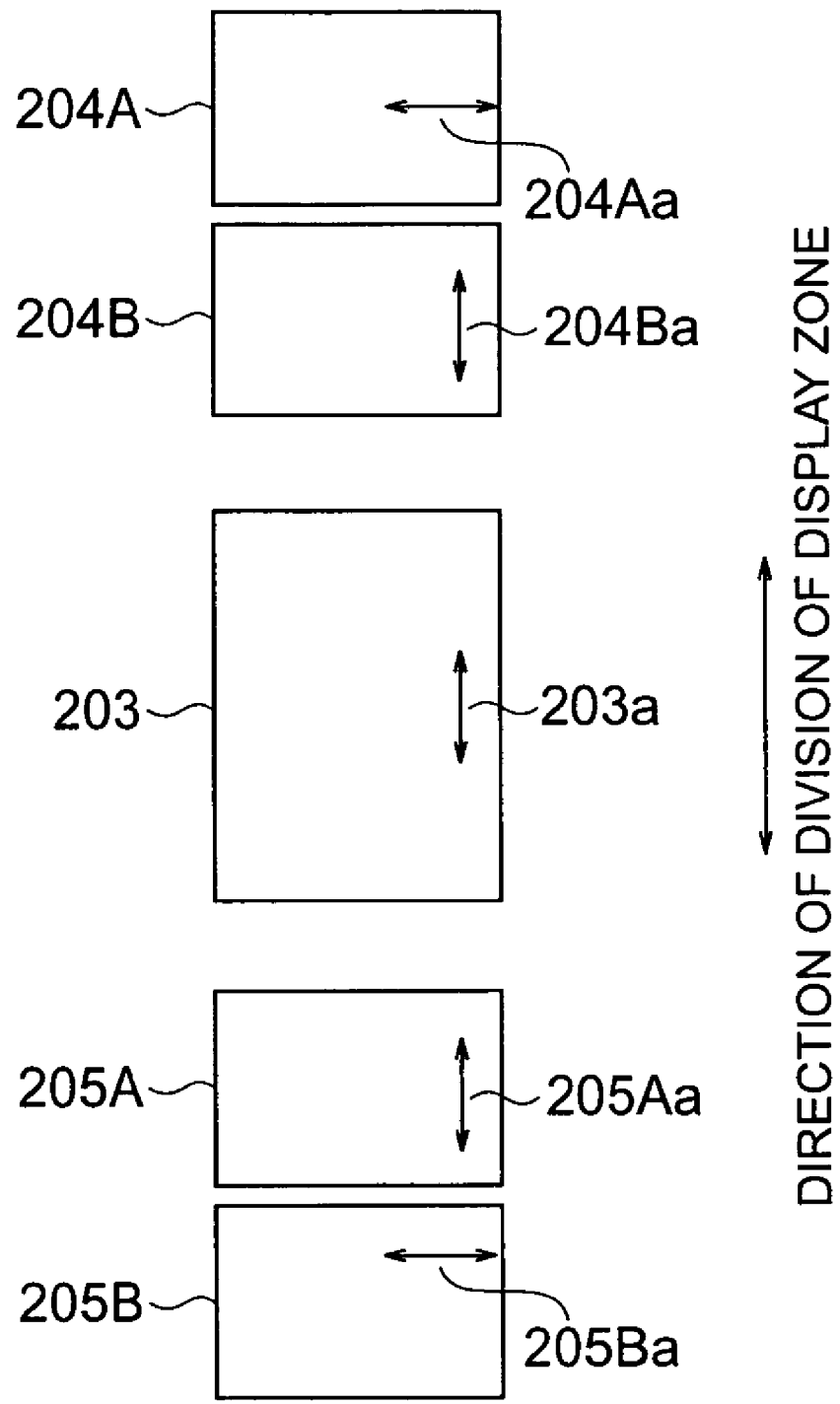
FIG. 18 is an explanatory view illustrating a transmission axis of a linearly polarized beam a component and the display element in the display unit shown in FIG. 16.

Referring to FIG. 18 which exemplifies axes of transmission of linearly polarized beams through the polarizing plates 204A and 204B and the polarizing plates 205A and 205B, and directions of orientation of longitudinal axes of molecules of liquid crystal, the direction 203a of orientation of the liquid crystal layer 203 is in parallel with the direction of division of the display zones. Further, the axis 204Aa of transmission of a linearly polarized beam through the polarizing plate 204A is orthogonal to the direction 203a of orientation of the liquid crystal layer 203, and the axis 204Ba of transmission of a linearly polarized beam through the polarizing plate 204B is in parallel with the direction-203a of orientation of the liquid crystal layer 203. Further, the axis 205Aa of transmission of a linearly polarized beam through the polarizing plate 205A is in parallel with the direction 203a of orientation of the liquid crystal layer 203, and the axis of transmission 205Ba of the polarizing plate 205B is orthogonal to the direction 203a of orientation of the liquid crystal layer 203.

With the above-mentioned configuration, the far-distant image beam 12 emitted from the far-distant display zone 1f and the near-distant image beam 11 emitted from the near-distant display zone 1n become linearly polarized beams respectively having axes of polarization which are orthogonal to each other.

In this case, the near-distant image beam 11 emitted from the near-distant display zone 1n transmits through the half mirror (polarized beam splitting element) 2 with substantially no loss, and is then viewed by the viewer 20. Further, although the far-distant image beam 12 emitted from far-distant display zone 1f is incident obliquely upon the total reflection mirror 3, since the far-distant image beam 12 is a linearly polarized beam which is an S-polarized beam at the reflection surface of the total reflection mirror 3, the beam 12 is reflected on the total reflection mirror 3 with its polarization being maintained, and is then incident upon the half mirror (polarized beam splitting element) 2.

Thus, the far-distant image beam 12 is reflected at the half mirror (polarized beam splitting element) 2 with substantially no loss, and is then viewed by the viewer 20.

Namely, even through no polarized beam changing element is provided, the display unit in this embodiment, the near-distant image beam 11 and the far-distant image beam 12 are synthesized with each other through the half mirror (polarized beam splitting element) 2 with substantially no loss, and are then viewed by the viewer 20, thereby it is possible to display a bright image.

It is noted that the polarized state of the far-distant image beam incident upon the total reflection mirror 3 is maintained upon reflection at the total reflection mirror 3 if it is an S-polarized beam or a P-polarized beam at the reflection surface of the total reflection mirror 3. Thus, the axes of transmission of the linearly polarized beams through the polarizing plates may be all turned by an angle of 90 deg. with respect to the directions shown in FIG. 18.

It is noted that the reflection factor of the S-polarized beam can, in general, be simply increased in comparison with the P-polarized beam, and accordingly, with the configuration shown in FIG. 18, there may be materialized the total reflection mirror 3 having a high reflection factor.

Incidentally, in this embodiment in which two polarizing plates having different axes of polarization are arranged on the front surface of the liquid crystal display element 1, unless the polarizing plates are arranged with a high degree of accuracy, a gap would be inevitably formed between the two polarizing plates. Should a gap be formed between the two polarizing plates, light from the backlight 100 would leak through this gap so as to deteriorate the image quality.

Thus, it is desirable to arrange a light shield member between the polarizing plates 204A, 204B and between the polarizing plates 205A, 205B.

The light shield member may be the one which can prevent leakage of light between the two polarizing plates. Accordingly, the shield member arranged between the polarizing plates 204A and 204B and between the polarizing plates 205A and 205B for preventing leakage of light may be formed of a light shieldable material such as a metal foil or a resin film containing a black pigment or dye. If the metal foil is used for the light shield member, the front surface of the foil is preferably colored with black in order to prevent unnecessary reflection of light.

Alternatively, as shown in FIG. 17, the light shield member 201 may be materialized by a resin film such as a chromium film or a metal film containing a black pigment or dye, which is provided on the transparent substrate 201 or 202 in a position corresponding to the part between the polarizing plates 204A and 204B or between the polarizing plates 205A and 205B.

Even in this embodiment, similar to the embodiment 1, the objects to be viewed are arranged in one and the same plane, thereby it is possible to materialize a thin display unit having an actual depthwise length which is shorter than a depthwise distance perceived by the viewer. Further, the objects to be viewed are incorporated in a single two-dimensional display element, the number of components can be reduced.

In this embodiment, since no provision of the polarized beam changing element such as those explained in the above-mentioned embodiments is required, the number of components can be further reduced.

It is noted the liquid crystal display element 1 as explained in any one of the embodiments 1 to 3 is adapted to be observed in a direction which is inclined by a predetermined angle (viewing angle θ) with respect to a direction perpendicular to the screen of the liquid crystal display element 1. It is desirable to use a liquid crystal element which can hardly lower its contrast ratio even though it is viewed obliquely, as the liquid crystal display element 1. As to such a liquid crystal display element 1, a liquid crystal display element of an IPS type, a VA type, preferably an OCB type or a TN type incorporating a phase difference film for enlarging the viewing angle may be used.

Further, since the viewer 20 views the liquid crystal display element 1 in an oblique direction, in the case of the far-distant display zone 1f and the near-distant image zone 1n actually having rectangular shape, the viewer sees them in trapezoidal shapes.

In a certain use, it is desirable to view a display zone 1n a rectangular shape for the viewer. In this case, each of the far-distant display zone. 1f and the near-distant image zone 1n is actually formed in a trapezoidal shape having a longer side on the remote from the viewer for such a compensation that the viewer can see it in a rectangular shape.

Further, in order to display a bright image with less power consumption, the light emitted from the backlight 100 is directive so that the light is radiated by a larger quantity in a direction toward the viewer, that is, the direction inclined by the viewing angle θ.

The directivity of the light radiated from the backlight 100, can be controlled by a microstructure for changing the direction of the light, such as fine concavities and convexities or a lens pattern, formed on the rear surface of the light conductor 103 or an optical film 105 such as a prism sheet having different apex angles which is laid on the light conductor 103.

Embodiment 4

Explanation will be hereinbelow made of a display unit in an embodiment 4 of the present invention with reference to FIG. 19. This configuration of this embodiment is the same as that of the embodiment 3, except that the arrangement of the half mirror 2 and the total reflection mirror 3 is different from that of the embodiment 3. Thus, like reference numerals are used to denote like parts to those explained the embodiment 3, and detailed explanation thereto will be abbreviated.

Figure 19:
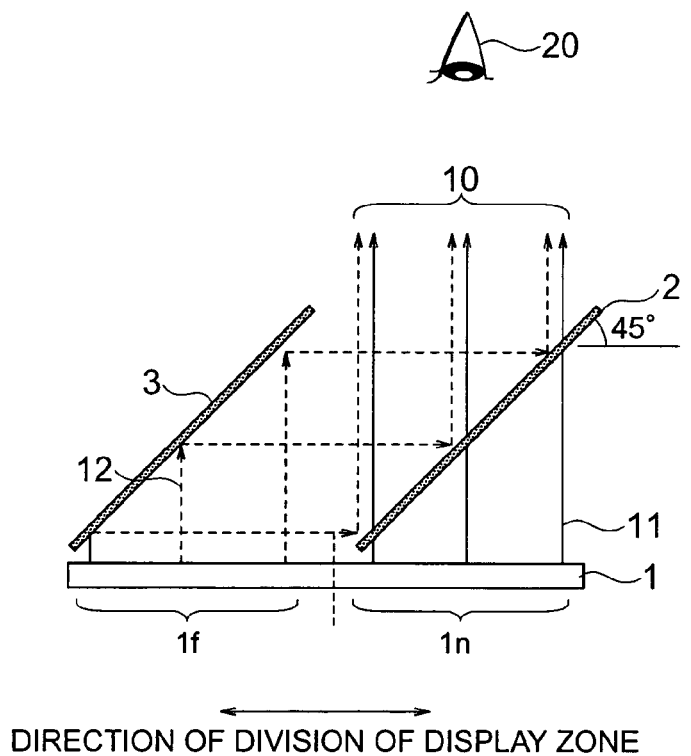
FIG. 19 is a schematic sectional view illustrating a display unit in an embodiment 4 of the present invention.

Referring to FIG. 19 which is a schematic sectional view illustrating the display unit in the fourth embodiment of the present invention, the half mirror (polarized beam splitting element) 2 and the total reflection mirror 3 are inclined by an angle of 45 deg. with respect to the screen of the liquid crystal display element 1.

In this case, in order to cover the near-distant image zone 1n with the half mirror 2 in its entirety, the width of the half mirror 2 in a direction orthogonal to the direction of division of the display zones of the liquid crystal display element 1 is set to a value which is equal to that of the near-distant image zone 1n in the same direction, or which is slightly larger that of the same in view of positional deviation during the assembly thereof. Further, the width of the half mirror 2 orthogonal to the above-mentioned direction is set to a value which is $\sqrt{2}$ times as large as the width of the near-distant image zone 1n in the direction of division of the display zones of the liquid crystal display element 1, or is slightly larger than the value in view of positional deviation during the assembly thereof.

The total reflection mirror 3 has such a size that it can reflect the far-distant image beam 12 emitted from the far-distant display zone 1f in its entirety with no area thereof missing. Thus, the width of the total reflection mirror 3 in the direction (a direction vertical to the sheet surface as viewed in the Figure) of division of the display zones of the liquid crystal display element 1 is set to a value which is equal to the width of the far-distant image beam 12 in the same direction, or which is slightly larger than the width of the far-distant display zone 1f in view of positional deviation during the assembly thereof. Further, the width of the total reflection mirror 3 in the direction orthogonal to the afore-mentioned direction is set to a value which is equal to $\sqrt{2}$ times as large as the width of the far-distant display zone 1f in the direction of division of the display zones of the liquid crystal display element 1 or which is slightly larger than $\sqrt{2}$ times as large as the width of the far-distant display zone 1f in the direction of division of the display zones of the liquid crystal display element 1.

As the half mirror 2, there is used a polarized beam splitting element, similar to the above-mentioned embodiment. A birefringent reflection type polarizing film composed of a plurality of polymeric films having different degrees of birefringence, which are laminated one upon another, as disclosed in WO95/27919, the one which is composed of a cholesteric liquid crystal film and phase difference films laminated respectively on the front and rear surfaces of the former film, a dielectric multilayer film composed of dielectric materials having different refractive indices, which are laminated one upon another, or a polarizing film formed a metal wire grid may be used as the polarized beam splitting element.

It is desirable to take care of the following points in the case of using a film-like element, as the polarized beam splitting element, such as a birefrinqent reflection type polarizing film or a cholesteric liquid crystal film.

The film-like polarized beam splitting element can hardly maintain a flatness as it is, and accordingly, it would disorder a displayed image due to its deformation. Thus, in the case of using a film-like element as the polarized beam splitting element, it is desirably bonded and secured on an optically isotropic planar transparent substrate formed of a glass pane, a plastic plate or the like through the intermediary of a transparent adhesive with no deformation.

In the case of using a dielectric multilayer film as the polarized beam splitting element, not only a planar type one but also a prism type may be used. The prism type polarized beam splitting element is composed of a triangular prism having an isosceles triangular cross-sectional shape and formed on its oblique surface with a polarized beam splitting surface made of the dielectric multilayer film, and another triangular prism bonded thereto. The prism type polarized beam splitting element can have a high optical performance, although it is expensive, and accordingly it can produce a bright image with extremely small loss in the image beam. In this display unit, similar to the afore-mentioned embodiments, the near-distant image beam 11 emitted from the near-distant image zone 1n of the liquid crystal display element 1 is transmitted through the half mirror (polarized beam splitting element) 2 with substantially no reflection, and is then viewed by the viewer 20. Meanwhile, the far-distant image beam 12 emitted from the far-distant display zone 1f is reflected by the total reflection mirror 3, and thereafter is, substantially all, reflected at the half mirror 2. Then, it is viewed by the viewer 20. That is, both far-distant image beam 12 and near-distant image beam 11 are viewed by the viewer 20 with substantially no loss, and accordingly, a bright image can be obtained.

Further, the far-distant display zone 1f is far from the viewer 20 in comparison with the near-distant image beam 11 by a distance from the total reflection mirror 3 to the half mirror 2. Thus, two-dimensional images on the two display zones located at different depthwise-positions as viewed from the viewer 20 can be displayed being superposed with each other.

In this phase, since the objects to be viewed (display zones) located at different depthwise positions as viewed from the viewer are actually located in one and the same plane, it is possible to materialize a thin display unit having an actual depthwise length which is shorter than a depthwise distance perceived by the viewer.

In comparison between the embodiment 3 and the embodiment 4, it is noted that the viewer views the screen of the liquid crystal display element with inclination by a predetermined angle (viewing angle θ) in the display unit in the embodiment 3, but the screen of the liquid crystal display element in the embodiment 4 can be viewed in a direction perpendicular to the screen of the liquid crystal display element 1, that is, just directly thereto. Thus, the display unit in the embodiment 4, no correction is required for the shapes of the display zones of the liquid crystal display element in the embodiment 4, and accordingly, is viewed by the viewer as it is. Further, in addition to an IPS type display unit, a VA type display unit and the like which has a broad viewing angle, a TNT type display unit having a relatively narrow viewing angle may be used as the liquid crystal display element.

Figure 20:
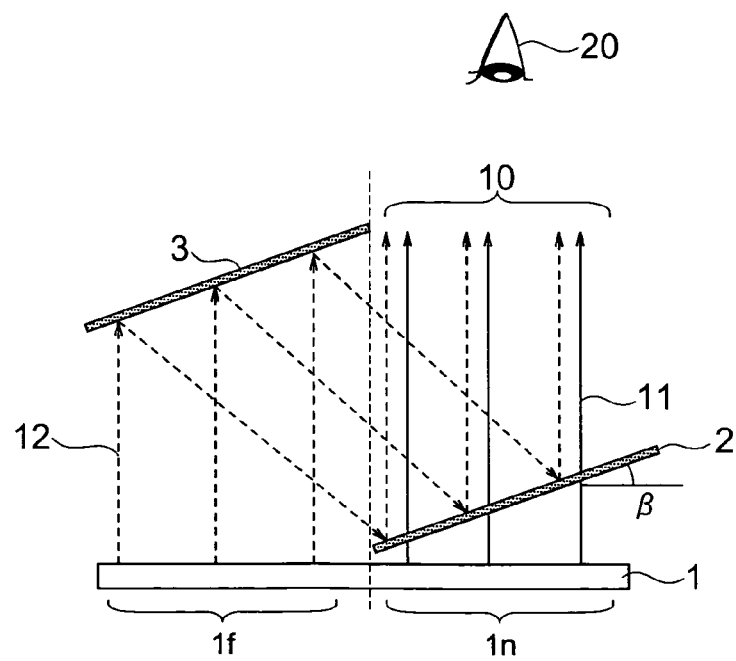
FIG. 20 is a schematic sectional view illustrating the display unit shown in FIG. 19.

By the way, in the display unit in this embodiment, in order to obtain such a constitution that the screen of the display element is viewed straight ahead, it is preferable that the reflection surfaces of the half mirror and the total reflection mirror are inclined to the screen of the liquid crystal element as explained with the display unit in the embodiment 4. In this phase, an angle of inclination of the half mirror and the total reflection mirror with respect to the screen of the liquid crystal display element should not be limited to an angle of 45 deg. Referring to FIG. 20 which is a schematic sectional view illustrating an example of the display unit in this embodiment, the configuration of the display unit in this embodiment is the same as that of the embodiment 4, except that the arrangement of the total reflection mirror 3 and the half-mirror 2 is different from that of the embodiment 4.

The reflection surface of the half mirror 2 is arranged being inclined to the screen of the liquid crystal display element 1 by an angle $\beta$. Further, the reflection mirror is arranged so as to prevent the viewer from being hindered when he views the near-distant display zone while its reflection surface is in parallel with the reflection surface of the half mirror 2, and further, it is located at a position where it can reflect the far-distant image beam 12 radiated from the far-distant display zone 1f, onto the half mirror 2.

In this case, if the inclined angle $\beta$ of the half mirror 2 is greater than 0 deg., a display unit with which the screen of a liquid crystal display element can be viewed in a direction facing the front surface thereof can be in principle materialized. However, if the angle $\beta$ is excessively small or large, the distance from the screen surface of the liquid crystal display element having a thickness which is the major part of the entire thickness of the optical system in the display unit to the end part of the half mirror or the total reflection mirror on the viewer side becomes longer, and accordingly, the display unit becomes large-sized.

Thus, in order to materialize a display unit with which the screen of the liquid crystal display unit can be viewed in a direction facing the front thereof, it is desirable to set the angle $\beta$ to a value in a range from 20 to 45 deg.

It is noted that without such a limitation that the screen of the liquid crystal display element is viewed in a direction facing the front thereof, a thin display unit can be materialized even though the half mirror is arranged in parallel with the screen of the liquid crystal display element, that is, the angle $\beta$ becomes 0 deg.

The distance from the screen of the liquid crystal display element having a thickness which is a major part of the entire thickness of the optical system in the display unit, to the end, on the viewer side, of the half mirror or the total reflection surface is required to be not less than the width of the far-distance display zone in the direction of division of the display zones if the inclined angle $\beta$ of the half mirror is 45 deg., as in the display unit in the embodiment 4.

On the contrary, in the display unit in the embodiment 3, if the viewing angle $\theta$ is set to a value not less than 30 deg., the distance from the screen of the liquid crystal display element to the total reflection mirror can be shorter than the width of the far-distant display zone in the direction of division of the display zones.

That is, if the half mirror and the total reflection mirror are arranged in parallel with the screen of the liquid crystal display element, as in the display units in the embodiments 1 to 3, that is, if the inclined angle $\beta$ of the half mirror is set to zero, a thin display unit can be materialized with the viewing angle $\theta$ being set to not less than 30 deg.

Thus, the display unit in this embodiment, it is desirable to set the inclined angle $\beta$ of the half mirror in a range from 0 to 45 deg.

Thus, in view of the configuration of the display unit according to the present invention, it is possible to materialize display units respectively having different characteristics by changing the inclined angles of the half mirror and the total reflection mirror with respect to the screen of the liquid crystal display unit. Thus, the inclined angles of the half mirror and the total reflection mirror with respect to the screen of the liquid crystal display unit may be set to a suitable value in accordance of a specific use of the display unit.

Embodiment 5

Next, explanation will be made of a display unit in an embodiment 5 of the present invention with reference to FIG. 21. The configuration of this embodiment is the same as that of the embodiment 1 which has been explained with reference to FIG. 1, except that the arrangement of the half-mirror 2 and the total reflection mirror 3 is different. Thus, like reference numerals are used to denote like parts to those explained the embodiment 1 so as to abbreviate detailed description thereto.

Figure 21:
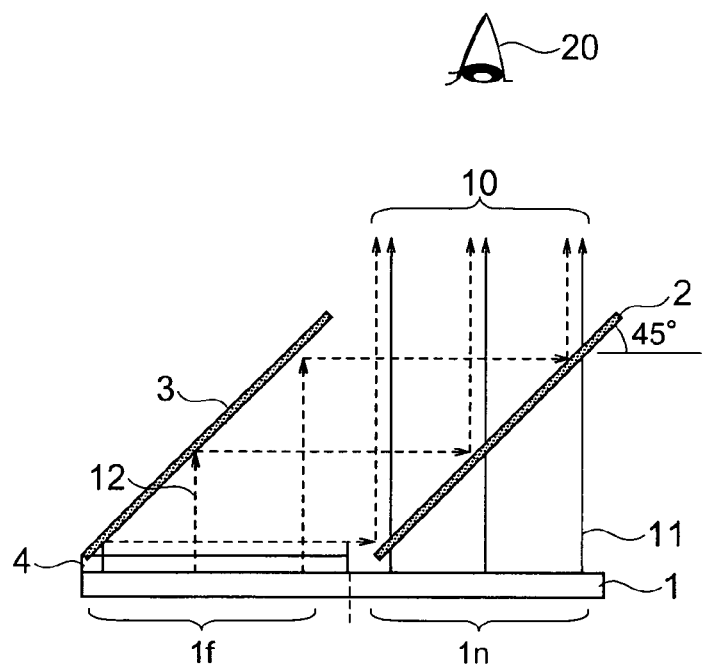
FIG. 21 is a schematic sectional view illustrating a display unit in an embodiment 5 of the present invention.

Referring to FIG. 21 which is a schematic section view illustrating the display unit in this embodiment of the present invention, in this display unit, the half mirror (polarized beam splitting element) 2 and the total reflection mirror 3 is arranged being inclined to the screen of the liquid crystal display element 1 by an angle of 45 deg. That is, it is the same as the display unit explained in the embodiment 4 as to the half mirror 2 and the total reflection mirror 3.

The display unit in this embodiment differs from the display unit in the embodiment 1 so as to have such a feature that the far distant image beam 12 viewed by the viewer 20 is incident upon the polarized beam changing element 4, perpendicular thereto.

It is noted here that the polarized beam changing element 4 is adapted to change the far-distant image beam 12 emitted from the far-distant display zone if into a linearly polarized beam having an axis of polarization which is turned by an angle of 90 deg. As the polarized beam changing element 4, there may be used a liquid crystal cell in which a liquid crystal layer is enclosed between two transparent substrates having been subjected to an orientational process, the longitudinal axes of molecules of liquid crystal being twisted by an angle of 90 deg. between the two transparent substrates. Alternatively, a phase different film serving as a ½ wavelength plate or a twisted structure with a lamination of phase difference films may be used. Any one of these polarized beam changing elements can perform, most effective if a light beam is incident thereupon, perpendicular thereto. Since the far-distant image beam 12 emitted from the far-distant display zone 1f is incident upon the polarized beam changing element 4 in the display unit in this embodiment, the far-distant image beam 12 passing through the polarized beam changing element 4 can be changed into a linearly polarized beam having an axis of polarization turned by an angle of 90 deg. with a high degree of efficiency. Thus, the far-distant image beam 12 incident upon the half mirror (polarized beam splitting element) 2 is reflected with a high reflection factor and is then directed to the viewer 20, thereby it is possible to obtain a bright image.

Embodiment 6

Figure 22:
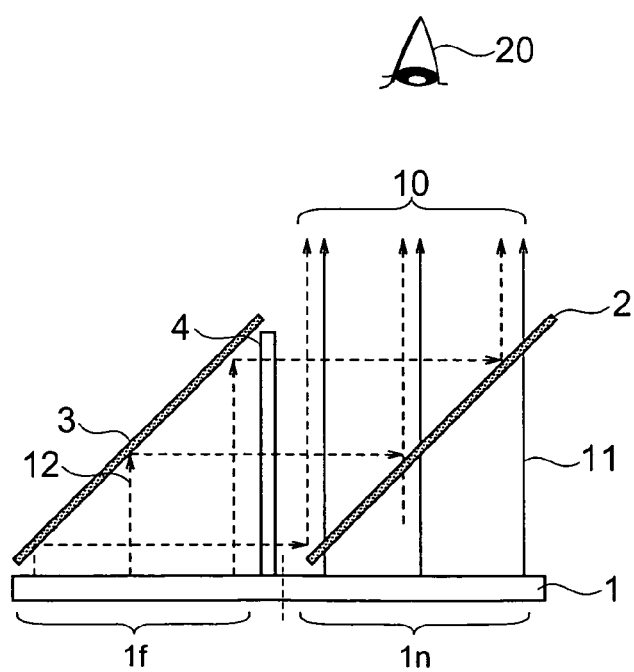
FIG. 22 is a schematic sectional view illustrating a display unit in an embodiment 6 of the present invention.

Referring to FIG. 22 which is a schematic sectional view illustrating a display unit in an embodiment 6 of the present invention, the configuration of this embodiment is the same as that of the embodiment explained with reference to FIG. 21, except that the position of the polarized beam changing element 4 is changed from a position between the liquid crystal display element 1 and the total reflection mirror 3 into a position between the total reflection mirror 3 and the half mirror (polarized beam splitting element) 2.

With this configuration in which the polarized beam changing element 4 is arranged perpendicular to the screen of the liquid crystal display element 1, the far-distant image beam 12 emitted from the far-distant display zone 1f is reflected at the total reflection mirror 3 and is then incident upon the polarized beam changing element 4, perpendicular thereto. Thus, the far-distant image beam 12 passing through the polarized beam changing element 4 is changed into a linearly polarized beam having an axis of polarization which is turned by an angle of 90 deg., with a high degree of efficiency, and accordingly, the far-distant image beam 12 incident upon the half mirror (polarized beam splitting element) 2 is reflected with a high reflection factor, and is then directed to the viewer, thereby it is possible to obtain a bright image.

Embodiment 7

Next, explanation will be hereinbelow made of a display unit in an embodiment 7 of the present invention with reference to FIG. 23. The configuration of this embodiment is the same as that of the display element explained in the embodiment 2 with reference to FIG. 15, except that the half mirror (polarized beam splitting element) 2 is arranged being laid over the entire surface of the screen of the liquid crystal display element 1 so as to enable two viewers 10A, 20B to view the display unit from two directions. Thus, like difference numerals are used to denote-like parts to those explained in the embodiment 2 so as to abbreviate detailed description thereto.

Figure 23:
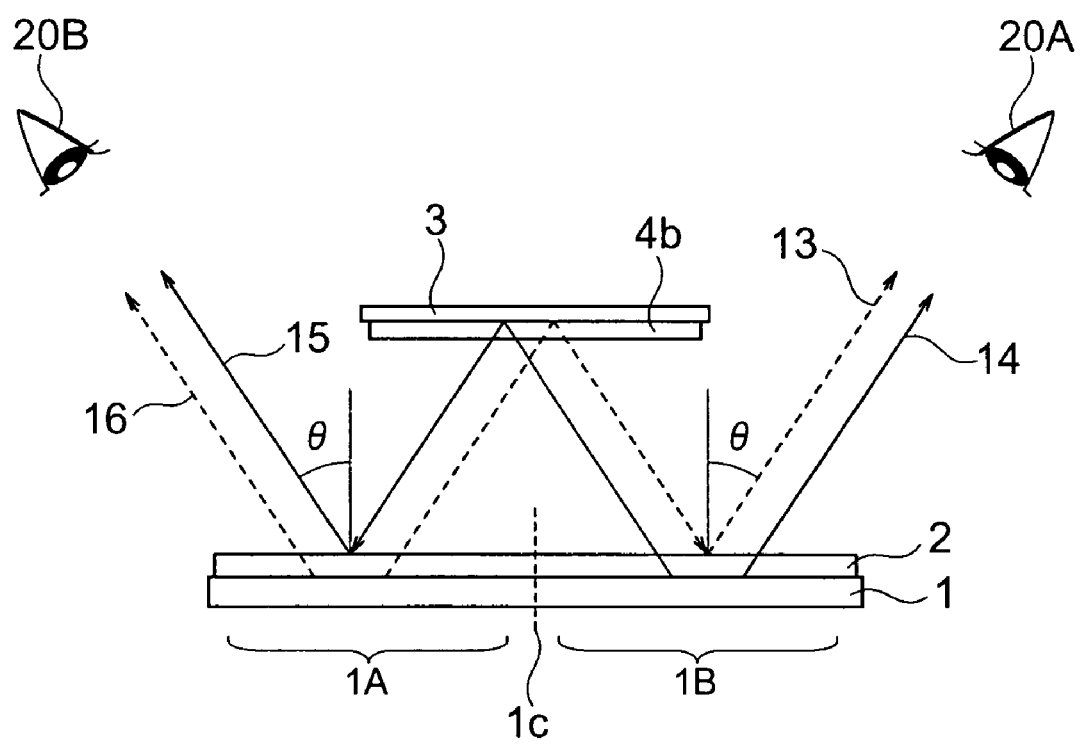
FIG. 23 is a schematic sectional view illustrating a display unit in an embodiment 7 of the present invention.

Referring to FIG. 23 which is a schematic sectional view illustrating the display unit in this embodiment, this display unit is configured to allow the two viewers 20a, 20B to view the display unit from different directions, and a display zone located at a near-distant depthwise position as viewed from the viewer 20A, that is, at a short distance position becomes a display zone located at a far-distant depthwise position, that is, a long distance position for the viewer 20B. Thus, two display zones of the liquid crystal display element 1 will be referred to as "display zone 1A" and "display zone 1B" in this embodiment.

The half mirror (polarized beam splitting element) 2 is laid so as to completely cover the display zones 1A, 1B.

Since the display zones 1A, 1B have one and the same shape, both viewers 20A and 20B can view an image under the same condition.

Of image beams emitted from the display zone 1A, the total reflection mirror 3 reflects an image beam directed to the viewer 20A, onto a zone corresponding to the front surface of the display zone 1B of the half mirror (polarized beam splitting element) 2, but of image beams emitted from the display zone 1B, it reflects an image beam directed to the viewer 20B onto a zone corresponding to the front surface of the display zone 1A of the half mirror (polarized beam splitting element).

Further, the shape and the position of the total reflection mirror 3 are such as to prevent the display zone 1B from being obstructed when the viewer 20A views it, and to prevent the display zone 1A from being obstructed when the viewer 20B views it.

The polarized beam changing element 4 may have the same shape as that of the total reflection mirror 3, and may be bonded to the total reflection mirror 3 by means of a transparent adhesive or the like.

For example, if each of the display zones 1A and 1B is rectangular, having a width W1 in a direction in parallel with the direction of division of the display zones, and a width W3 in a direction orthogonal to the same, each of the total reflection mirror 3 and the polarized beam changing element 4 may be rectangular, having the width W1 in a direction parallel with the direction of division of the display zones and the width W3 in a direction orthogonal to the same direction. However, in view of positional deviation or the like, it is practical to set the widths of each of the total reflection mirror 3 and the polarized beam changing element 4 to values slightly larger than those by a degree which can prevent the display zone 1B from being obstructed when the viewer 20A views it and to prevent the display zone 1A from being obstructed when viewer 20B views it. In this case, the center position of the total reflection mirror 3 is preferably coincident with a position direct above the center position between the display zone 1A and the display zone 20A.

The viewer 20A views the screen of the liquid crystal display element 1 in a direction inclined by a predetermined angle (viewing angle) $\theta$ with respect to a direction normal to the screen of the liquid crystal display element 1, in parallel with the direction of division of the display zone in the azimuth toward the display zone 1B (in the rightward direction as viewed in the figure). In this case, the viewer 20B views the screen of the liquid crystal display element 1 in a direction inclined by a predetermined angle (viewing angle) $\theta$ with respect to a direction normal to the screen of the liquid crystal display element 1, in parallel with the direction of division of the display zone in the azimuth toward the display zone 1A (in the leftward direction as viewed in the figure). The viewing angles for the viewer 20A and the viewing angle for the viewer 20B are different as to their azimuths, and accordingly, the viewing angle for the viewer 20B is attached thereto with a negative sign so as to denote $-\theta$ for the sake of brevity.

Estimating that the reflection surface of the half-mirror (polarized beam splitting element) 2 and the screen of the liquid crystal display element 1 are present in one and the same plane, the viewer 20A can view an image on the display zone 1A through the half-mirror (polarized beam splitting element) 2 if the shortest distance H from the reflection surface of the half mirror (polarized beam splitting element) 2 to the reflection surface of the total reflection mirror 3 satisfies the above-mentioned formula (1) in which $\theta$ is a viewing angle for the viewer 20A, and W0 is a distance of a gap between the display zone 1A and the display zone 1B. Further, the viewer 20B can view an image on the display zone 1B through the half mirror (polarized beam splitting element) 2.

For example, if W0+W1=100 mm and $\theta$=35 deg., H=about 71.4 mm is obtained. However, as the reflection surface of the half-mirror (polarized beam splitting element) 2 and the screen of the liquid crystal display element 1 cannot be completely present in one and the same plane, the distance H is preferable set to a value which is slightly larger than above-mentioned value due to the positional difference therebetween.

In the display unit in this embodiment, of image beams emitted from the display zone 1B, an image beam 14 emitted in a direction parallel with a direction having the viewing angle is transmitted through the half mirror (polarized beam splitting element) 2 with substantially no reflection thereat, and is viewed by the viewer 20A. Meanwhile, of image beams emitted from the display zone 1A, an image beam 13 emitted from a direction in parallel with the direction having the viewing angle θ, is reflected at the total reflection mirror 3 and is directed to a zone of the half mirror (polarized beam splitting element) 2 corresponding to the front surface of the display zone 1B.

When the image beam 13 is directed, after being reflected at the total reflection mirror 3, to the half mirror (polarized beam splitting element) 3, it passes through the polarized beam changing element 4b. This polarized beam changing element 4b changes an image beam which is emitted from the liquid crystal display element 1 and which is reflected from the total reflection mirror 3 and directed to the half mirror 2 (polarized beam splitting element) 2, into a linearly polarized beam having an axis of polarization turned by an angle of 90 deg. Thus, when the image beam 13 emitted from the display zone 1A is reflected at the total reflection mirror 3 and is directed to the half mirror (polarized beam splitting element) 2, the image beam 13 is changed into a linearly polarized beam having an axis of polarization turned by an angle of 90 deg., under the action of the polarized beam changing element 4b. Thus, the image beam 13 is reflected by a substantially all part at the half mirror (polarized beam splitting element) 2, and is then viewed by the viewer 20A.

In this case, the display zone 1A is further from the viewer 20A than the display element 1B by a distance corresponding to the sum of the distance from the display zone 1A to the total reflection mirror 3 and the distance from the total reflection mirror 3 to the half mirror 2. Thus, two-dimensional images located at different depthwise positions as viewed from the viewer 20A can be displayed being superposed with each other by the display unit in this embodiment.

Meanwhile, of image beams emitted from the display zone 1A, an image beam 16 emitted in a direction parallel with the direction having the viewing angle –θ is transmitted through the half-mirror (polarized beam splitting element) 2 with substantially no reflection thereat, and is then viewed by the viewer 20B. Further, of image beams emitted from the display zone 1B, an image beam 15 emitted in parallel with the direction having the viewing angle –θ is reflected at the total reflection mirror 3, and is then directed to a zone of the half mirror (polarized beam splitting element) 2 corresponding to the front surface of the display zone 1A.

When the image beam 15 is directed to the half mirror (polarized beam splitting element) 2 after being reflected by the total reflection surface 3, it is changed into a linearly polarized beam having an axis of polarization turned by an angle of 90 deg., under the action of the polarized beam changing element 4. Thus, the image beam 15 directed the half-mirror (polarized splitting element) 2 is reflected by a substantially all part at the total reflection mirror 3, and is then viewed by the viewer 20B.

In this case, the display zone 1B is further from the viewer 20B than the display zone 1A by a distance corresponding to the sum of the display zone 1B to the total reflection mirror 3 and the distance from the total reflection mirror 3 to the half mirror 2. Thus, two-dimensional images located at different depthwise positions as viewed from the viewer 20B can be displayed being superposed with each other by the display unit in this embodiment.

In the display unit in this embodiment, for the viewer 20A, the display zone 1A is an object to be viewed located at a far-distance position while the display zone 1B is an object to be viewed located at a near distance position. Meanwhile, for the viewer 20B, the display zone 1B is an object to be viewed located at a far-distant position while the display zone 1A is an object to be viewed located at a near-distant position.

That is, an image on one of the display zones of the liquid crystal display element is the one located at a near-distant depthwise position or a short-distance position for a viewer near this display zone, but is the one located at a far-distant depthwise position or a long distance position for a viewer far from this display zone.

With the display unit in this embodiment, for two viewers, two dimensional images located at different depthwise positions can be displayed being superposed with each other at the same time in the order corresponding to a position of a viewer. Thus, a display unit such as the one used in a confronting type game machine or the like exhibiting realistic feeling can be materialized.

Further, in this display unit, the objects to be viewed located at different depthwise positions as viewed from the viewers who take different positions, are actually set on the screen of the single display element. Thus, a thin display unit having a less number of components and having an actual depthwise length which is smaller than a depthwise distance perceived by the viewer can be materialized.

Since the half mirror 2 formed of a polarized beam splitting element is used, image beams emitted from the display zone 1A and the display zone 1B can be viewed by the viewers 20A, 20B with substantially no loss, thereby it is possible to obtain a bright image.

In this embodiment, explanation has been made of the polarized beam changing element 4b bonded to the total reflection mirror 3, even though the polarizing changing element 4b may be bonded to the half mirror (polarized beam splitting element) 2, the function thereof is also effective. It is noted here that the polarized beam changing element has to have a size equal to that of the half-mirror (polarized beam splitting element) 2 which covers both display zone 1A and display zone 1B, and accordingly, the area of the polarized beam changing element becomes larger than an area which is twice as large as that of the polarized beam changing element bonded to the total reflection mirror.

Alternatively, a ½ wavelength plate or a rotary polarizer as explained in the embodiment 1 can be used as the polarized beam-changing element. In this case, the polarized beam changing element may be located to a zone of the front surface of the half mirror (polarized beam splitting element), corresponding to either the front surface of the display zone 1A or the front surface of the display zone 1B.

Embodiment 8

Next, explanation will be made of a display unit in an embodiment 8 of the present invention with reference to FIG. 24. The configuration of the display unit in this embodiment basically is the same as that of the display unit explained in the embodiment 3 with reference to FIG. 16, except that an additional half mirror is arranged in front of the far-distant display zone 1f in order to view the display unit in two different directions. Thus, like reference numerals are used to denote like parts to those explained in the embodiment 3 in order to abbreviate detailed explanation thereto.

Figure 24:
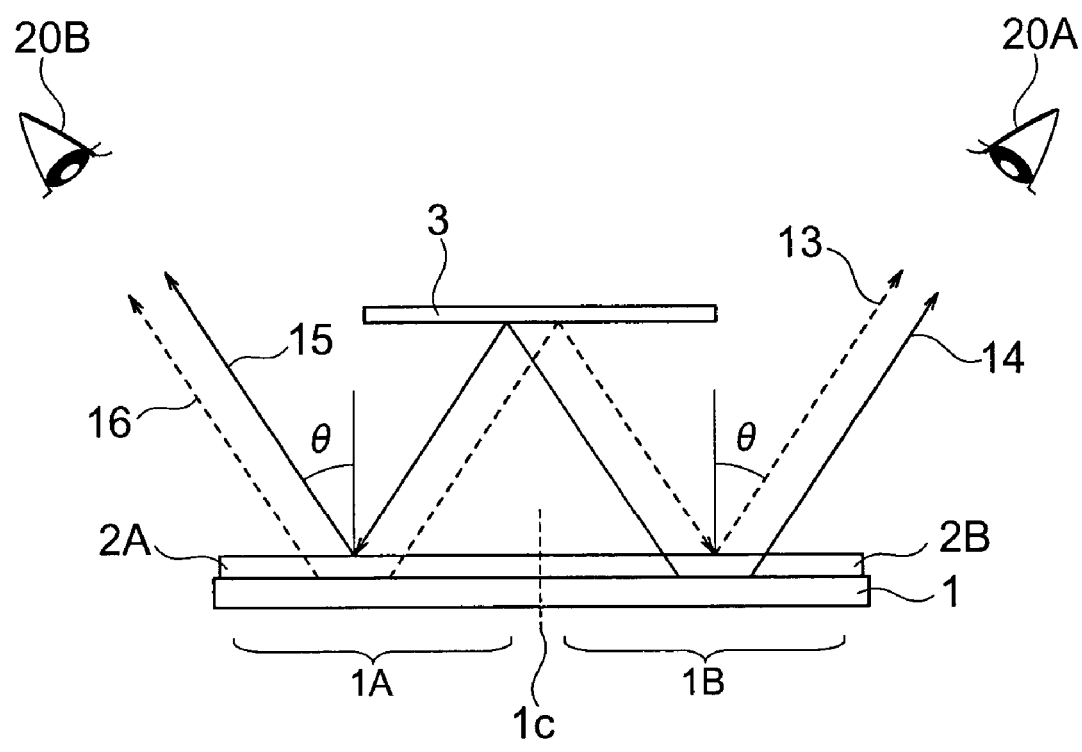
FIG. 24 is a schematic sectional view illustrating a display unit in an embodiment 8 of the present invention.

Referring to FIG. 24 which is a schematic sectional view illustrating the display unit in this embodiment, this display unit is configured to allow the two viewers 20a, 20B to view the display unit from different directions, and a display zone located at a near-distant depthwise position as viewed from the viewer 20A, that is, at a short distance position becomes a display zone located at a far-distant depthwise position, that is, a long distance position for the viewer 20B. Thus, two display zones of the liquid crystal display element 1 will be referred to as "display zone 1A" and "display zone 1B" in this embodiment.

A half mirror 2A and a half mirror 2B which are formed respectively of polarized beam changing elements are arranged respectively at the front surfaces of the display zone 1A and the display zone 1B.

Figure 25:
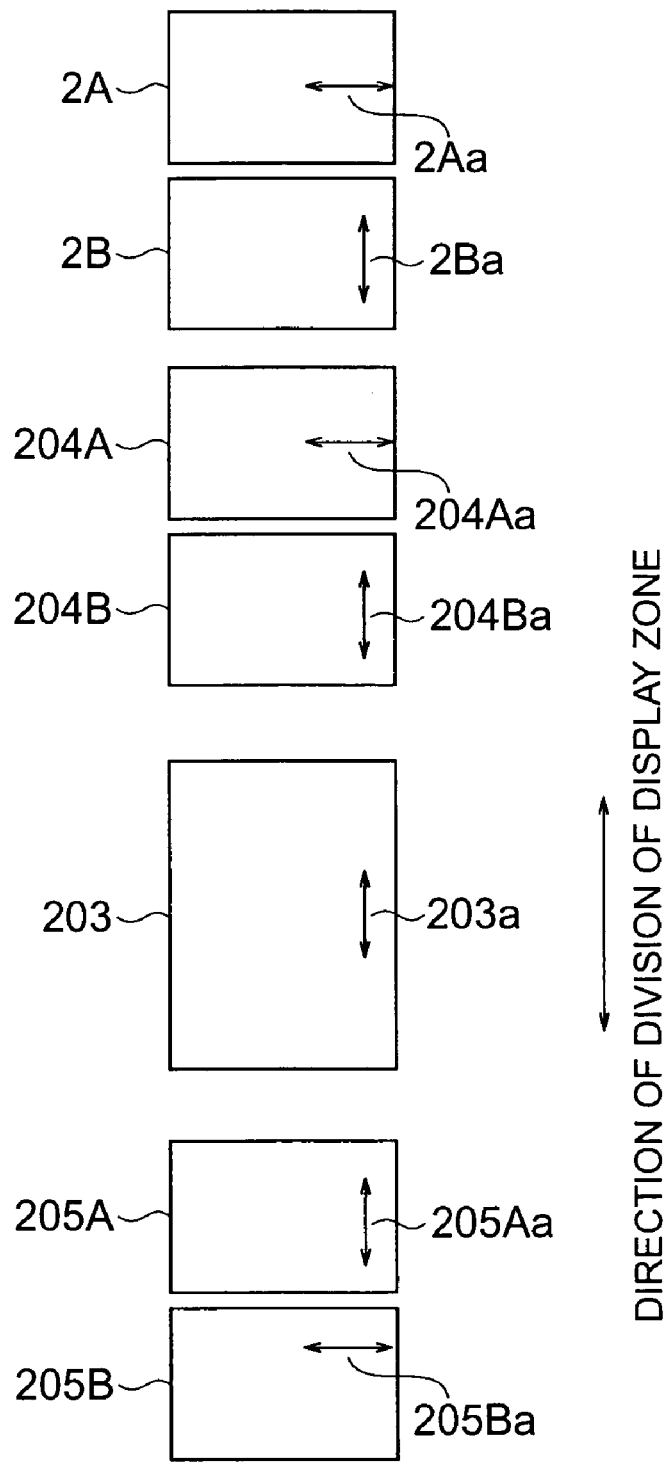
FIG. 25 is an explanatory view illustrating a transmission axis of a linearly polarized beam a component and the display element in the display unit shown in FIG. 25.

Referring to FIG. 25 which is a view for explaining an example of a relationship among the half mirror 2A and the half mirror 2B, axes of transmission of linearly polarized beams through polarizing plates constituting the liquid crystal display element 1 and a direction of orientation of longitudinal axes of molecules in a liquid crystal layer, the direction 203$a$ of orientation of the liquid crystal layer 203 is in parallel with the direction of division of the display zones. Further, a direction 204Aa of transmission of a linearly polarized beam through a polarizing plate 204A is orthogonal to the direction 203$a$ of orientation of the liquid crystal layer 203 while an axis 204Ba of a linearly polarized beam through a polarizing plate 204B is in parallel with the direction 203$a$ of orientation of the liquid crystal layer 203. Further, an axis 205Aa of a linearly polarized beam through a polarizing plate 205A is in parallel with the direction 203$a$ of orientation of the liquid crystal layer 203 while an axis 205Ba of transmission of a linearly polarized beam through a polarizing plate 205B is orthogonal to the direction 203$a$ of orientation of the liquid crystal layer 203.

The axis 2Aa of a linearly polarized beam through the half mirror 2A is in parallel with the axis 204Aa of the linearly polarized beam through the polarizing plate 204A, and the axis 2Ba of a linearly polarized beam through the half-mirror 2B is in parallel with the axis 204Ba of transmission of the linearly polarized beam through the polarizing plate 204B.

With the above-mentioned configuration, an image beam emitted from the display zone 1A and an image beam emitted from the display zone 1B become linearly polarized beams having their axes of polarization which are orthogonal to each other. Further, image beams emitted from the display zone 1A and the display zone 1B pass respectively through the half mirror 2A and the half mirror 2B with substantially no loss.

The same concept as that applied to the display unit explained in the embodiment 7 is also applied to the configurations of the total reflection mirror 3, and the display zone 1A and the display zone 1B. That is, of image beams emitted from the display zone 1A, the image beam 13 directed to the viewer 20A is reflected by the total reflection mirror 3 onto the half mirror 2B, and of image beams emitted from the display zone 1B, an image beam 15 emitted toward the viewer 20B is reflected by the total reflection mirror 3 onto the half mirror 2A. The configuration and the position of the total reflection mirror 3 are such that it does not hide the display zone 1A when the viewer 20B views, and it does not hide the display zone 1A when the viewer 20B views. The shapes of the display zone 1A and the display zone 1B are the same, and accordingly, the viewer 20A and the viewer 20B can view images under the same condition.

It is noted that the configurations of the half mirror 2A and the half mirror 2B are such that they can completely cover the display zone 1A and the display zone 1B, respectively. That is, the configurations of the half mirror 2A and the half mirror 2B are the same as those of the display zone 1A and the display zone 1B, respectively or are slightly larger than the those of the display zone 1A and the display zone 1B in view of positional deviation or the like.

It is estimated here that, similar to the display unit explained in the embodiment 7, the viewer 20A views the screen of the liquid crystal display element 1 in a direction inclined by a predetermined angle (viewing angle) θ with respect to a direction normal to the screen of the liquid crystal display element 1, and the viewer 20B views the screen of the liquid crystal display element 1 in a direction inclined by a predetermined angle (viewing angle) −θ with respect to a direction normal to the screen of the liquid crystal display element 1.

In this case, of image beams emitted from the display zone 1B, an image beam 14 emitted in a direction parallel with a direction having the viewing angle θ is transmitted through the half mirror (polarized beam splitting element) 2B, and is viewed by the viewer 20A. Meanwhile, of image beams emitted from the display zone 1A, an image beam 13 emitted from a direction in parallel with the direction having the viewing angle θ, is transmitted through the half mirror (polarized beam splitting element) 2A, then is reflected at the total reflection mirror 3 and is directed to the half mirror (polarized beam splitting element) 2B. Since the polarized state of the image beam 13 is maintained upon refection at the total reflection mirror 3, it is reflected by a substantially all part at the half mirror (polarized beam splitting element) 2B, and is viewed by the viewer 20A.

In this case, the display zone 1A is further from the viewer 20A than the display element 1B by a distance corresponding to the sum of the distance from the display zone 1A to the total reflection mirror 3 and the distance from the total reflection mirror 3 to the half mirror 2B. Thus, two-dimensional images located at different depthwise positions as viewed from the viewer 20A can be displayed being superposed with each other by the display unit in this embodiment.

Meanwhile, of image beams emitted from the display zone 1A, an image beam 16 emitted in a direction parallel with the direction having the viewing angle −θ is transmitted through the half-mirror (polarized beam splitting element) 2A, and is then viewed by the viewer 20B. Further, of image beams emitted from the display zone 1B, an image beam 15 emitted in parallel with the direction having the viewing angle −θ is transmitted through the half-mirror 2B, then is reflected at the total reflection mirror 3, and is directed to the half mirror (polarized beam splitting element) 2A. Since the polarized state of the image beam 15 is maintained upon reflection at the total reflection mirror 3, it is reflected by a substantially all part by the half mirror (polarized beam splitting element) 2A, and is viewed by the viewer 20B.

In this case, the display zone 1B is further from the viewer 20B than the display zone 1A by a distance corresponding to the sum of the display zone 1B to the total reflection mirror 3 and the distance from the total reflection mirror 3 to the half mirror (polarized beam splitting element) 2A. Thus, two-dimensional images located at different depthwise positions as viewed from the viewer 20B can be displayed being superposed with each other.

That is, in the display unit in this embodiment, for the viewer 20A, the display zone 1A is an object to be viewed located at a far-distance position while the display zone 1B is an object to be viewed located at a near distance position. Meanwhile, for the viewer 20B, the display zone 1B is an object to be viewed located at a far-distant position while the display zone 1A is an object to be viewed located at a near-distant position.

With the display unit in this embodiment, for two viewers, two dimensional images located at different depthwise positions can be displayed being superposed with each other at the same time in the order corresponding to a position of a viewer.

Thus, a display unit such as the one used in a confronting type game machine or the like exhibiting realistic feeling can be materialized.

Further, in this display unit, the objects to be viewed located at different depthwise positions as viewed from the viewers who take different positions, are actually set on the screen of the single display element. Thus, a thin display unit having a less number of components and having an actual depthwise length which is smaller than a depthwise distance perceived by the viewer can be materialized.

Since the half mirror 2A and the half-mirror 2B respectively formed of polarized beam splitting elements are used, image beams emitted from the display zone 1A and the display zone 1B can be viewed by the viewers 20A, 20B with substantially no loss, thereby it is possible to obtain a bright image.

Different from the display unit explained in the embodiment 7, no polarized beam changing element is required, and accordingly, a number of components can be reduced. Further, there is no risk of lowering of the brightness of an image caused by a performance of the polarized beam changing element.

Embodiment 9

Next, explanation will be mage of a display unit in an embodiment 9 of the present invention. This display unit in this embodiment is basically the same as that of the display unit explained in the embodiment 3 with reference to FIG. 16, except that the liquid crystal display element 1 is small-sized, and another display element is arranged to a part corresponding to the far-distant display zone 1f of the liquid crystal display element 1. Thus, like reference numerals are used to denote like parts to those of the display unit explained in the embodiment 3.

Figure 26:
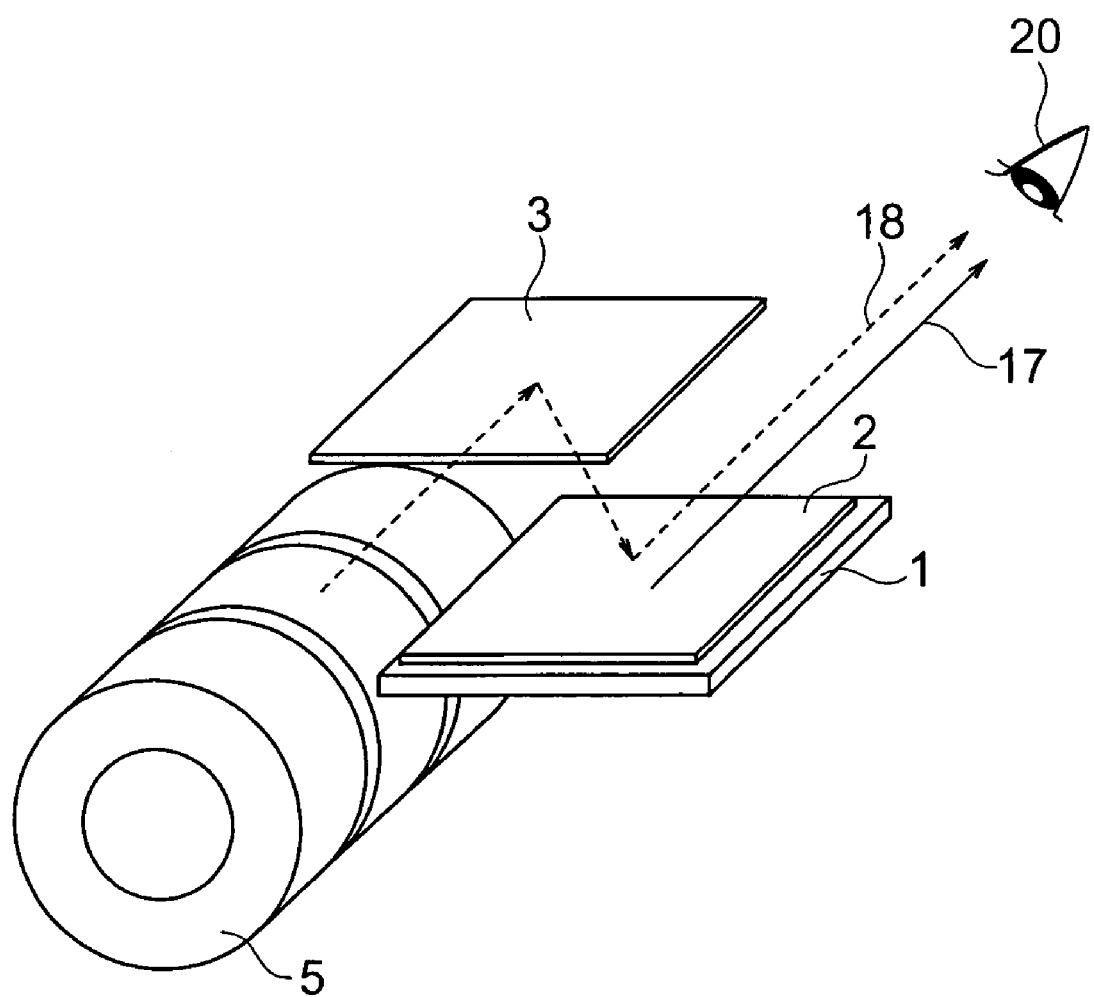
FIG. 26 is a schematic perspective view illustrating a display unit in an embodiment 9 of the present invention.

Referring to FIG. 26 which is a schematic sectional perspective view illustrating the display unit in this embodiment, this display unit incorporates, as an object to be viewed, a display element 5 which changes patterns by turning a reel provided with a plurality of patterns on its outer peripheral surface (and which will be hereinbelow referred to as "reel display element"), as used in a slot machine or the like, in addition to the liquid crystal display element 1.

The reel display element 5 has, as a screen, patterns which are provided on the outer peripheral surface of the reel and which are illuminated by a lighting unit which is not shown. The screen of the reel display element 5 is an object to be viewed located at a far-distant depthwise position or at a long distance position as viewed from the viewer 20 while the screen of the liquid crystal display element 1 is an object to be viewed located at a near-distant depthwise-position or a short distance position as viewed from the viewer 20.

In this case, an image beam 17 emitted from the liquid crystal display element 1 is transmitted through the half mirror (polarized beam splitting element) 2 with no substantial loss, and is viewed by the viewer 20. An image beam 18 radiated from the reel display element 5 is reflected at total reflection mirror 3, and is led to the half mirror (polarized beam splitting element) 2A. An image beam radiated from the reel display element 5 is, in general, non-polarized, and accordingly, the image beam 18 incident upon the half mirror (polarized beam splitting element) 2 is reflected at the half mirror (polarized beam splitting element) 2 by about a half thereof, and is then viewed by the viewer 20.

That is, the image beam 18 radiated from the reel display element 5 is lost at the half mirror 2 by its half, but the image beam 17 emitted from the liquid crystal display element 1 can be viewed by the viewer 20 with no loss since the polarized beam splitting element as the half mirror 2 is used, thereby it is possible to display a bright image.

In this case, the screen of the reel display element 5 is further from the viewer 20 than the screen of the liquid crystal display element 1 by a distance substantially corresponding to the sum of the distance from the screen of the reel display element 5 to the total reflection mirror 3 and the distance from the total reflection mirror 3 to the half mirror (polarized beam splitting element) 2. Thus, two display screens at different depthwise position are viewed by the viewer 20 being superposed with each other.

That is, in this display unit, an image on the screen of the liquid crystal display element 1 is viewed being profiled in front the screen of the reel display element 5.

Thus, the above-mentioned display is extremely effective in a game machine such as a pin-ball game machine or a slot machine in order to enhance the so-called stage effect.

It is noted that the above-mentioned display can be materialized by arranging a liquid crystal display in front of the reel display element. In this case, although light from the screen of the reel display element 5 has to pass through the liquid crystal display panel, not less than 90% of the light would be lost through the liquid crystal display panel since the transmission factor of a liquid crystal display panel is usually less than 10%.

On the contrary, in the display unit in this embodiment, since light from the reel display element is not transmitted through the liquid crystal display elements although it is lost by about 50% at the half mirror, it is possible to display a bright image.

Further, in the display unit in this embodiment, since the object to be viewed at two different depthwise positions (distances) as viewed from the viewer is actually located in substantially one and the same plane, it is possible to materialize a thin display unit actually having a depthwise length which is shorter than a depthwise distance perceived by the viewer.

Embodiment 10

Next, explanation will be made of a display unit in an embodiment 9 of the present invention. The configuration of the display unit which will be explained in this embodiment is basically the same as that of the display unit in the embodiment 3 explained with reference to FIG. 16, except that the liquid display unit is small-sized, and another display element is located in a part corresponding to the near-distance display zone 1n of the liquid display element 1. Thus, like reference numerals are used to denote like parts to those explained in the embodiment 3 so as to abbreviate detailed description thereto.

Figure 27:
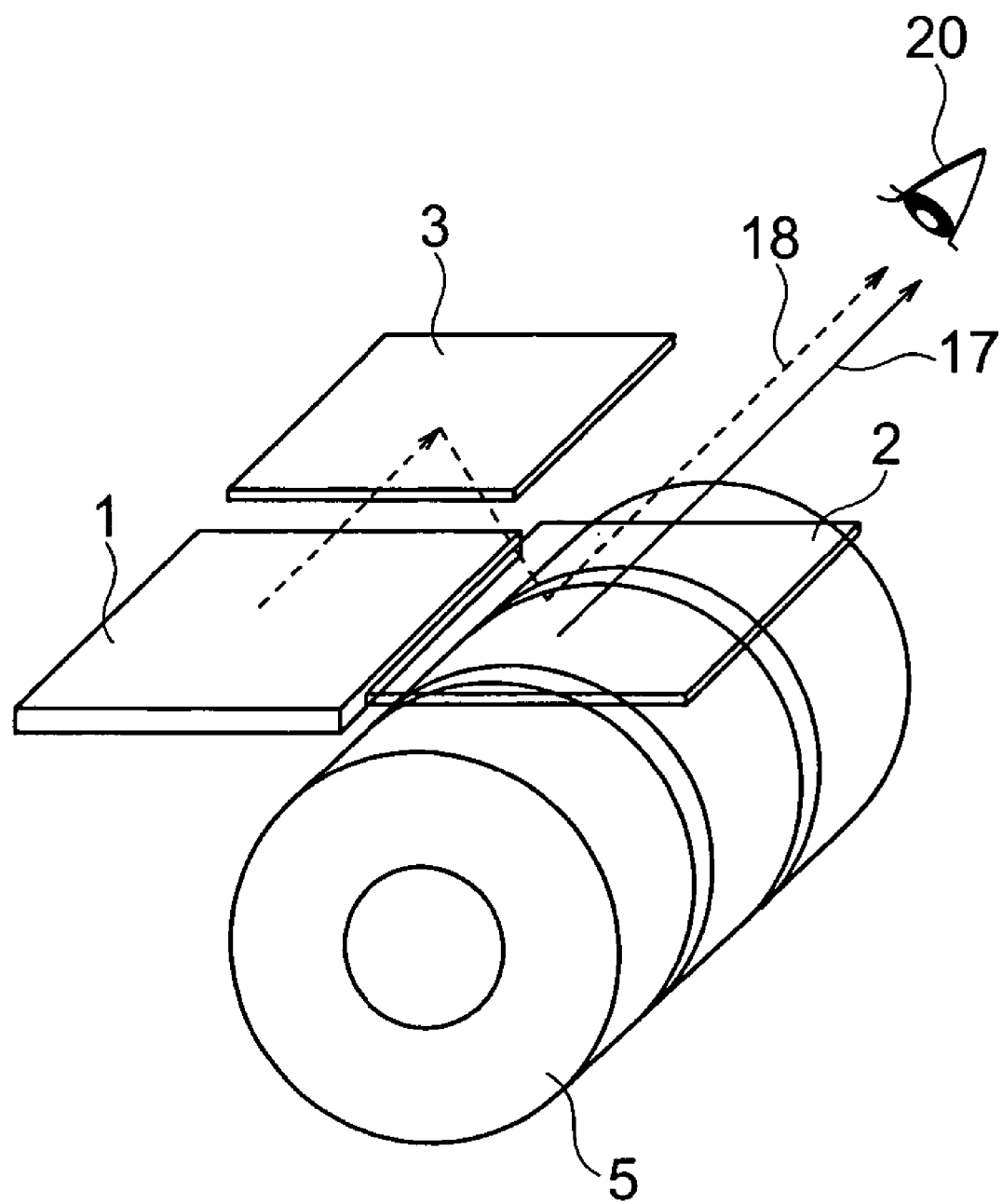
FIG. 27 is a schematic perspective view illustrating a display unit in an embodiment 10 of the present invention.

Referring to FIG. 27 which is a schematic perspective view illustrating a display unit in the embodiment 10, in this display unit, a reel display element 5 used in a slot machine or the like is incorporated as an object to be viewed, in addition to the liquid crystal display element 1.

The screen of the reel display element 5 is an object to be viewed located at a near-distant depthwise position as viewed from the viewer 20, that is, a short distance position, and the screen of the liquid crystal display element is an object to be viewed located at a far-distant depthwise position as viewed from the viewer 20, that is a long-distance position.

Further, a half mirror 2 formed of a polarized beam splitting element is arranged on the screen of the reel display element 5 on the viewer 20 side.

In this case, an image beam radiated from the screen of the reel display element 5 is nonpolarized, and accordingly, it is transmitted through the half mirror (polarized beam splitting element) by about 50% thereof, and is viewed by the viewer 20. Further, an image beam 18 emitted from the liquid crystal display element 1 is reflected at the total reflection mirror 3, and is then incident upon the half mirror (polarized beam splitting element) 2.

The image beam emitted from the liquid crystal display element is a linearly polarized beam, and accordingly, the image beam 18 incident upon the half mirror (polarized beam splitting element) 2 is reflected by a substantially all part with substantially no loss, and is viewed by the viewer 20.

That is, in this display unit, an image beam 17 radiated from the reel display element 5 is lost by about a half thereof through the half mirror (polarized beam splitting element) 2, but an image beam emitted from the liquid crystal display element 1 is viewed by the viewer with substantially no loss since a polarized beam splitting element is used as the half mirror 2, thereby it is possible to display a bright image.

In this case, the screen of the liquid crystal display element 1 is further from the viewer 20 than the screen of the reel display element 5 by a distance corresponding to the sum of the screen of the liquid crystal display element 1 to the total reflection mirror 3 and the distance from the total reflection mirror 3 to the half mirror (polarized beam splitting element) 2. Thus, the screens located at different depthwise positions can be observed by the viewer 20, being superposed with each other.

That is, in the display unit in this embodiment, the screen of the liquid display element 1 can be seen in rear of the screen of the reel display element 5.

Such a display is effective for the so-called stage effect in a game machine such as a pin-ball game machine or a slot machine.

Embodiment 11

Next, explanation will be made of a display unit in an embodiment 10 of the present invention. The configuration of the display unit which will be explained in this embodiment is basically the same as that of the display unit in the embodiment 4 explained with reference to FIG. 19, except that the liquid display unit is small-sized, and another display element is located in a part corresponding to the far-distance display zone 1f of the liquid display element 1. Thus, like reference numerals are used to denote like parts to those explained in the embodiment 4 so as to abbreviate detailed description thereto.

Figure 28:
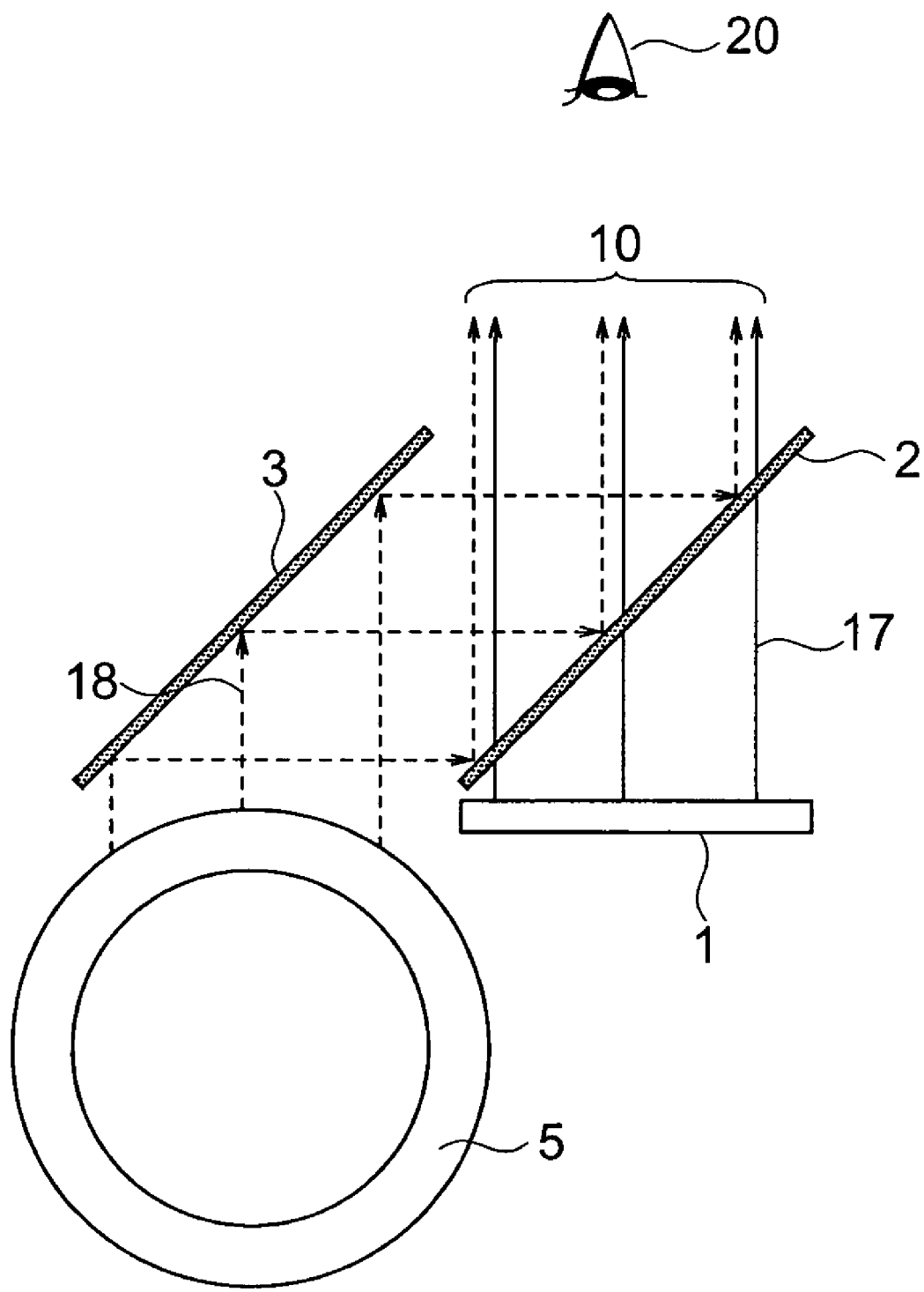
FIG. 28 is a schematic sectional view illustrating a display unit in an embodiment 11 of the present invention.

Referring to FIG. 28 which is a schematic sectional view illustrating a display-unit in the embodiment 11, in this display unit, a display element 5 (which will be referred to as "a reel display element") adapted to change over patterns by turning a reel having a peripheral surface on which a plurality of patterns serving as an object to be viewed, and used in a slot machine or the like is incorporated as an object to be viewed, in addition to the liquid crystal display element 1.

The patterns on the outer peripheral surface of the reel illuminated by a lighting unit which is not shown serves a screen. The screen of the reel display element 5 is an object to be viewed located at a far-distant depthwise position as viewed from the viewer 20, that is, a long distance position, and the screen of the liquid crystal display element 1 is an object to be viewed located at a near-distant depthwise position as viewed from the viewer 20, that is, a short-distance position.

In this case, an image beam 17 emitted from the liquid crystal display element 1 is transmitted through the half mirror (polarized beam splitting element) 2 with substantially no loss, and is viewed by the viewer 20. Further, an image beam 18 radiated from the screen of the reel display element 5 is reflected at the total reflection mirror 3, and is directed to the half mirror (polarized beam splitting element) 2.

An image beam radiated from the reel display element 5 is in general nonpolarized, and accordingly, the image beam 18 incident upon the half mirror (polarized beam splitting element) 2 is reflected by about a half thereof, and is viewed by the viewer 20.

That is, in this display unit, an image beam 18 radiated from the reel display element 5 is lost by about a half thereof through the half mirror (polarized beam splitting element) 2, but an image beam 17 emitted from the liquid crystal display element 1 is viewed by the viewer with substantially no loss since a polarized beam splitting element is used as the half mirror 2, thereby it is possible to display a bright image.

In this case, the screen of the reel display element 5 is further from the viewer 20 than the screen of the liquid crystal display element 1 by a distance substantially corresponding to the distance from the total reflection mirror 3 to the half mirror 2. Thus, the screens located at different depthwise positions can be observed by the viewer 20, being superposed with each other.

That is, in the display unit in this embodiment, the screen of the liquid display element 1 can be seen being profiled in front of the screen of the reel display element 5.

Such a display is effective for the so-called stage effect in a game machine such as a pin-ball game machine or a slot machine.

It is noted that the above-mentioned display can be materialized by arranging a liquid crystal display panel in front of the reel display element. In this case, although light from the screen of the reel display element has to pass through the liquid crystal display panel, light not less than 90% thereof is lost since the transmission factor of the liquid crystal display panel is less than 10%.

On the contrary, in the display unit in this embodiment, although light from the screen of the reel display element is lost by about 50% thereof at the half mirror 2, since it has not to pass through the liquid crystal panel, it is possible to display a bright image.

Further, in the display unit in the embodiment, objects to be viewed located at two different depthwise positions (distances) as viewed from the viewer, are set substantially in one and the same plane, there may be materialized a thin display unit having an actual depthwise length which is shorted than a depthwise distance perceived by the viewer.

Embodiment 12

Explanation will be hereinbelow made of a display unit in an embodiment 12 of the present invention. The configuration of the display unit explained in this embodiment is basically the same as that of the display unit explained in the embodiment 1 with reference to FIGS. 1 to 3, except that the screen of the liquid crystal display element 1 are divided into three display zones, and an additional display zone is further defined. Thus, like reference numerals are used to denote like parts to those explained the embodiment 1 so as to abbreviate detailed explanation thereto.

Figure 29:
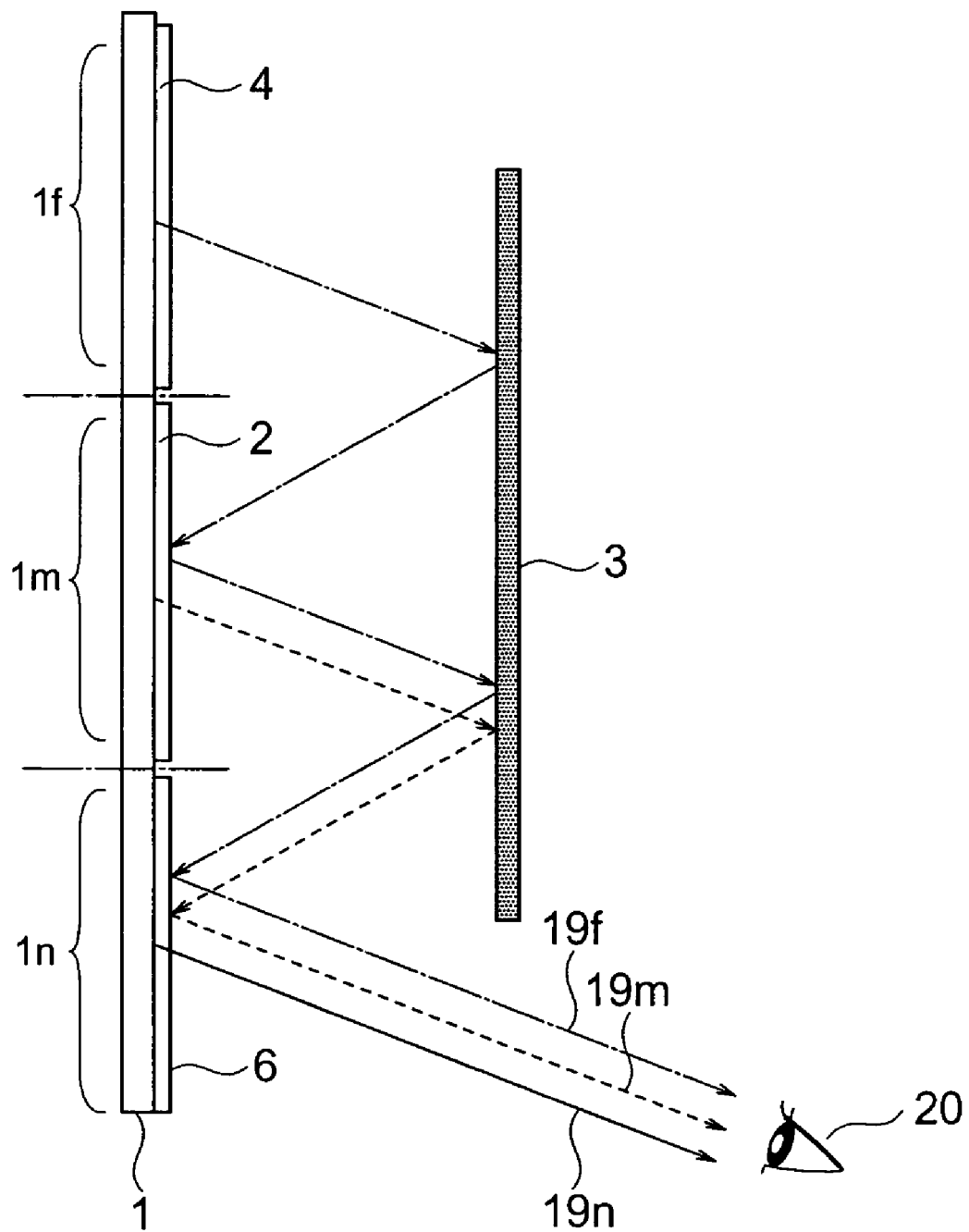
FIG. 29 is a schematic sectional view illustrating a display unit in an embodiment 12 of the present invention.

Referring to FIG. 29 which is a schematic sectional view illustrating the display unit in this embodiment, in this display unit, the screen of the liquid display element 1 is divided into three zones corresponding to objects to be viewed located at three different depthwise positions as viewed from the viewer 20. Thus, the display zone corresponding to the object to be viewed located at a furthest distant depthwise position, or a longest distance position as viewed from the viewer will be hereinbelow referred to as "far-distant display zone" 1*f* while the display zone corresponding to the object to be viewed located at a nearest distant depthwise position or a shortest distance position as viewed from the viewer, as "near-distant display zone 1*n*", and the display zone corresponding to the object to be viewed located at a middle depthwise position or an intermediate distance position as viewed from the viewer, as "mid-distant display zone 1*m*".

Further, the polarized beam changing element 4 is laid at the front surface of the far-distant display zone 1*f* while the half-mirror 2 is laid at the front surface of the mid-distant display zone 1*m*, and a half mirror 6 is laid at the front surface of the near-distant display zone 1*n*.

The three display zones 1*f*, 1*m*, in of the liquid crystal display element 1 correspond respectively to objects to be viewed located at three different depthwise positions (distances) as viewed from the viewer 20. Thus, the display unit in this embodiment incorporates the mirrors in the number of three which is equal to that of the objects to be viewed located at the different depthwise positions, that is, the total reflection mirror 3, the half mirror (polarized beam splitting element) 2 and the half mirror 6.

The total reflection mirror 3 has such a function that it reflects an image beam 19*f* emitted from the far-distant display zone 1*f* of the liquid crystal display element 1 onto the half mirror (polarized beam splitting element) 2, and further reflects an image beam 19*m* emitted from the mid-distant display zone 1*m* onto the half-mirror 6.

As the total reflection mirror 3, there may be used the one which is composed of an optically isotropic flat transparent substrate made of glass or plastic and a metal film, as a reflection surface, made of silver, aluminum or the like having a high reflection factor, or a dielectric multilayer film serving as a reflection surface. In this embodiment, it is preferable for obtaining a bright image to use a mirror, as the total reflection mirror 3, having a high reflection factor for the image beam 19*f* and the image beam 19*b* which are incident thereupon.

The total reflection mirror 3 is located at such a position that it does not interrupt the near-distant display zone 1*n* as viewed from the viewer 20, and further, the far-distant display zone 1*f*, mid-distant display zone 1*m* and the near-distant display zone 1*n* can be seen being superposed with one another through the half-mirror 6.

Further, the total reflection mirror 3 may have its reflection surface having a size which is at least not less than an area extending from the far-distant display zone 1*f* to the mid-distant display zone 1*m* of the liquid crystal display element 1, and in such a case that the display unit is assembled with a high degree of accuracy, this size may be equal to the area extending from the far-distant display zone 1*f* to the mid-distant display zone 1*m* in order to reduce the area of the component. However, in view of deviation in alignment, it is practical that the size is set to be slightly greater than the area extending from the far-distant display zone 1*f* to the mid-distant display zone 1*m*.

In the display unit in this embodiment, the half mirror (polarized beam splitting element) 2 has such a function as to synthesize the image beam 19*m* emitted from the mid-distant display zone 1*m* (which will be hereinbelow referred to as "mid-distant image beam 19*m*") and the image beam 19*f* emitted from the far-distant display zone 1*f* (which will be hereinbelow referred to as "far-distant image beam 19*f*") with each other. Further, the half mirror 6 has such a function as to synthesize the mid-distant image beam 19*m* and the far-distant image beam 19*f* with the image beam 19*n* emitted from the near-distant display zone 1*n* (which will be hereinbelow referred to as "near-distant image beam 19*n*").

Since the liquid crystal display element 1 emits, as an image beam, a linearly polarized beam, in order to obtain a bright image, it is preferable to use, as the half mirror (polarized beam splitting element) 2, a polarized beam splitting element which transmits therethrough the image beam emitted from the liquid crystal display element 1, but reflects a linearly polarized beam having an axis of polarization orthogonal to that of the former image beam.

Meanwhile, the half mirror 6 is the one which has such a function as to transmit therethough or reflects image beams which are incident thereupon from different directions, irrespective their polarized states so as to synthesize these beams with each other in one direction. As this half mirror, there may be used the one which is composed of a flat transparent substrate made of glass, plastic or the like and a metal thin film made of silver, aluminum or the like, as a reflection surface which transmits a part of light incident thereupon but reflects another part thereof, or a dielectric multilayer film, as a reflection surface, which reflects about a half part of incident light but reflects another half part thereof.

The polarized beam changing element 4 is laid at the front surface of the far-distant display zone if. This polarized beam changing element 4 is adapted to change the far-distant image beam 19*f* emitted from the far-distant display zone 1*f* into a linearly polarized beam having an axis of polarization which is turned by an angle of 90 deg. As the polarized beam changing element 4, there may be used a polarizer or a ½ wavelength plate for turning the axis of polarization of a polarized light beam incident thereupon by an angle of 90 deg.

In this case, the polarized beam changing element 4 may have a necessary minimum size required for covering the far-distant display zone 1*f* as viewed from the viewer. In such a case that the display unit is assembled with a high degree of accuracy with the polarized beam changing element 4 being in parallel with the screen of the liquid crystal display element 1, the size thereof is set to be equal to that of the far-distant display zone 1*f*. Thus, the area of the component becomes necessary minimum, and the costs can be reduced. Incidentally, it is practical that the polarized beam changing element 4 has a size which is slightly larger than that of the far-distant display zone 1*f* in view of deviation in alignment.

As the polarized beam changing element 4, there may be used a ½ wavelength plate formed of a liquid crystal cell which is composed of two transparent substrates subjected to an orientational process and charged therebetween with a liquid crystal layer in which the longitudinal axes of molecules are twisted by an angle of 90 deg. between the two transparent substrates or a phase difference film or a twisted structure which is a lamination of phase difference films. It is noted that these polarized elements has a most effective function for light which is incident thereupon, perpendicular thereto. Accordingly, the polarized beam changing element 4 may be arranged being inclined to the screen of the liquid crystal display element 1 in order to allow the far-distant image beam 19*f* to be incident upon the polarized beam changing element 4, perpendicular thereto.

In the display unit in this embodiment, the image beam 19 emitted from the far-distant display zone 1*f* of the liquid crystal display element 1 is transmitted through the polarized beam changing element 4 so as to be changed into a linearly polarized beam having an axis of polarization turned by an angle of 90 deg., then is reflected at the total reflection mirror 3, and is thereafter reflected at the half mirror (polarized beam splitting element) 2 with substantially no loss. Then it is directed again to the total reflection mirror 3.

Further, the image beam 19m emitted from the mid-distant display zone 1m is transmitted through the half mirror (polarized beam splitting element) 2 with substantially no reflection, and is directed to the total reflection mirror 3.

That is, with such a configuration that the polarized beam changing element 4 is laid at the front surface of the far-distant display zone 1f, and a polarized beam splitting element is used as the half mirror 2, the far-distant image beam 19f and the mid-distant image beam 19m are synthesized with each other with substantially no loss, and are directed to the total reflection mirror 3.

The far-distant image beam 19f and the mid-distant image beam 19m directed to the total reflection mirror 3 are reflected at the total reflection mirror 3, and then are directed to the half-mirror 6, and a part of them are reflected at the half-mirror 6, and is viewed by the viewer 20.

Meanwhile, the image beam 19n emitted from the near-distant image display zone 1n is transmitted in part through the half-mirror 6, and is viewed by the viewer 20.

In this configuration, the mid-distant display zone 1m is further from the viewer 20 than the near-distant display zone 1n by a distance which is substantially equal to the sum of the distance from the mid-distant display zone 1m to the total reflection mirror 3 and the distance from the total reflection mirror 3 to the half-mirror 6, as viewed from the viewer 20. Further, the far-distant display zone 1f is further from the viewer 20 than the mid-distant display zone 1f by a distance which is substantially equal to the sum of the distance from the far-distant display zone 1f to the total reflection mirror 3 and the distance from the total reflection mirror 3 to the half mirror (polarized beam splitting element) 2, as viewed from the viewer 20.

Thus, two-dimensional images displayed on the display zones located at the three different depthwise positions as viewed from the viewer 20 are displayed being superposed with one another. That is, the display unit in this embodiment can display the objects to be viewed located at three different depthwise positions as viewed from the viewer 20 in such a condition that they are superposed with one another. Thereby, it is possible to materialize a display element which enables the viewer to perceive deep depthwise feeling.

Further, in the display unit in this embodiment, the objects to be viewed located at the three different positions as viewed from the viewer are actually located in one and the same plane, thereby it is possible to materialize a thin display unit actually having a depthwise length which is shorter than the depthwise distance perceived by the viewer.

In particular, in this display unit in this embodiment, the three objects are set in the screen of a single liquid crystal display element, thereby it is possible to reduce the number of components.

Further, since the polarized beam splitting element is used as the half mirror 2, the far-distant image beam 19f and the mid-distance image beam 19m can be synthesized together with substantially no loss, thereby it is possible to materialize a higher bright display unit which can produce an image beam with less loss, in comparison with a conventional display unit which has not used a polarized beam splitting means as the half mirror.

It is noted here that not less than four objects to be viewed located at different depthwise positions may be provided. In this configuration, the screen of the liquid display element 1 is divided into not less than four display zones, and reflectors in the number the same as the number of objects to be viewed, that is, the number of the divided display zones are arranged. In this case, one of the reflectors is a total reflection mirror which is laid in front of the liquid crystal display element 1, being spaced from the screen of the liquid crystal display element 1 by a predetermined distance, and in parallel with the screen of the liquid display element 1.

Further, the remaining reflectors are half mirrors, and are laid in parallel with the screen of the liquid crystal display element, in front of the all display zones except the one which corresponds to an object to be viewed located at a furthest distance position or a longest distance position as viewed from the viewer.

In order to obtain a higher bright image, one of the half mirrors arranged in front of the display zones except the one which corresponds to an object to be viewed located at a furthest distance position or the longest distance position as viewed from the viewer, is a polarized beam splitting element.

The polarized beam splitting element reflects thereupon a linearly polarized beam emitted from the liquid crystal display element 1, but transmits therethrough a light beam having an axis of polarization which is orthogonal to that of the former beam. A polarized beam changing element is interposed between the display zone in front of which the polarized beam splitting element is arranged, and the polarized beam splitting element.

In this case, an image beam emitted from a display zone in front of which the polarized beam splitting element is arranged, and an image beam emitted from a display zone located at a depthwise position further than that of the former display zone as viewed from the viewer are synthesized with each other with substantially no loss. Thus, in comparison with a display unit in which no polarized beam splitting element is used as a half mirror, it is possible to materialize a high bright display unit which can produce an image beam with less loss.

In order to obtain a bright image with a configuration other than those as stated above, a polarized beam changing element is arranged in front of a display zone corresponding to an object to be viewed located at a depthwise position which is furthest as viewed from the viewer, that is, at a longest distance as viewed from the viewer. Further, the half mirror located in front of the display zone corresponding to an object to be viewed at a depthwise position which is secondarily far from the viewer is polarized beam splitting element which transmits therethrough a linearly polarized beam emitted from the liquid crystal display element but reflects a linearly polarized beam having an axis of polarization which is orthogonal to that of the former beam.

In this configuration, an image beam from the display zone corresponding to the object to be viewed at the furthest distance depthwise position as viewed from the viewer and an image beam emitted from the display zone corresponding to the object to be viewed located at a secondarily far distance depthwise position as viewed from the viewer are synthesized together with substantially no loss. Thereby it is possible to provide a display unit which can produce a bright image with less loss of an image beam in comparison with a display unit without using a polarized beam splitting element.

It is noted that those of the half mirrors laid along the display zones of the liquid crystal display element, for which polarized beam splitting elements are not used, and which are adjacent to each other may be integrally incorporated with each other. In this configuration, the size of the half mirrors becomes larger, but the number thereof can be reduced. That is, in the display unit in this embodiment, although the reflectors are provided in the number same as that of the objects to be viewed located at different depthwise positions as viewed from the viewer, the number of the reflectors can be apparently reduced by integrally incorporating a plurality of the reflectors with each other. Thus, it is practical that the number of the reflectors is not greater than the number of objects to be viewed but is not less than two in order to reduce the number of components.

Embodiment 13

Explanation will be hereinbelow made of a display unit in an embodiment 13 of the present invention. The configuration of the display unit explained in this embodiment is basically the same as that of the display unit explained in the embodiment 5 with reference to FIG. 21, except that the screen of the liquid crystal display element 1 is divided into three display zones, and an additional half mirror is incorporated. Thus, like reference numerals are used to denote like parts to those explained in the embodiment 5 so as to abbreviate detailed explanation thereto.

Figure 30:
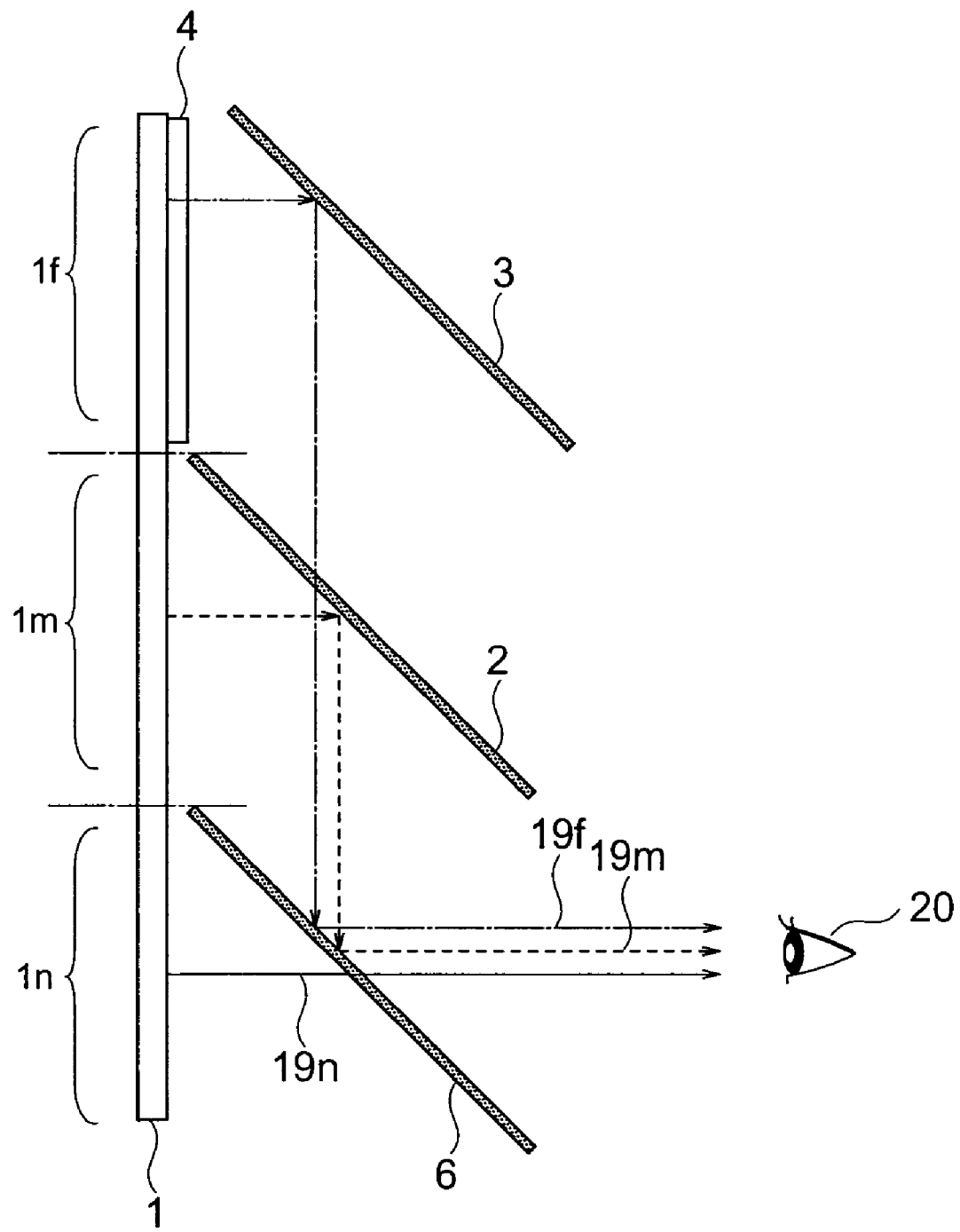
FIG. 30 is a schematic sectional view illustrating a display unit in an embodiment 13 of the present invention.

Referring to FIG. 30 which is a schematic sectional view illustrating a display unit in the embodiment 12 of the present invention. The screen of the display unit is divided into three display zones for convenience sake. These display zones correspond to objects to be viewed located at three different positions (distances), as viewed from the viewer 20. The display zone corresponding to an object to be viewed located at a depthwise position furthest from the viewer, that is, having a longest distance from the viewer 20 will be referred to as "far-distant display zone 1$f$", the display zone corresponding to an object to be viewed located at a depthwise position nearest from the viewer 20, that is, having a shorted distance from the viewer 20 as "near-distant display zone", and the display zone corresponding to an object to be viewed located at a middle depthwise position as viewed from the viewer, that is, having a middle distance from the viewer, as "mid-distant display zone".

The total reflection mirror 3 is arranged in front of the far-distant display zone 1$f$ of the liquid display element 1, being inclined to the screen of the liquid display element 1 by an angle of 45 deg. Further, the half mirror (polarized beam splitting element) 2 is arranged in front of the mid-distant display zone 1$m$, and a half-mirror 6 is arranged in front of the near-distant display zone 1$n$, being inclined to the screen surface of the liquid crystal display element 1 by an angle of 45 deg. Further, the polarized beam changing element 4 is arranged in front of the far-distant display zone 1$f$ so as to cover the far-distant display zone 1$f$.

The three display zones 1$f$, 1$m$, 1$n$ of the liquid crystal display element 1 correspond to three objects to be viewed located at three different depthwise positions as viewed from the viewer 20. Thus, in the display unit in this embodiment, three reflectors in the same number as that of the objects to be viewed at three different depthwise positions, that is, the total reflection mirror 3, the half mirror (polarized beam splitting element) 2 and the half mirror 6, are incorporated.

The total reflection mirror 3 has such a function that it reflects an image beam 19$f$ emitted from the far-distant image zone 1$f$ of the liquid crystal display element 1, onto the half mirror (polarized beam splitting element) 2. As the total reflection mirror 3, the one which is composed of an optically isotropic flat transparent substrate made of glass or plastic having a reflection surface formed of a metal film with a high reflection factor, made of silver or aluminum, or made of a dielectric multilayer film. It is desirable that the total reflection mirror 3 has a high reflection factor for the image beam 19$f$ which incident thereupon in order to obtain a bright image.

The half mirror 2 has such a function that it synthesizes the image beam 19$m$ emitted from the mid-distant display zone 1$m$ of the liquid crystal display element 1 (which will be hereinbelow referred to "mid-distant image beam 19$m$") and the image beam 19$f$ emitted from the far-distant display zone 1$f$ of the liquid crystal display element 1 (which will be hereinbelow referred to as "far-distant image beam 19$f$") with each other. The half mirror 6 has such a function that it synthesizes the mid-distant beam 19$m$ and the far-distant image beam 19$f$ with the image beam 19$n$ emitted from the near-distant display zone 1$n$ of the liquid crystal display element 1 (which will be hereinbelow referred to as "far-distant image beam").

The liquid crystal display element 1 emits a linearly polarized beam as an image beam. In this embodiment, the polarized beam changing element 4 is laid in front of the far-distant display zone 1$f$ of the liquid crystal display element 1 so as to cover the far-distant display zone 1$f$. Further, as the half mirror 2, there is used a polarized beam splitting element which reflects a linearly polarized beam emitted from the liquid crystal display element 1 but transmits therethrough a linearly polarized beam having an axis of polarization orthogonal to that of the former beam.

The half mirror 6 has such a function that it reflects thereupon or transmits therethrough beams incident thereupon in two different directions, depending upon a polarized state so as to synthesizes the beams in one direction. As the half-mirror 6, there may be used a flat transparent substrate having a reflection surface formed of a metal thin film made of silver and aluminum with a high reflection factor, for transmitting therethrough a part of a beam and reflecting thereupon the other part of the beam, or made of a dielectric multi-layer film for transmitting therethrough about a half of a light beam and reflecting about the other half of the beam.

The polarized beam changing element 4 changes an image beam emitted from the screen of the liquid crystal display element into a linearly polarized beam having an axis of polarization turned by an angle of 90 deg.

As the polarized beam changing element 4, there may be used a ½ wavelength plate formed of a liquid crystal cell which is composed of two transparent substrates subjected to an orientational process and charged therebetween with a liquid crystal layer in which the longitudinal axes of molecules are twisted by an angle of 90 deg. between the two transparent substrates, a phase difference film or a twisted structure which is a lamination of phase difference films. It is noted that these polarized elements has a most effective function for light which is incident thereupon, perpendicular thereto. Accordingly, the polarized beam changing element 4 may be arranged being in parallel with the screen of the liquid crystal display element 1 in order to allow the far-distant image beam 19$f$ to be incident upon the polarized beam changing element 4, perpendicular thereto.

In this case, the polarized beam changing element 4 may have a necessary minimum size required for covering the far-distant display zone 1$f$. In such a case that the display unit is assembled with a high degree of accuracy, the size thereof is set to be equal to that of the far-distant display zone 1$f$. Thus, the area of the component becomes necessary minimum. Incidentally, it is practical that the polarized beam changing element 4 has a size which is slightly larger than that of the far-distant display zone 1$f$ in view of deviation in alignment.

In the display unit in this embodiment, the far-distant image beam 19 emitted from the far-distant display zone 1$f$ of the liquid crystal display element 1 is transmitted through the polarized beam changing element 4 so as to be changed into a linearly polarized beam having an axis of polarization turned by an angle of 90 deg., then is reflected through the total reflection mirror 3, and is thereafter transmitted through the half mirror (polarized beam splitting element) 2 with substantially no reflection. Then it is directed to the half mirror 6. Further, the mid-distant image beam 19*m* emitted from the mid-distant display zone 1*m* is reflected by a substantially all part upon the half mirror (polarized beam splitting element) 2 with substantially no transmission.

That is, with such a configuration that the polarized beam changing element 4 is laid at the front surface of the far-distant display zone 1*f*, and a polarized beam splitting element is used as the half mirror 2, the far-distant image beam 19*f* and the mid-distant image beam 19*m* are synthesized with each other with substantially no loss, and are directed to the half mirror 6.

The far-distant image beam 19*f* and the mid-distant image beam 19*m* directed to the half mirror 3 are reflected in part at the half-mirror 6, and is viewed by the viewer 20.

Meanwhile, the near-distant image beam 19*n* emitted from the near-distant image display zone 1*n* is transmitted in part through the half-mirror 6, and is viewed by the viewer 20.

In this configuration, the mid-distant display zone 1*m* is further from the viewer 20 than the near-distant display zone 1*n* by a distance which is equal to the distance from the half mirror 3 to the half-mirror 6, as viewed from the viewer 20. Further, the far-distant display zone 1*f* is further from the viewer 20 than the mid-distant display zone 1*f* by a distance which is substantially equal to the distance from the half mirror 3 to the half mirror (polarized beam splitting element) 2, as viewed from the viewer 20.

Thus, two-dimensional images displayed on the display zones located at the three different depthwise positions as viewed from the viewer 20 are displayed being superposed with one another. That is, the display unit in this embodiment can display the objects to be viewed located at three different depthwise positions as viewed from the viewer 20 in such a condition that they are superposed with one another. Thereby, it is possible to materialize a display element which enables the viewer to perceive deep depthwise feeling.

It is noted that the screen of the liquid crystal-element 1 in the display unit in this embodiment can be viewed, in particular, normal thereto. Thus, an image displayed on the screen of the liquid crystal display element 1 can be viewed as it is.

Further, in the display unit in this embodiment, the objects to be viewed located at the different positions as viewed from the viewer are actually located in one and the same plane, thereby it is possible to materialize a thin display unit actually having a depthwise length which is shorter than the depthwise distance perceived by the viewer.

In particular, in this display unit in this embodiment, the three objects are set in the screen of a single liquid crystal display element, thereby it is possible to reduce the number of components.

Further, since the polarized beam splitting element is used as the half mirror 2, the far-distant image beam 19*f* and the mid-distance image beam 19*m* can be synthesized together with substantially no loss, thereby it is possible to materialize a higher bright display unit which can produce an image beam with less loss, in comparison with a conventional display unit which has not used a polarized beam splitting means as the half mirror.

It has been clearly understood in view of the explanation made hereinabove that in the case of using the polarized beam changing element 4 in front of the mid-distant display zone 1*m* of the liquid crystal display element 1 so as to cover the mid-distant display zone 1*m*, it is desirable to use a polarized beam splitting element, as the half mirror 2, which transmits therethrough a linearly polarized beam emitted from the liquid crystal display element 1 but reflects thereupon a linearly polarized beam having an axis of polarization orthogonal to that of the former beam, in order to obtain a bright image.

It is noted that not less than four objects to be viewed located at different depthwise positions as viewed from the viewer may be provided even in such a case that the reflectors including a half mirror are arranged being inclined to the screen of the liquid crystal display element 1 in the display unit in this embodiment.

Explanation will be hereinbelow made of the configuration in which the screen of the liquid display element 1 is divided into not less than four display zones, and reflectors in the number the same as the number of division of the display zones are arranged.

In this configuration, except a reflector located in front of a display zone corresponding to an object to be viewed which is at a furthest distance depthwise position as viewed from the viewer, that is, a longest distance position as viewed from the viewer, all reflectors are half-mirrors. Further, the reflector located in front of the display zone corresponding to the object to be viewed located at a furthest distance depthwise position as viewed from the viewer is a total reflection mirror or a mirror having a high reflection factor for an image beam incident thereupon.

In order to obtain a bright image, one of the half mirrors which are arranged in front of the display zones other than that located in front of the display zone corresponding to the object to be viewed located at the furthest distance depthwise position as viewed from the viewer is a polarized beam splitting element.

The polarized beam splitting element transmits therethrough a linearly polarized beam emitted from the liquid crystal display element 1, but reflects thereupon a light beam having an axis of polarization which is orthogonal to that of the former beam. A polarized beam changing element is arranged between the display zone in front of which the polarized beam splitting element is arranged, and the polarized beam splitting element.

In this configuration, an image beam from the display zone in front of which the polarized beam splitting element is arranged, and an image beam emitted from the display zone corresponding to the object to be viewed located at a position having a distance longer than that of the former display zone as viewed from the viewer are synthesized together with substantially no loss. Thus, in comparison with a display unit in which no polarized beam splitting element is used as a half mirror, it is possible to materialize a higher bright display unit which can produce an image beam with less loss.

In order to obtain a bright image with the other configuration, a polarized beam splitting element is laid in front of the display zone corresponding to the object to be viewed at the furthest distance depthwise position as viewed from the viewer, or at the longest distance position as viewed from the viewer. Further, the half mirror arranged in front of the display zone corresponding to the object to be viewed located at a secondary far distance depthwise position as viewed from the viewer, or a secondary long distance position as viewed from the viewer is a polarized beam splitting element which reflects a linearly polarized beam emitted from the liquid crystal display element but reflects a linearly polarized beam having an axis of polarization orthogonal to that of the former beam.

In this configuration, an image beam emitted from the display zone corresponding to the object to be viewed located at the furthest distance depthwise position as viewed from the viewer, and an image beam emitted from the display zone corresponding to the object to be viewed located at a secondary far distance depthwise position as viewed from the viewer are synthesized together with substantially no loss. Thus, in comparison with a display unit in which no polarized beam splitting element is used as a half mirror, it is possible to materialize a higher bright display unit which can produce an image beam with less loss.

Embodiment 14

Explanation will be made of an equipment incorporating a display unit according to the present invention with reference to the drawings. Explanation will be made of a pinball game machine, as an example, which is typical of game machines.

Figure 31:
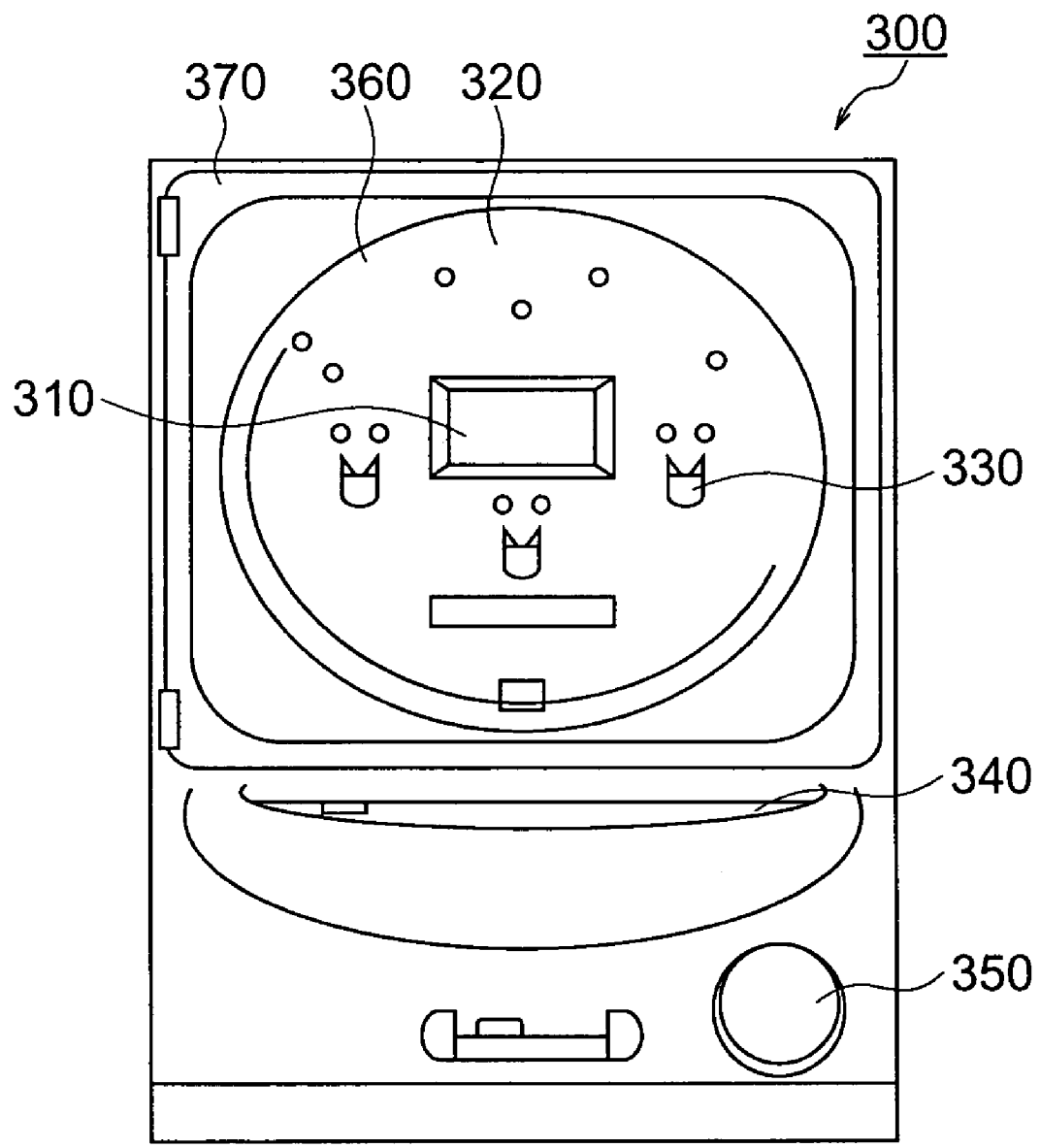
FIG. 31 is a schematic front view illustrating a game machine incorporating a display unit in an embodiment 14 of the present invention.

Referring to FIG. 31 which is a schematic front view illustrating a pin-ball game machine incorporating a display unit according to the present invention, this pinball game machine 300 has an architrave-like front frame 370 which is openably attached to a housing, a planar game board 320 is attached to an opening in the front frame 370. Further, a transparent panel 360 formed of a glass plate or a resin plate is openably fitted to the front surface of the front frame 370. so as to covet the front surface of the game board 320.

A receiving pan 340 for receiving gaming balls (which will be hereinbelow referred to as "pinball"), a manipulation handle 350 for controlling the ejection of pinballs and the like are provided below the front frame 370.

Winning holes 330 for pinballs, a guide rail, nails and the like are attached to the front surface of the game board 320. Further, the game board 320 is provided thereon with a display portion 310 from which variable display can be viewed when a pinball is trapped in an winning hole.

Figure 32:
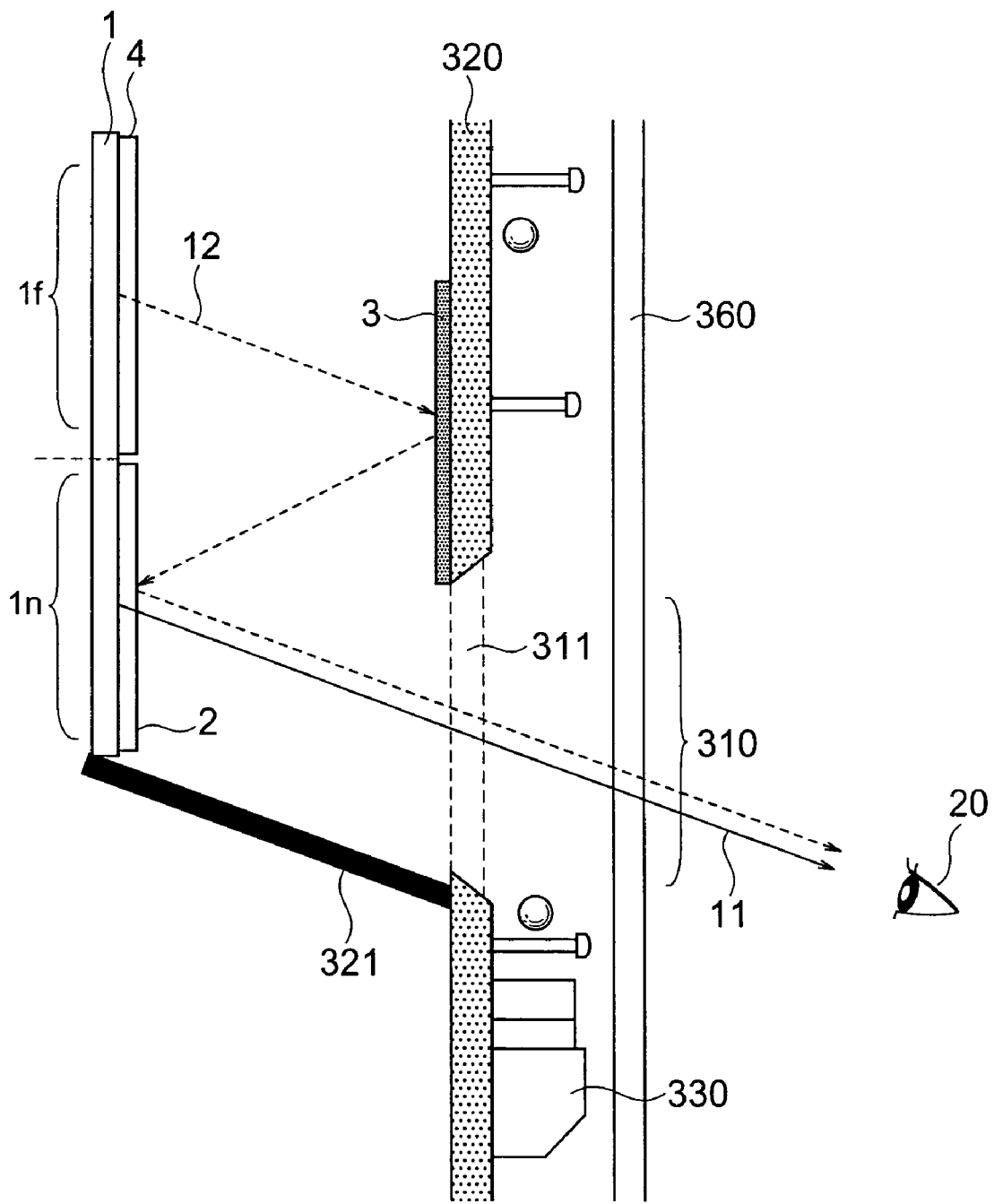
FIG. 32 is a schematic sectional view illustrating a display portion of the game machine shown in FIG. 31 and a part therearound.

The display portion 310 which is essential in the present invention and a configuration therearound will be explained with reference to FIG. 32 which is a schematic sectional view illustrating the display portion 310 in the game machine and the part therearound.

The display unit which has been explained in the embodiment 1 is applied to the game board 320 in this pinball game machine. Like reference numerals are used to denote like parts to those in the embodiment 1 so as to abbreviate detailed explanation thereto.

The game board 320 has an opening 311 at a position corresponding to the display portion 310. The liquid crystal display element 1 incorporating the half mirror 2 and the polarized beam changing element 4 is laid at the rear surface side of the game board 320 at a position where it can be viewed through the opening 311. Further, the total reflection mirror 3 is incorporated at the rear surface of the game board 320 above the opening 311.

The viewer 20 views an image beam emitted from the liquid display element 1 through the opening 311. Thus, the size of the opening 311 is set to be substantially equal to that of the near-distance display zone 1n, and accordingly, the viewer 20 can view the near-distant display zone 1n through the opening 311.

It is desirable to selectively arrange a light shield member 321 at least having a blackened front surface in a part which can be viewed by the viewer 20 in order to prevent occurrence of detrimental influence upon the display by light from the outside.

In this configuration, since the viewer 20 looks up the display portion 310 slightly upward, the display portion 310 or the opening 311 is preferably provided in the upper part of the game board. Further, as necessary, a protecting panel made of transparent glass or resin plate may be incorporated to the opening 311 of the game plate 320.

Two two-dimensional images located at different depthwise positions as viewed from the viewer 20 can be displayed being superposed with each other in the display portion in this game machine, that is, an extremely expressive image such as an image with depthwise feeling or a stereoscopic image and the like which cannot be exhibited by a two-dimensional image can be displayed.

Thus, in view of the above-mentioned configuration of the game machine, it is possible to materialize a game machine which can play arrangements which are novel and distinctive in comparison with conventional game machines.

Further, objects to be viewed located at different depthwise positions as viewed from the viewer, are set actually on one and the same screen, thereby it is possible to a thin game machine having a depthwise length which is actually shorter than a depthwise distance perceived by the viewer.

Embodiment 15

Next, explanation will be hereinbelow made of an equipment incorporating therein a display unit according to the present invention in an embodiment 15 of the present invention with reference to FIG. 33. The configuration of the equipment explained in this embodiment, is basically the same as that of the pinball game machine explained in the embodiment 13 with reference to FIG. 31, except that a display unit having different configuration is incorporated in the game machine. Thus, like reference numerals are used to denote like parts to those explained in the embodiment 13 so as to abbreviate detailed explanation thereto. In this embodiment, the display portion 310 which is essential in the present invention, and parts therearound will be in particular explained.

Figure 33:
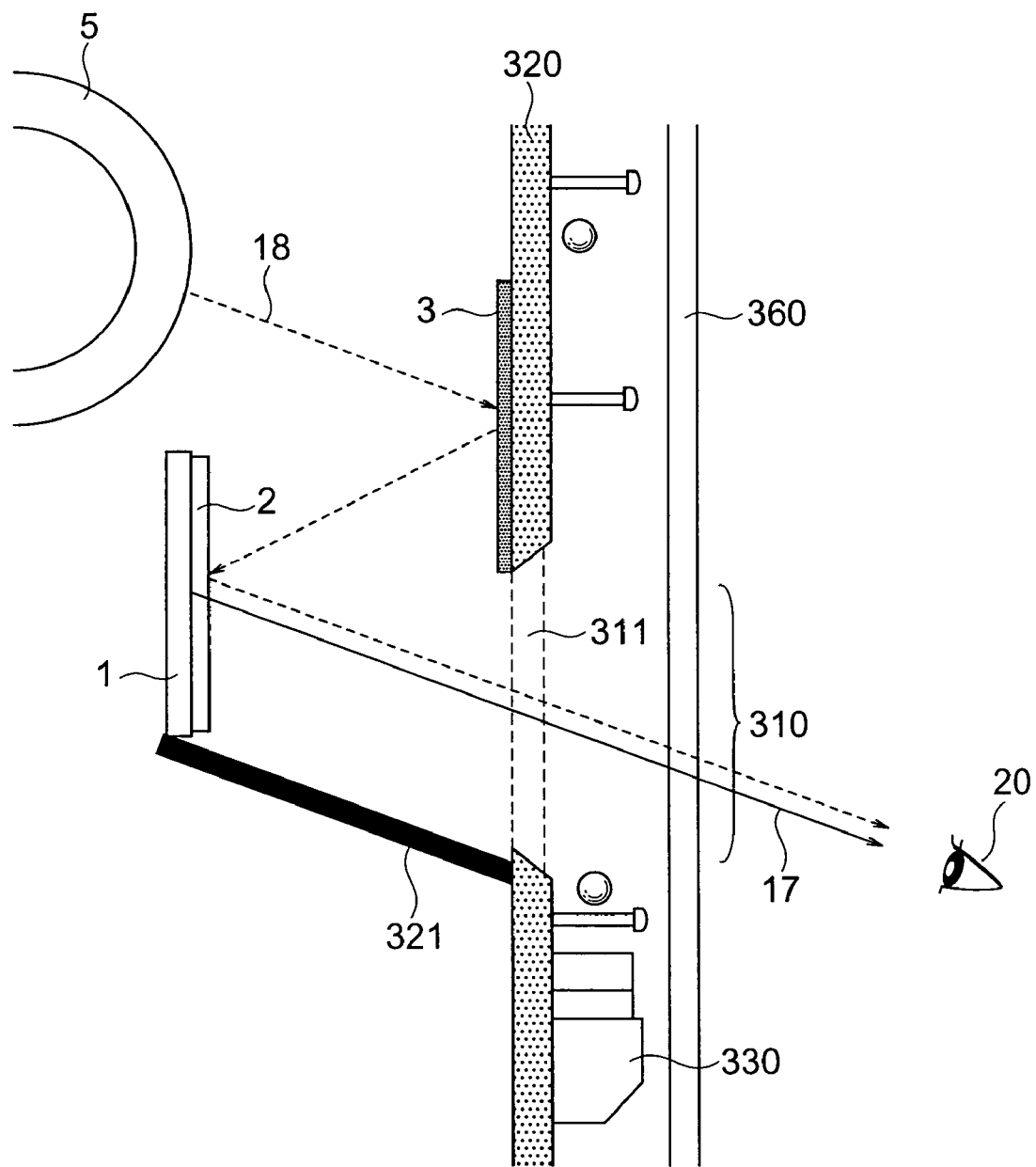
FIG. 33 is a schematic sectional view illustrating a display portion of a game machine incorporating a display unit and a part therearound in an embodiment 15 of the present invention.

Referring to FIG. 33 which is a schematic sectional view illustrating the display portion and parts therearound in this embodiment, the pinball game machine in this embodiment is applied therein with the display unit explained in the embodiment 9. Thus, like reference numerals are used to denote like parts to those explained in the embodiment 9 so as to abbreviate detailed explanation thereto. The game board 320 has an opening 311 at a position corresponding to the display portion 310. The liquid crystal display element 1 incorporating the half mirror 2 is arranged on the rear surface side of the game board 320 at a position where the liquid crystal display element 1 can be seen through the opening 311. Further, the total reflection mirror 3 is incorporated at the rear surface of the game board 320 above the opening 311.

The viewer 20 views image beams emitted from the reel display element 5 and the liquid crystal display elemental through the opening 311. The opening 311 has a size which is set to be equal to that of the screen of the liquid crystal display element 1, and accordingly, the viewer 20 can directly view the screen of the liquid crystal display element through the opening 311.

Further, it is desirable to arrange a light shield member 321 at least having a blackened front surface in a part which can be viewed by the viewer in order to prevent ambient light from detrimentally affecting the display.

In this configuration, since the viewer 20 looks up the display portion 310 slight upward, it is desirable to arrange the display portion 310 or the opening 311 in the upper part of the game board 320. Further, a protecting panel made of glass or plastic may be provided as necessary in the opening 311 of the game board 320.

In this game machine, two two-dimensional images located at different depthwise positions as viewed by the viewer 20 can be displayed being superposed with each other in the display portion 310. That is, the viewer 20 can see an image on the liquid crystal display element 1 which is profiled in front of a pattern on the reel display element 5. Such an image display is extremely effective for enhancing the so-called stage effect.

In view of the above-mentioned configuration of the game machine, it is possible to materialize a game machine having a representation which is novel and can be distinguished in comparison with a conventional game machine.

Further, since the objects to be viewed located at two different depthwise positions (distances) as viewed from the viewer, are actually located in one and the same plane, it is possible to materialize a thin display unit having a depthwise length which is shorter than a depthwise distance perceived by the viewer.

Embodiment 16

Next, explanation will be hereinbelow made of an equipment incorporating therein a display unit according to the present invention in an embodiment 16 of the present invention with reference to FIG. 34. The configuration of the equipment explained in this embodiment, is basically the same as that of the pinball game machine explained in the embodiment 14 with reference to FIG. 31, except that a display unit having different configuration is incorporated in the game machine. Thus, like reference numerals are used to denote like parts to those explained in the embodiment 14 so as to abbreviate detailed explanation thereto. In this embodiment, the display portion 310 which is essential in the present invention, and parts therearound will be in particular explained.

Figure 34:
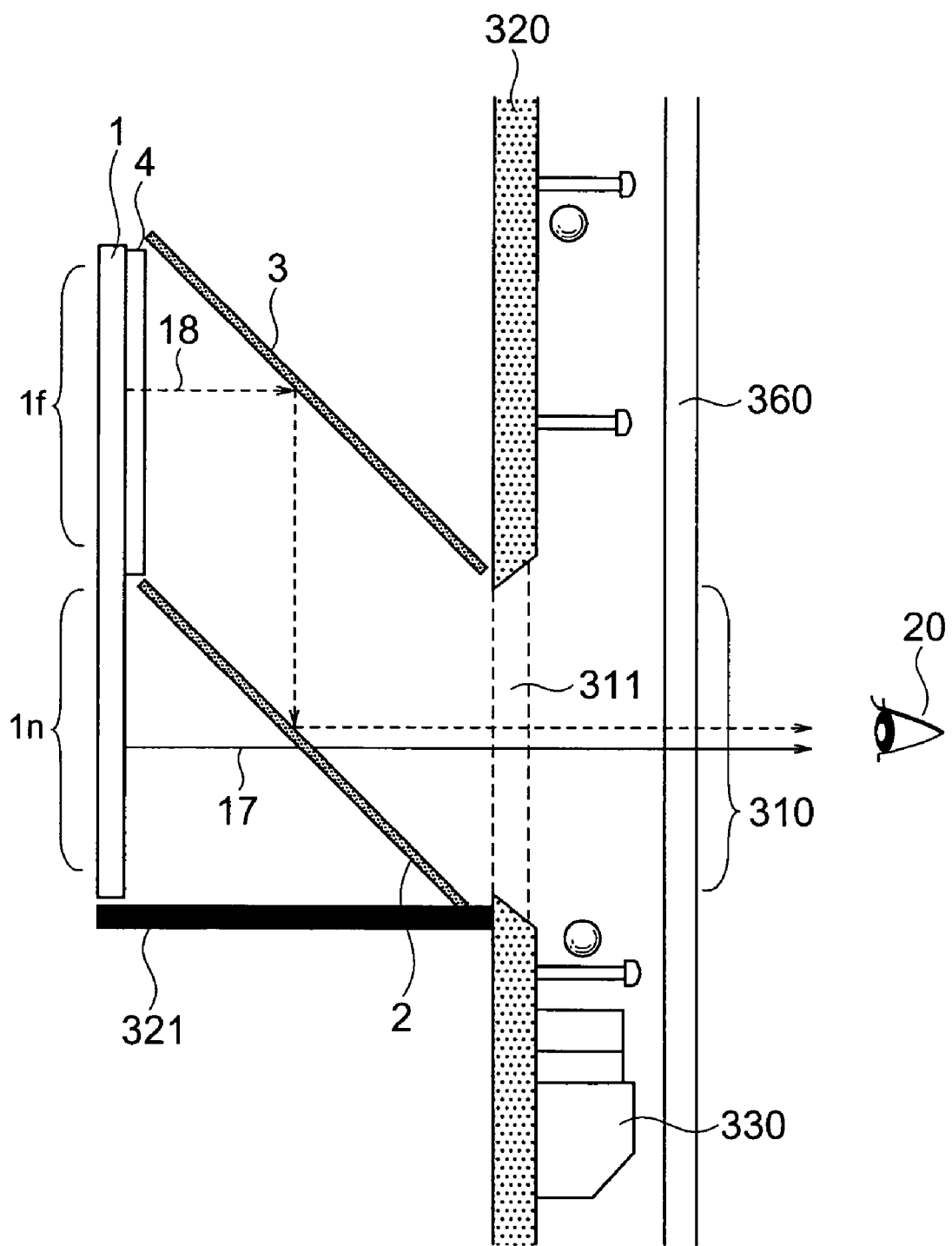
FIG. 34 is a schematic sectional view illustrating a display portion of a game machine incorporating a display unit and a part therearound in an embodiment 16 of the present invention.

Referring to FIG. 34 which is a schematic sectional view illustrating the display portion and parts therearound in this embodiment, the pinball game machine in this embodiment is applied therein with the display unit explained in the embodiment 6 with reference to FIG. 21. Thus, like reference numerals are used to denote like parts to those explained in the embodiment 6 so as to abbreviate detailed explanation thereto.

The game board 320 has an opening 311 at a position corresponding to the display portion 310. The half mirror 2 and the liquid crystal display element 1 are arranged on the rear surface side of the game board 320 at a position where the liquid crystal display element 1 can be seen through the opening 311, the half mirror 2 being inclined at an angle of 45 deg. to the game board 320. Further, the total reflection mirror 3 is incorporated on the rear surface side of the game board 320 above the opening 311, having its reflection surface being laid in parallel wit the half-mirror 2.

The viewer 20 views image beams emitted from the liquid crystal display element 1 through the opening 311. The opening 311 has a size which is set to be equal to that of the near-near distant display zone 1n of the liquid crystal display element 1, and accordingly, the viewer 20 can directly view the near-distant display zone 1n of the liquid crystal display element 1 through the opening 311.

Further, it is desirable to arrange a light shield member 321 at least having a blackened front surface in a part which can be viewed by the viewer in order to prevent ambient light from detrimentally affecting the display.

In this configuration, since the viewer 20 views the display portion 310 normal thereto, that is, directly opposite thereto, it is desirable to arrange the display portion 310 or the opening 311 in the center part of the game board 320. Further, a protecting panel made of glass or plastic may be provided as necessary in the opening 311 of the game board 320.

In this game machine, two two-dimensional images located at different depthwise positions as viewed by the viewer 20 can be displayed being superposed with each other in the display portion 310. That is, an extremely expressive image which cannot be displayed with a single two-dimensional image, that is, an image having depthwise feeling, a stereoscopic image or the like can be displayed.

In view of the above-mentioned configuration of the game machine, it is possible to materialize a game machine having a representation which is novel and can be distinguished in comparison with a conventional game machine.

Further, since the objects to be viewed located at two different depthwise positions (distances) as viewed from the viewer, are actually located in one and the same plane, it is possible to materialize a thin display unit having a depthwise length which is shorter than a depthwise distance perceived by the viewer.

Embodiment 17

Next, explanation will be hereinbelow made of an equipment incorporating therein a display unit according to the present invention in an embodiment 17 of the present invention with reference to FIG. 34. The configuration of the equipment explained in this embodiment, is basically the same as that of the pinball game machine explained in the embodiment 14 with reference to FIG. 31, except that a display unit having different configuration is incorporated in the game machine. Thus, like reference numerals are used to denote like parts to those explained in the embodiment 13 so as to abbreviate detailed explanation thereto. In this embodiment, the display portion 310 which is essential in the present invention, and parts therearound will be in particular explained.

Figure 35:
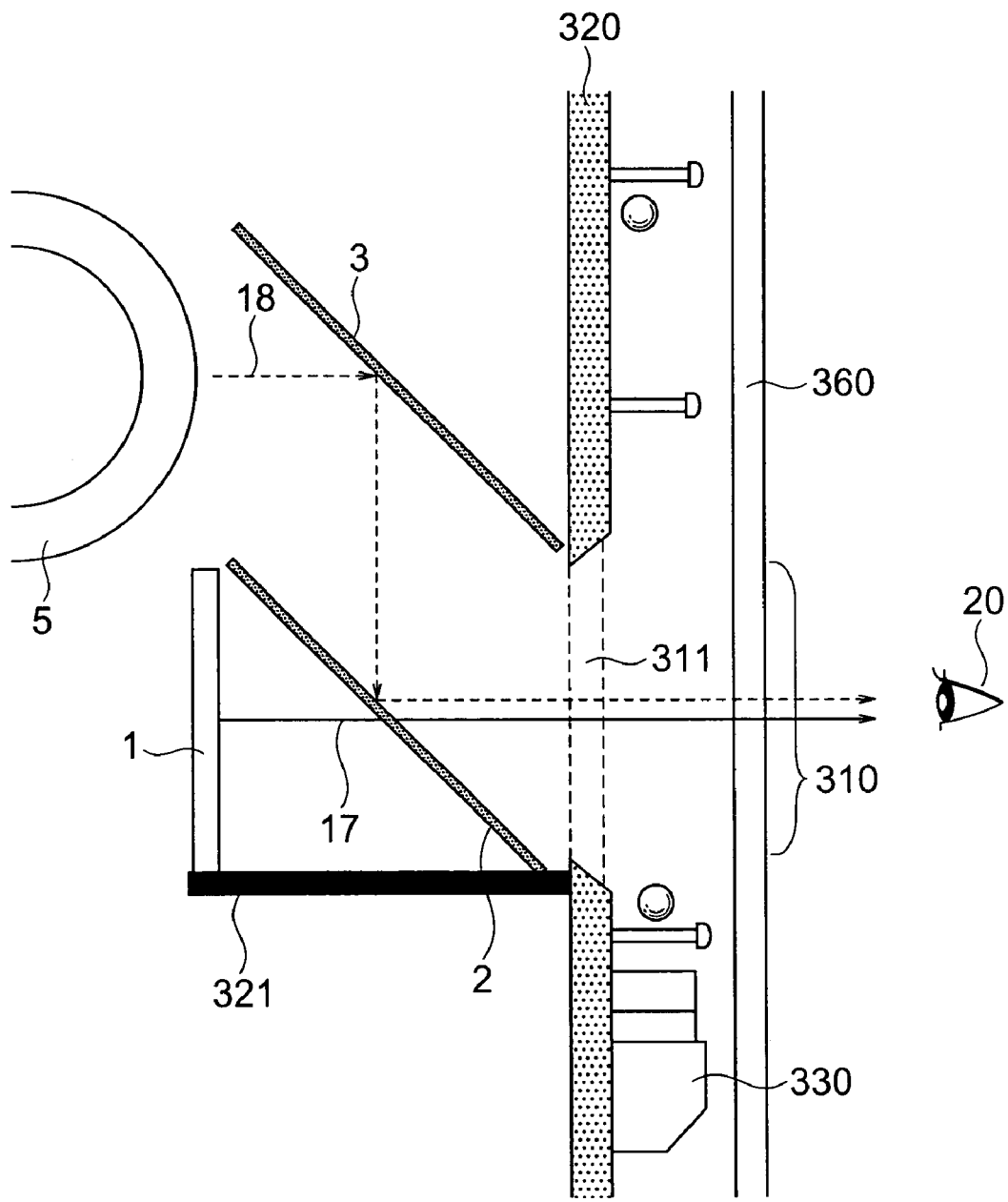
FIG. 35 is a schematic sectional view illustrating a display portion of a game machine incorporating a display unit and a part therearound in an embodiment 17 of the present invention.

FIG. 35 is a schematic sectional view illustrating the display portion 310 and parts therearound in this embodiment.

The pinball game machine in this embodiment is applied therein with the display unit explained in the embodiment 10 explained with reference to FIG. 28. Thus, like reference numerals are used to denote like parts to those explained in the embodiment 10 so as to abbreviate detailed explanation thereto.

The game board 320 has an opening 311 at a position corresponding to the display portion 310. The half mirror 2 is arranged on the rear surface side of the game board 320 at a position where the half mirror 2 can be seen through the opening 311, the half mirror 2 being inclined at an angle of 45 deg. to the game board 320, and the liquid display element 1 is arranged further inward therefrom. Further, the total reflection mirror 3 is incorporated on the rear surface side of the game board 320 above the opening 311, having its reflection surface being laid in parallel wit the half-mirror 2, and the reel display element 5 is located further inward therefrom, at such a position where the screen of the reel display element 1 is substantially in parallel with the screen of the liquid crystal display element 1.

The viewer 20 views image beams emitted from the reel display element 5 and the liquid crystal display element 1 through the opening 311. Thus, the opening 311 has a size which is set to be equal to that of the screen of the liquid crystal display element 1, and accordingly, the viewer 20 can directly view the screen of the liquid crystal display element through the opening 311.

Further, it is desirable to arrange a light shield member 321 at least having a blackened front surface in a part which can be viewed by the viewer in order to prevent ambient light from detrimentally affecting the display.

In particular, in this embodiment, since a part of a light beam from the reel display element 5 is transmitted through the half mirror 2, the light transmitted through the half mirror 2 is preferably absorbed by the light shield member in order to prevent the thus transmitted light from acting as stray light which causes deterioration of the image quality.

In this configuration, since the viewer 20 views the display portion 310 normal thereto, that is, directly opposite thereto, it is desirable to arrange the display portion 310 or the opening 311 in the center part of the game board 320. Further, a protecting panel made of glass or plastic may be provided as necessary in the opening 311 of the game board 320.

In this configuration, the viewer 20 can see the screen of the reel display element 5 and an image on the liquid crystal display element 1 which is profiled in front of the reel display element 5. Such an image display is extremely effective for enhancing the so-called stage effect.

In view of the above-mentioned configuration of the game machine, it is possible to materialize a game machine having a representation which is novel and can be distinguished in comparison with a conventional game machine.

Further, since the objects to be viewed located at two different depthwise positions (distances) as viewed from the viewer, are actually located in one and the same plane, it is possible to materialize a thin display unit having a depthwise length which is shorter than a depthwise distance perceived by the viewer.

Embodiment 18

Explanation will be hereinbelow made of a display unit in an embodiment 18 of the present invention.

Figure 36:
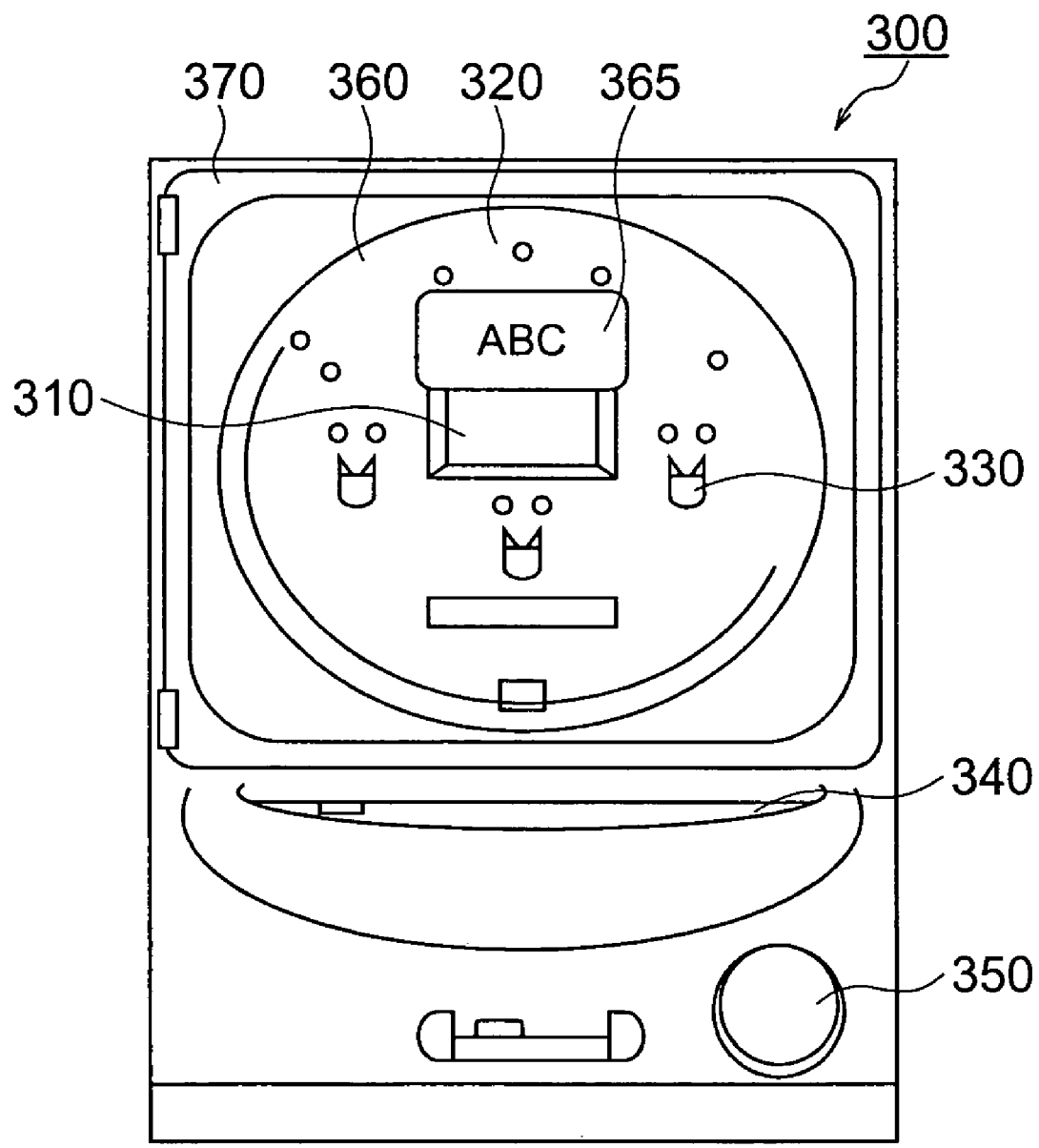
FIG. 36 is a schematic front view illustrating a game machine incorporating a display unit in an embodiment 18 of the present invention.

Referring to FIG. 36 which is a schematic front view illustrating a pin-ball game machine incorporating a display unit according to the present invention, this pinball game machine 300 has an architrave-like front frame 370 which is openably attached to a housing, and a planar game board 320 is attached to an opening in the front frame 370. Further, a transparent panel 360 formed of a glass plate or a resin plate is openably fitted to the front surface of the front frame 370 so as to cover the front surface of the game board 320. In this configuration, a predetermined space is defined between the transparent panel 360 and the game board 320 in order to prevent a structure attached to the game board 320 from making contact with the transparent panel 360.

A receiving pan 340 for receiving gaming balls (which will be hereinbelow referred to as "pinball"), a manipulation handle 350 for controlling the ejection of pinballs and the like are provided below the front frame 370.

Winning holes 330 for pinballs, a guide rail, nails and the like are attached to the front surface of the game board 320. Further, the game board 320 is provided thereon with a display portion 310 from which variable display can be viewed when a pinball is trapped in an winning hole. Further, a light shield means 365 is arranged at a position corresponding to the upper part of the display 310, and a decorative pattern and a logo are printed on the front surface side of the light shield means 365 as necessary.

Figure 37:
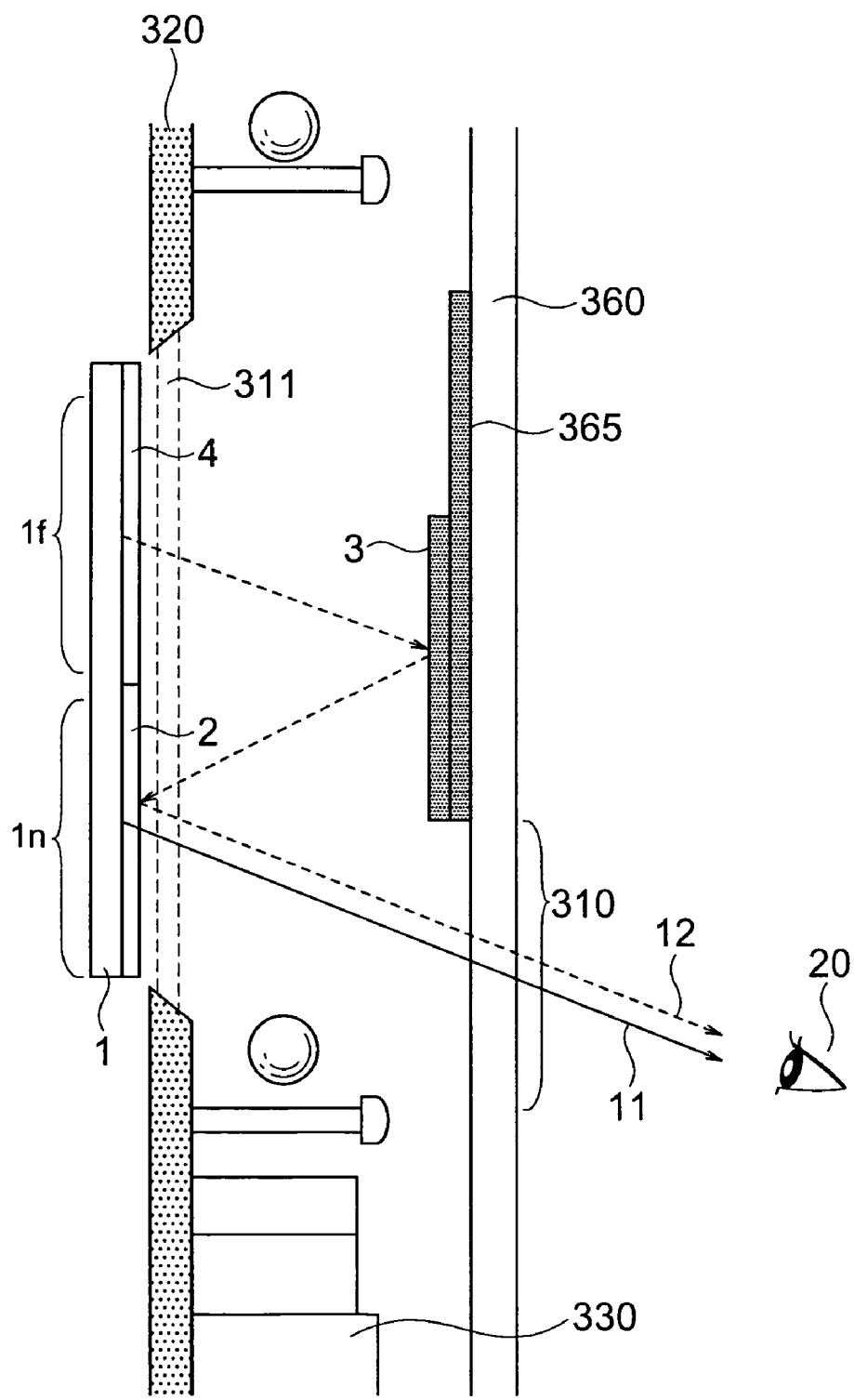
FIG. 37 is a schematic sectional view illustrating the game machine incorporating the display unit and the part therearound in the embodiment shown in FIG. 36.

The display portion 310 which is essential in the present invention and a configuration therearound will be explained with reference to FIG. 37 which is a schematic sectional view illustrating the display portion 310 in the game machine and the part therearound.

The display unit which has been explained in the embodiment 1 is applied to the game board 320 in this pinball game machine. Like reference numerals are used to denote like parts to those in the embodiment 1 so as to abbreviate detailed explanation thereto. This game machine has an opening 311 formed in the game board 320 and having a size equal to or slightly larger than the size of the screen of the liquid crystal display element 1, and the liquid crystal display element 1 incorporating the half mirror 2 and the polarized beam changing element 4 is arranged in this opening 311, or slightly inward of the opening 311. The total reflection mirror is incorporated in rear of the transparent panel 360, being separated from the liquid crystal display element 1 by a predetermined distance, that is, by such a distance that the display unit in the present invention can be materialized.

Further, the light shield means 365 is incorporated at a position where it does not hinder the viewer 20 from viewing the near-distant display zone 1n of the liquid crystal display unit 1 it prevents the total reflection mirror 3 and the far-distant display zone 1f from being viewed by the viewer 20.

The light shield means 365 may be provided on the front side of the transparent panel 360, or the rear side thereof, or in the transparent panel. The light shield means 365 can be materialized by a resin plate containing a pigment or a die or a metal plate or by coating the transparent panel 360 thereover with a light shield type paint. In this configuration, the light shield means 365 may be provided at the viewer side surface thereof with a decorative pattern or a logo in order to prevent the design of the game machine from being spoiled.

The viewer 20 views an image beam emitted from the liquid crystal display element 1 in a part below the light shield means 365. Thus, the part below the light shield means 365 corresponds to the display portion 310.

In this configuration, since the viewer 20 looks up the display portion 310 slightly upward, the display portion 310 or the opening 311 is preferably provided in the upper part of the game board 320. Further, as necessary, a protecting panel made of transparent glass or resin plate may be incorporated to the opening 311 of the game plate 320. In the case of the provision of the protecting panel, it is desirable to subject the protecting panel to a reflection preventing treatment for restraining the surface reflection in order to prevent an image beam which can be viewed from the display portion 310, from being detrimentally influenced by reflection of light at the protecting panel.

Two two-dimensional images located at different depthwise positions as viewed from the viewer 20 can be displayed being superposed with each other in the display portion in this game machine. That is, an extremely expressive image such as an image with depthwise feeling or a stereoscopic image and the like which cannot be exhibited by a two-dimensional image alone can be displayed. Such a display is extremely effective for enhancing the so-called stage effect for the game machine.

It is noted that there may be provided such a configuration that pinballs can pass between the total reflection mirror 3 and the liquid crystal display element 1. In this case, the pinballs running between the total reflection mirror 3 and the liquid crystal display element 1 are seen in the display portion 310. For example, when the pinballs move from the front surface of the far-distant display zone 1f of the liquid crystal display element 1 to the front surface of the near-distant display zone 1n, the viewer 20 can perceive that the pinballs come apparently from a far-distant side to a near-distant side. Accordingly, it is possible to materialize a game machine exhibiting a novel expression which have not been able to be exhibited by a conventional game machine. Further, the objects to be viewed located at different depthwise positions as viewed from the viewer are actually set on the screen of the single liquid crystal display element 1, thereby it is possible to materialize a thin game machine actually having a depthwise length which is shorter than the depthwise distance perceived by the viewer.

In particular, in this embodiment, since the total reflection mirror 3 is arranged at the transparent panel 360 of the game machine, the space between the game board 320 and the transparent panel 360 can be efficiently used, thereby it is possible to materialize a thin game machine.

Embodiment 19

Next, explanation will be made of an equipment incorporating a display unit in an embodiment 19 of the present invention with reference to FIG. 38. The configuration of the equipment in this embodiment is basically the same as that of the pinball game machine explained in the embodiment 18 with reference to FIG. 36, except that the configuration of the display unit incorporated in the game machine is changed. Thus, like reference numerals are used to denote like parts to those explained the embodiment 18. Further, in this embodiment, the display portion 310 which is essential in the present invention, and parts therearound will be explained in detail in order to abbreviate detailed description thereto.

Figure 38:
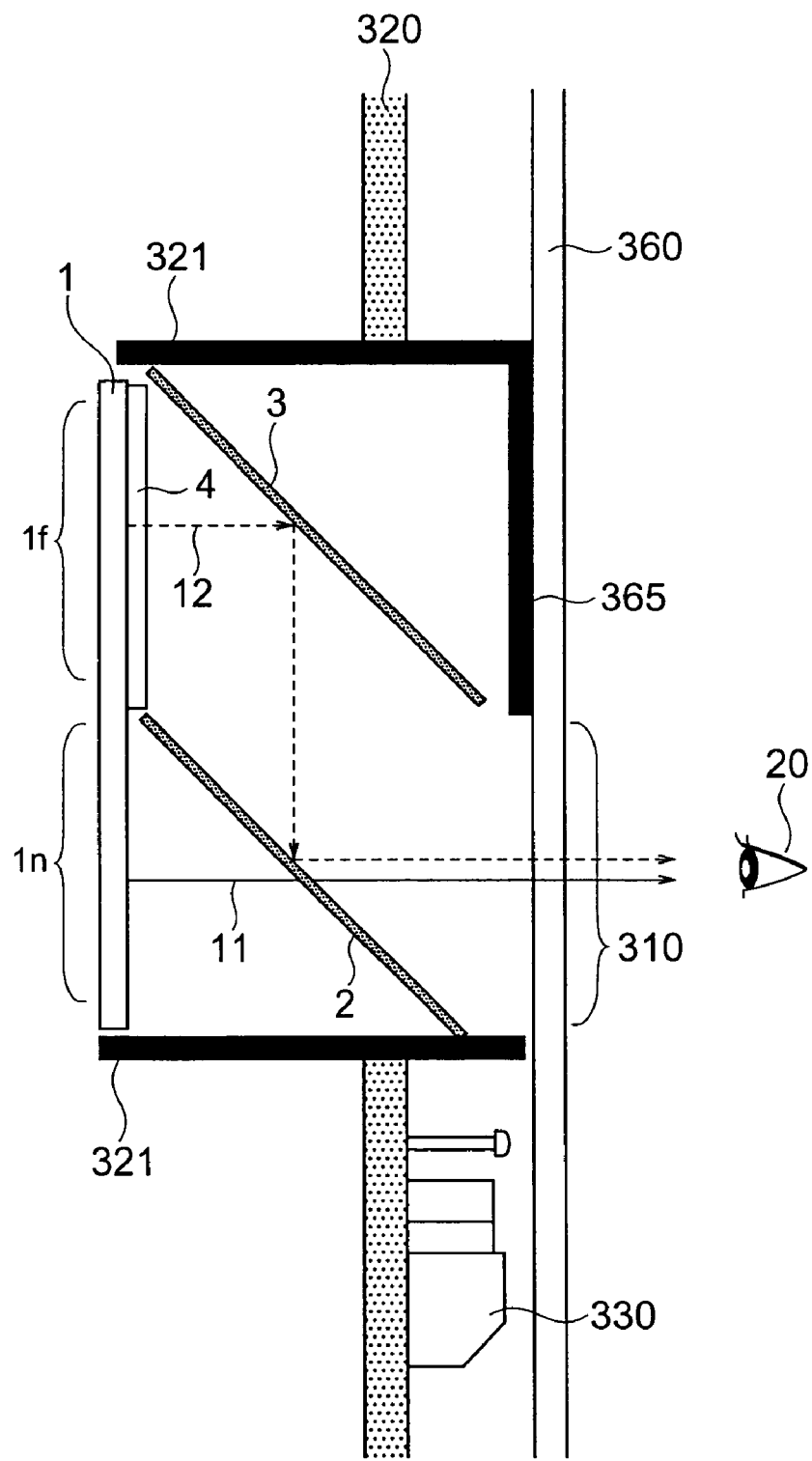
FIG. 38 is a schematic front view illustrating a game machine incorporating a display unit and a part therearound in an embodiment 19 of the present invention.

FIG. 38 is a schematic sectional view illustrating the display portion 310 in the game machine incorporating the display unit according to the present invention, and the parts therearound.

The pinball game machine has an opening formed in the game board 320 and having a size equal to or slightly larger than that of the display zone of the liquid crystal display element 1, and the liquid crystal display element 1 incorporating the polarized beam changing element 4 is arranged slightly inward from the opening.

The half mirror 2 and the total reflection mirror 3 are arranged between the liquid crystal display element 1 and the transparent panel 360, being inclined to the screen of the liquid crystal element by an angle of 45 deg. Further, the screen of the liquid crystal display element 1 is laid substantially in parallel with the game board 320.

The transparent panel 360 is provided with a light shield means 365 at a position where it does not hinder the viewer 20 from viewing the near-distant display zone 1n of the liquid crystal display element 1 but it prevents the viewer from seeing the total reflection mirror 3.

The light shield means 365 may be arranged on the front side or rear side of the transparent panel 360, or inside of the transparent panel. The light shield means 365 may be formed of a resin plate containing a pigment, a die or the like or a metal plate or may be materialized by applying the transparent panel 360 with a light shield type paint. In this case, a decorative pattern or a logo is preferably set on the surface of the light shield means 365 on the viewer's side in order to prevent the design of the game machine from being spoiled.

The viewer 20 views an image beam emitted from the liquid crystal display element 1 in a part below the light shield means 365. Thus, the part below the light shield means 365 corresponds to the display portion 310.

In this case, the viewer 20 views the display portion 310, normal thereto or directly opposite thereto, and accordingly, it is desirable to provide the display portion 310 in the center part of the game board.

Further, it is preferable to provide a light shield member 321 around the opening of the game board 320 in order to prevent the display from being detrimentally influenced by unnecessary ambient light which is incident upon the liquid crystal display element 1. This light shield member 321 may also serve as a partition for blocking pinballs from entering into the display portion 310. In this game machine, two two-dimensional images located at different depthwise positions as viewed from the viewer can be displayed being superposed with each other in the display portion 310. That is, an extremely expressive image such as an image with depthwise feeling, a stereoscopic image or the like which cannot be in general exhibited by a single two-dimensional image can be displayed. Thereby, it is possible to materialize a game machine which can exhibit a representation which is novel and which cannot be exhibited by a conventional game machine.

In the game machine in this embodiment, since objects to be viewed located at different depthwise positions as viewed from the viewer are actually set on the screen of the single liquid crystal display element 1, it is possible to materialize a game machine actually having a depthwise length which is shorter than a depthwise distance perceived by the viewer. In particular, the total reflection mirror 3 and the half mirror (polarized beam splitting element) 2 can be arranged in a space defined between the transparent panel 360 and the game board 320, and accordingly, a thinner game machine can be materialized.

Embodiment 20

Next, explanation will be made of an equipment in accordance with a display unit in an embodiment 20 of the present invention with reference to FIG. 39. The configuration of the equipment is basically the same as that of the pinball game machine in the embodiment 18 explained with reference to FIG. 36, except that a display unit is different from that explained in the embodiment 18. Thus, like reference numerals are used to denote like parts to those explained in the embodiment 17 so as to abbreviate detailed explanation thereto. In this embodiment, the display portion 310 which is essential in the present invention, and parts therearound will be in particular explained.

Figure 39:
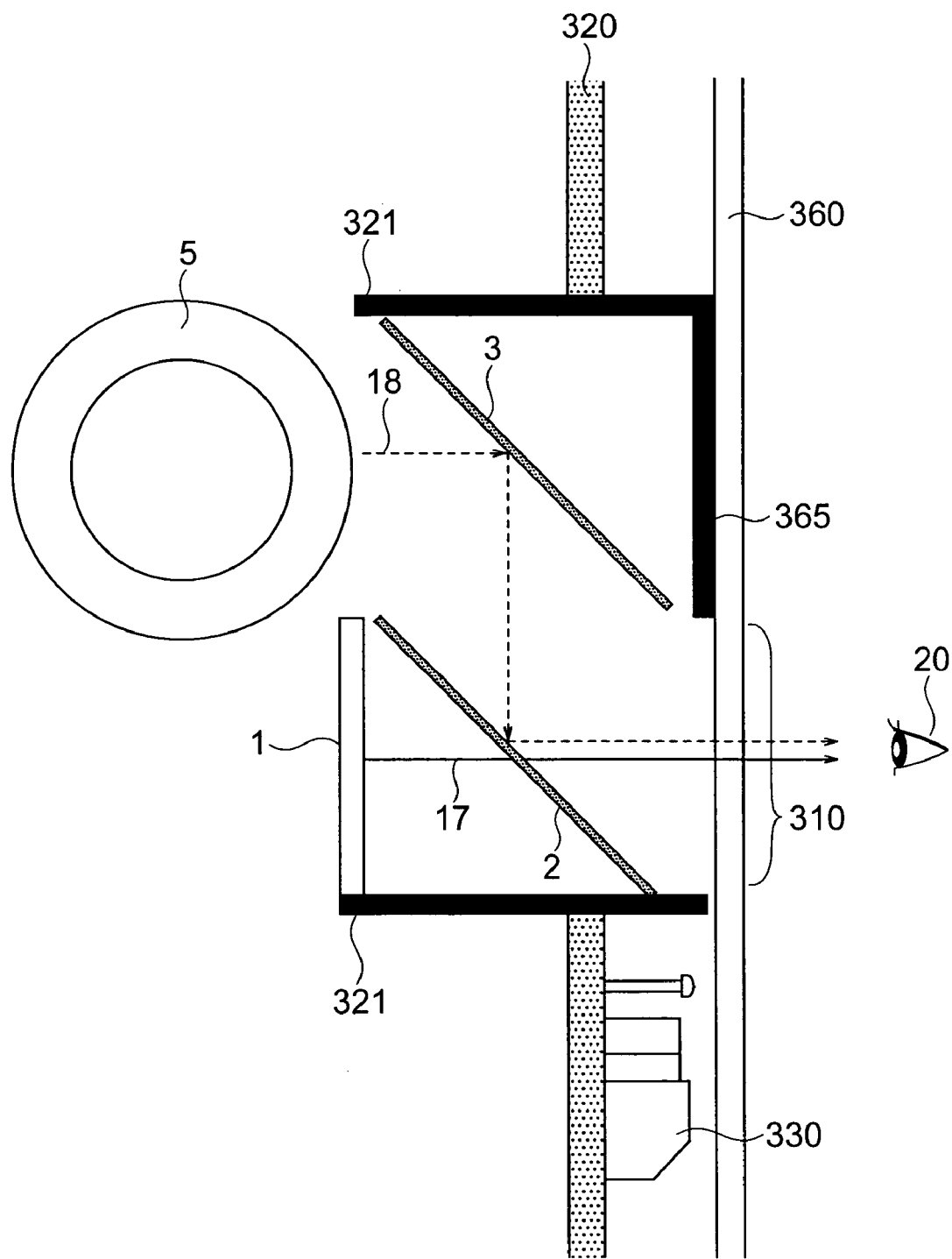
FIG. 39 is a schematic front view illustrating a game machine incorporating a display unit and a part therearound in an embodiment 20 of the present invention.

FIG. 39 is a schematic sectional view illustrating the display portion 310 of the game machine and the parts therearound.

In this pinball game machine, the display unit explained in the embodiment 10 with reference to FIG. 28, and accordingly, like reference numerals are used to denote like parts to those explained in the embodiment 10 so as to abbreviate detailed description thereto.

The game machine has an opening formed in the game board 320 and having a size which is about the sum of the size of the screen of the liquid crystal display element 1 and the size of the screen of the reel display element 5, and the liquid crystal display element 1 and the reel display element 5 are arranged inward of the opening.

The half mirror (polarized beam splitting element) 2 is laid between the liquid crystal display element 1 and the transparent panel 360, being inclined to the screen of the liquid crystal display element 1 by an angle of 45 deg. Further, the total reflection mirror 3 is laid between the reel display element 5 and the transparent panel 360 in parallel with the half mirror 2. Further, the screen of the liquid crystal display element 1 is laid substantially in parallel with the game board 320.

A light shield means 365 is provided on the transparent panel 360 at a position where it does not hinder the viewer from viewing the screen of the liquid crystal display element 1 and prevents the viewer 20 from seeing the total reflection mirror 3.

The light shield means 365 may be arranged on the front side or rear side of the transparent panel 360, or inside of the transparent panel 360. The light shield means 365 may be formed of a resin plate containing a pigment or a die or a metal plate, or may be materialized by coating the transparent panel 360 therover with a light shield paint. It is preferable to apply a decorative pattern or a logo on the surface of the light shield means 365 in order to prevent the design of the game machine from being spoiled.

The viewer 20 views image beams emitted from the liquid display element 1 and the reel display element 5 in a part below the light shield means 365. Thus, the part below the light shield means 365 corresponds to the display portion 310.

In this case, the viewer 20 views the display portion 310, normal thereto or directly opposite thereto, and accordingly, it is preferable to arrange the display portion 310 in the center part of the game board. Further, a light shield member 321 is preferably provided around the opening of the game board 320 in order to prevent the display from being detrimentally influenced by unnecessary ambient light which is incident upon the liquid crystal display element 1. This light shield member 321 also serves as a partition which can prevent pinballs from entering into the display portion 310.

In this game machine, two two-dimensional images located at different depthwise positions as viewed from the viewer 20 can be displayed being superposed with each other in the display portion 310. That is, the viewer 20 can see an image on the liquid crystal display element 1, appearing in front of a pattern on the reel display element 1. Such a display is extremely effective in order to enhance the so-called stage effect for a game machine such as a pinball game machine, a slot machine and the like.

Thus, this game machine can exhibit a representation which is novel and distinguishable from other game machines.

Further, in this game machine, since the objects to be viewed located at different depthwise positions (distances) as viewed from the viewer 20 are located in one and the same plane, it is possible to materialize a thin display unit actually having a depthwise length which is shorter than a depthwise distance perceived by the viewer. In particular, since the total reflection mirror 3 and the half-mirror (polarized beam splitting element) 2 can be laid between the transparent panel 360 and the game board 320 in the game machine, thereby it is possible to materialize a thinner game machine.

Embodiment 21

Next, explanation will be made of an equipment incorporating a display unit according to the present invention in an embodiment 20 of the present invention. In this embodiment, a table-like game machine will be explained.

Figure 40:
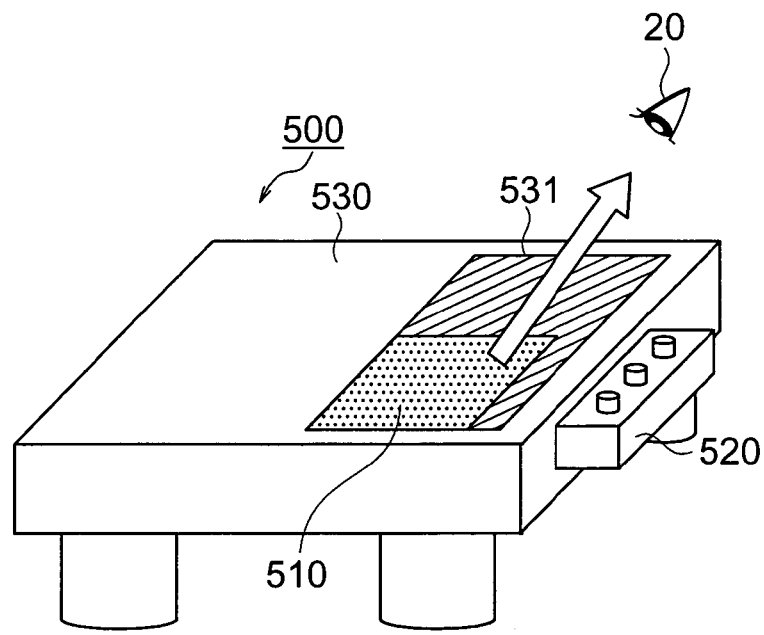
FIG. 40 is a schematic perspective view for explaining a game machine incorporating a display unit in a embodiment 21 of the present invention.

Referring to FIG. 40 which is a schematic perspective view illustrating a table-like game machine incorporating a display unit according to the present invention, this game machine 500 incorporate a display unit 510 in a housing 530 attached at its side surface thereto with a manipulating portion 520 for controlling the operation of a game. The housing 530 is formed in the upper surface part thereof with an opening 531 through which the viewer 20 views an image on the display unit.

The display unit 510 incorporated in this game machine 500 is the same as the display device which has been explained with reference to FIGS. 1 to 3 (Embodiment 1), and the viewer 20 can obliquely view the liquid crystal display element 1 constituting the display unit.

With a table-like game machine as the game machine in this embodiment, the viewer 20 obliquely views the display unit. Thus, the display unit explained in the embodiments is suitable as the display element 510 in the game machine 500.

Further, it is desirable to suitably arrange a light shield member at least having a blackened outer surface in the housing 330 in order to prevent the display from being detrimentally influenced by ambient light.

It is preferable to incorporate a protecting panel formed of a transparent glass or resin plate in an opening 531 in the housing in order to prevent dust or the like from entering into the housing.

Two two-dimensional images located at different depthwise positions as viewed from the viewer 20 can be displayed being superposed with each other. That is, it is possible to display an extremely expressive image such as an image with depthwise feeling, a stereoscopic image or the like which cannot be exhibited by a single two-dimensional image. Thereby it is possible to materialize a game machine which can exhibit a novel representation.

Further, in this game machine, objects to be viewed located at different depthwise positions as viewed by the viewer 20 are actually set on the screen of the single display element, and accordingly, a thin display unit actually having a depthwise length which is shorter than a depthwise distance perceived by the viewer can be materialized.

Embodiment 22

Next, explanation will be made of an equipment incorporating a display unit according to the present invention in an embodiment 22 of the present invention with reference to FIG. 41. In this embodiment, a confronting type table-like game machine will be explained.

Figure 41:
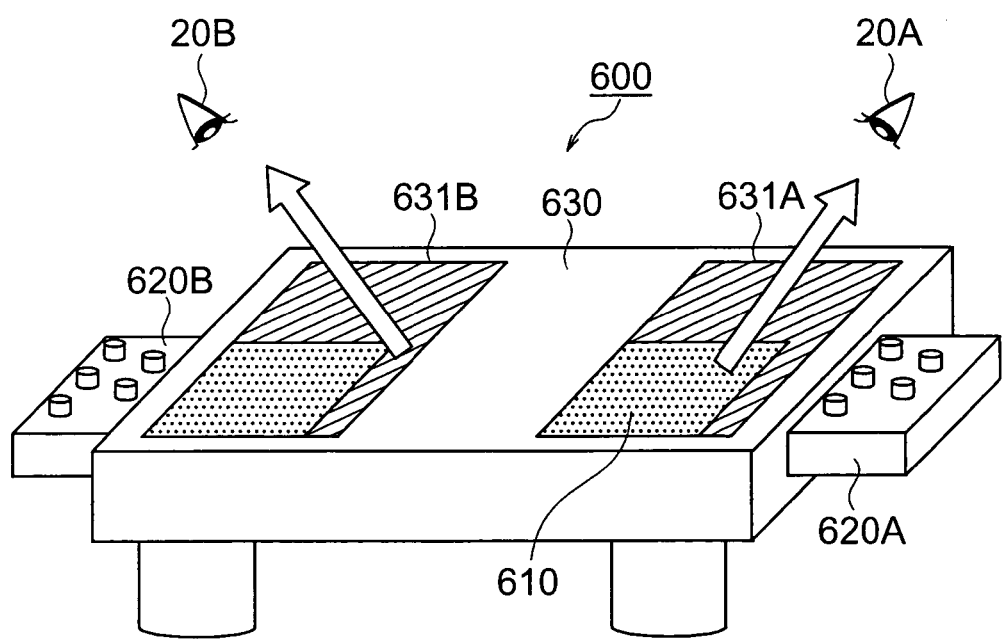
FIG. 41 is a schematic perspective view for explaining a game machine incorporating a display unit in a an embodiment 22 of the present invention.

Referring to FIG. 41 which is a schematic perspective view illustrating a game machine incorporating a display unit according to the present invention, this game machine 600 incorporates, in a housing, a display unit 610 according to the present invention, and manipulating portions 620A, 620B for controlling the operation of a game are externally attached to opposite side surfaces of the housing. Two openings 631A, 631B are formed in the upper surface of the housing 630, and viewers 20A, 20B view an image on the display unit 610 through the openings 631A, 631B.

The display unit 610 incorporated in the game machine 600 is the same as the display unit explained in the embodiment 1 with reference to FIG. 23 or in the embodiment 8 with reference to FIG. 21, and the display device 610 can display two two-dimensional images located at different depthwise positions in a superposed condition for the two viewers confronting each other. Further, in this configuration, the two viewers view the liquid crystal element 1 constituting the display unit, obliquely thereto.

With a table-like game machine as in this game machine, both viewers 10A, 20B obliquely views the display unit. Thus, the display units explained in the embodiment 6 and the embodiment 8 are appropriate for the display unit 610 in this game machine.

It is desirable to selectively arrange a light shield member at least having a blackened outer surface in the housing 620 in order to prevent the display from being detrimentally influenced by ambient light.

Further, it is preferable to provide a protecting panel made of transparent glass or resin in each of the openings 631A and the opening 631B in the housing in order to prevent dust or the like from entering into the housing.

In this game machine, two two-dimensional images located at different depthwise positions as viewed from the viewer 20 can be displayed being superposed with each other. That is, a highly expressive image such as an image with depthwise feeling, a stereoscopic image or the like which cannot be exhibited by a single two-dimensional image can be displayed. Thus, the game machine in this embodiment can exhibit a novel representation.

In this game machine, an image on one and the same display zone becomes an image located at a near-distant depthwise position, that is, a short distance position for a viewer who takes a position nearer to this display position, but becomes an image located at a far-distance depthwise position, that is, a long distance position for a viewer who takes a position further from this display zone.

That is, the game machine can display the same two two-dimensional images for two viewers taking different positions, being superposed with each other in the order in dependence upon the positions of the viewers. Thus, it is possible to materialize a game machine which can display a highly realistic image. Such a game machine is suitable for a confronting type game machine.

The objects to be viewed located at different depthwise positions as viewed from the viewer are actually set on the screen of the single display element, and accordingly, the game machine can be thin, that is, can have an actual depthwise length which is shorter than a depthwise distance perceived by the viewer.

Embodiment 22

Next, explanation will be hereinbelow made of a display unit in an embodiment 23 of the present invention with reference to FIG. 42. The configuration of the display unit in this embodiment is the same as that of the display unit explained in the embodiment 13 with reference to FIG. 30, except that, of the three display zones of the liquid crystal display element 1, the near-distant display zone is eliminated, and instead thereof, an opening 7 through which the outside of the display unit can be viewed from the viewer is provided. Thus, like reference numerals are used to denote like parts to those explained in the embodiment 12 so as to abbreviate detailed description thereof.

Figure 42:
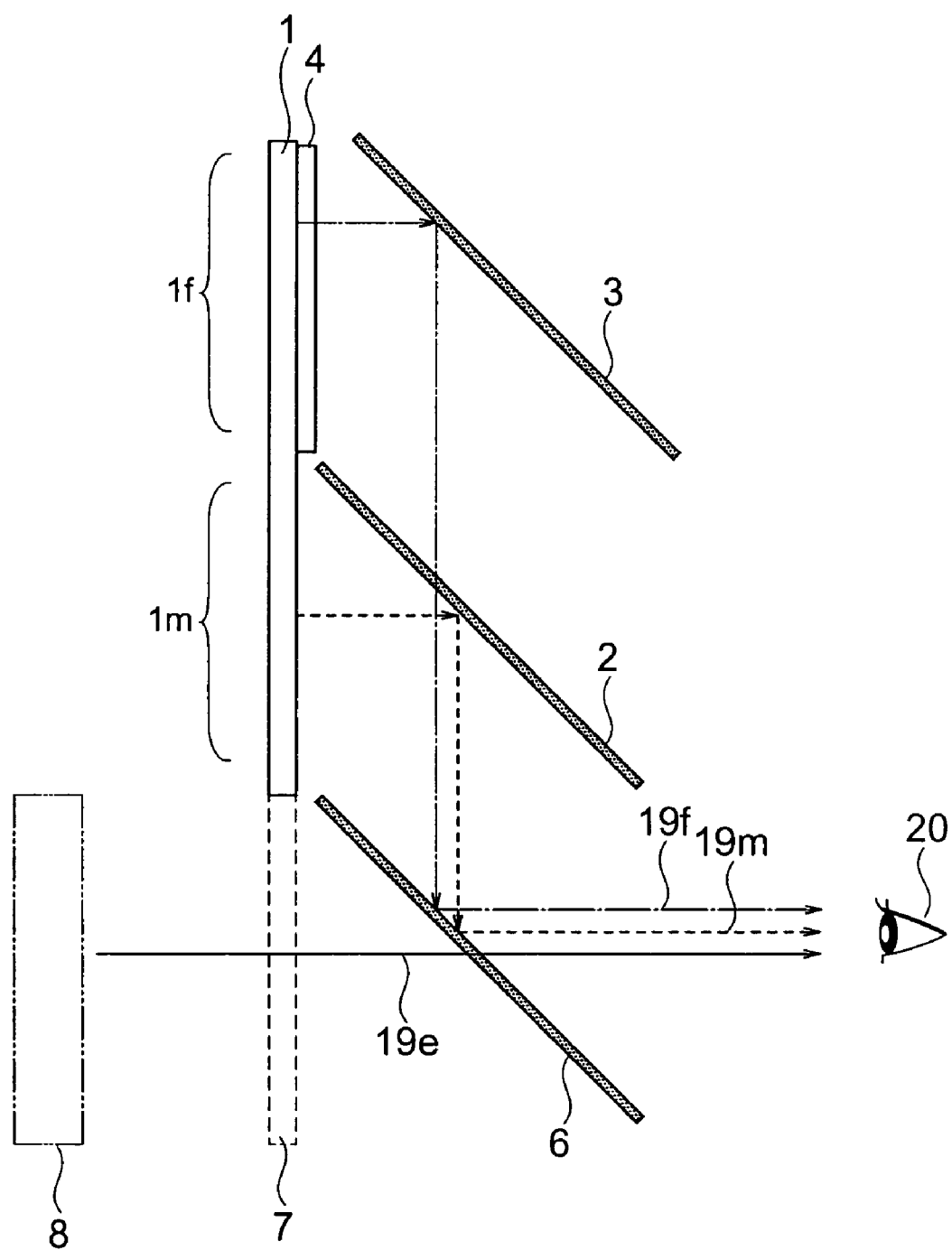
FIG. 42 is a schematic sectional view for explaining a display unit in an embodiment 23 of the present invention.
Figure 43:
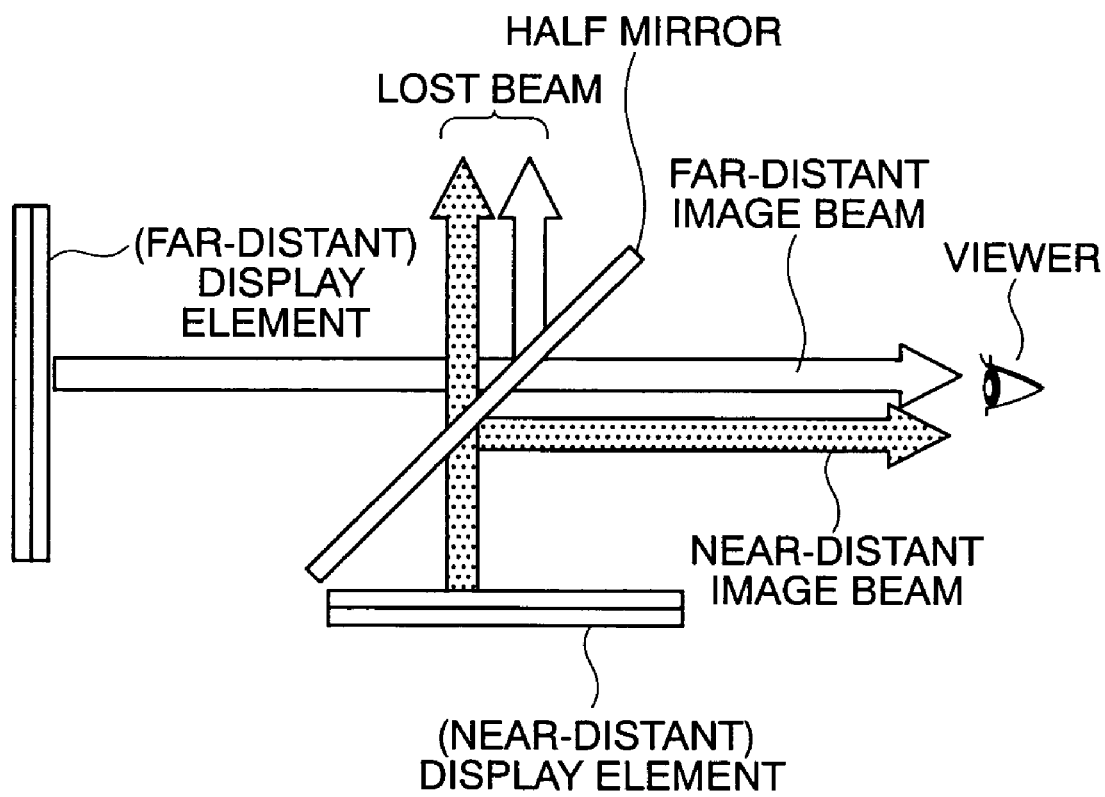
FIG. 43 is a schematic sectional view for explaining a conventional display unit.

Referring to FIG. 42 which is a schematic sectional view illustrating a display unit, this display unit incorporates, as three objects to be viewed, two display zones of the liquid crystal display element 1 and the outside of the display unit. Specifically, the two display zones of the liquid crystal display element 1 correspond respectively to two objects to be viewed located at different depthwise positions (distances) as viewed from the viewer 20. Incidentally, of the display zones of the liquid crystal display element 1, the one which corresponding to an object to be viewed located at a far-distant position as viewed from the viewer 20, that is, at a long distance position as viewed by the viewer 20 will be hereinbelow referred to as "far-distant display zone 1$f$", and the one corresponding to an object to be viewed located at an intermediate distance depthwise position, that is at a short distance position as viewed from the viewer 20 will be hereinbelow referred to as "mid-distant display zone 1$m$.

Further, an object 8 to be viewed, located outside of the display unit (which will be hereinbelow referred to as "an external object to be viewed) is present at an arbitrary position in accordance with a purpose of use thereof. The depthwise position of this object to be viewed, as viewed from the viewer, that is, the distance of this object to be viewed as viewed from the viewer can be arbitrarily set.

For example, if the external object 8 to be viewed is located, being substantially flush with the screen of the liquid crystal display element 1 or being in the vicinity of thereof, the external object 8 to be viewed is set to an object to be viewed located at a nearest distance position as viewed from the viewer.

Further, if the external object 8 to be viewed is located at a position where the distance from the object 8 to be viewed to the half mirror 6 is longer than the sum of the distance from the far-distance display zone 1$f$ of the liquid crystal display element 1 to the total reflection mirror 3 and the distance from the total reflection mirror 3 to the half mirror 6, the external object 8 to be viewed is the one which is located at a furthest depthwise position as viewed from the viewer 20 or a longest distance position as viewed from the viewer 20.

That is, the external object 8 to be viewed can be set at an arbitrary depthwise position in the range from the nearest position to the farthest position.

In the display unit in this embodiment, an image beam 19$f$ emitted from the far-distance display zone 1$f$ of the liquid crystal display element 1 is changed into a linearly polarized beam having an axis of polarization which is turned by an angle of 90 deg., after it passes through the polarized beam changing element 4, and is then reflected at the total reflection mirror 3, and thereafter, it is transmitted by a substantially all part through the half mirror (polarized beam splitting element) 2 with substantially no reflection and is directed to the half mirror 6.

Further, an image beam 19$m$ emitted from the mid-distant image zone 1$m$ is reflected by a substantially all part at the half mirror (polarized beam splitting element) 2 with substantially no transmission, and is then directed to the half mirror 6.

That is, with the configuration in which the polarized beam changing element 4 is laid in front of the far-distant display zone 1$f$ and the beam splitting element is used as the half mirror 2, the far-distant image beam 19$f$ and the mid-distant image beam 19$m$ are synthesized with each other with substantially no loss, and are then directed to the half mirror 6, thereby it is possible to obtain a bright image.

The far-distant image beam 19$f$ and the mid-distant image beam 19$m$ which are directed to the half mirror 6 are in part reflected by the half mirror 6 and are then viewed by the viewer 20.

Meanwhile, an image beam 49$e$ radiated from the external object 8 to be viewed passes through the opening 7, and then, it is in part transmitted through the half mirror 6, and is viewed by the viewer 20.

Thus, two-dimensional images displayed on the two display zones located at different depthwise positions as viewed from the viewer 20 and the external object 8 to be viewed are viewed by the viewer 20 in such a state that they are superposed with one another.

That is, with the display unit in this embodiment, the two objects to be viewed located at different depthwise positions as viewed from the viewer and the external object to be viewed located at an arbitrary position can be displayed being superposed with one another.

Thus, various purposes of use thereof can be considered. For example, if the external object to be viewed is a far-distant object or a landscape, it is possible to provide a display unit which can display an image with relatively long depthwise feeling which is not limited by the size of the display unit.

Alternatively, it can be used for the purpose of authentic check by collating the external object 8 to be viewed with an electronic image displayed on the liquid crystal display element 1.

Alternatively, the external object 8 to be viewed is set to a scene outside of an automobile, and the scene outside the automobile and an image on the liquid crystal element 1 are displayed being superposed with each other in order to use the display unit as a device for displaying various information about the automobile.

With the display unit according to the present invention, a plurality of objects to be viewed located at different depthwise positions as viewed from the viewer can be viewed being superposed with one another, and accordingly, thereby it is possible to provide a display unit which allows the viewer to perceive an image with depthwise feeling or a stereoscopic image.

Thus, the display unit is preferably used for a game machine such as a pinball game machine for which a highly expressive image or a realistic image is desirable.

Alternatively, the display unit can be applied in such a use that an object to be viewed has to be viewed with a high degree of accuracy, for medical monitoring, art appreciation or the like.

Further, the display unit according to the present invention can display two objects to be viewed located at different depthwise positions (distances) as viewed form the viewer, alternately one by one, and accordingly, it can be applied to such a use that a focus adjusting function of the patient's eyes is trained.

Further, in the display unit according to the present invention, one of objects to be viewed is set to an object or a landscape outside of the display unit, and accordingly, it is possible to use the display unit for authentic appreciation by collating the object to be viewed outside of the display unit with electronic information displayed on the display unit.

Alternatively, the external object to be viewed is set to a scene outside of an automobile, and the scene outside of an automobile and an image on the display element are displayed being superposed with each other, thereby it is possible to use the display unit as a device for displaying various information about the automobile.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display unit comprising:
a first display portion emitting a first image beam;
a second display portion emitting a second image beam and juxtaposed to the first display portion;
a continuous single screen of a liquid crystal display element being divided into the first display portion and the second display portion;
a half mirror provided on the first display portion;
a polarized beam changing element provided on the second display portion; and
a total reflection mirror arranged above the second display portion,
wherein the first image beam and the second image beam form a linearly polarized beam,
wherein the polarized beam changing element turns an axis of polarization of the linearly polarized beam of the second image beam,
wherein the total reflection mirror reflects the second image beam to the half mirror, and
wherein the half mirror transmits therethrough the first image beam and reflects the second image beam.

2. A display unit as set forth in claim 1, wherein the half mirror and the total reflection mirror respectively having reflection surfaces which are arranged in parallel with each other, and which have an angle with respect to respective screen surfaces of the first display portion and the second display portion in a range from 0 to 45 deg.

3. A display unit as set forth in claim 1, wherein the display unit satisfies the following relation $$H \geq (W0+W1)/2/\tan\partial$$

in which H is a shortest distance from the reflection surface of the half mirror to the reflection surface of the total reflection mirror, $\partial$ is a viewing angle, W1 is a width in a display portion dividing direction of the second display portion, and W0 is a distance of a gap between the first display portion and the second display portion.

4. A display unit as set forth in claim 1, wherein the first display portion and the second display portion are adapted to emit predetermined polarized beams as image beams, and the half mirror is a polarized beam splitting element which reflects thereon a predetermined polarized component but transmits therethrough a polarized component different from the predetermined polarized component.

5. A display unit as set forth in claim 1, wherein the first display portion and the second display portion emit predetermined polarized beams as image beams, the half mirror is a polarized beam splitting element which reflects thereupon a predetermined linearly polarized component and transmits therethrough a linearly polarized component having an axis of polarization orthogonal to that of the former component, or a polarized beam splitting element which transmits therethrough a predetermined polarized component but reflects thereupon a polarized component having an axis of polarization orthogonal to that of the former component.

6. A display unit comprising:
a first display portion for displaying a first image beam;
a second display portion juxtaposed to the first display portion, for displaying a second image;
a first half mirror provided on the first display portion;
a polarized beam changing element provided on the second display portion, for changing a polarized state of a second image beam emitted from the second display portion;
a reflecting portion located above the second display portion, for reflecting the second image beam which is emitted from the second display portion and the polarized state of which is changed by the polarized beam changing element, onto the first half mirror,
wherein the first half mirror reflects the second image beam reflected by the reflecting portion and transmits therethrough a first image beam emitted from the first display portion,
wherein an additional display portion is juxtaposed to the first and second display portions therebetween,
wherein a second half mirror is arranged on the additional display portion,
wherein the second half mirror has such a function to transmit therethrough or reflects image beams which are incident thereupon from different directions, irrespective their polarized states so as to synthesize these beams with each other in one direction.

7. A display unit comprising:
a first display portion for displaying a first image beam;
a second display portion juxtaposed to the first display portion, for displaying a second image;
a half mirror provided on the first display portion;

a reflecting portion located above the second display portion, for reflecting the second image beam which is emitted from the second display portion, wherein the half mirror reflects the second image beam reflected by the reflecting portion and transmits therethrough a first image beam emitted from the first display portion, wherein a plurality of second images are displayed on an outer peripheral surface of the second display portion, the second images being changed over one by one by rotating the second display portion.

* * * * *